United States Patent
Vinna et al.

(10) Patent No.: US 11,822,943 B2
(45) Date of Patent: Nov. 21, 2023

(54) USER INTERFACES FOR PRESENTING INFORMATION ABOUT AND FACILITATING APPLICATION FUNCTIONS

(71) Applicant: Apple Inc., Cupertino, CA (US)

(72) Inventors: Fredric Vinna, San Francisco, CA (US); Drew R. Domm, Oakland, CA (US); Christine E. Tran, Mountain View, CA (US); Uli M. Schöberl, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/745,146

(22) Filed: Jan. 16, 2020

(65) Prior Publication Data

US 2020/0236212 A1    Jul. 23, 2020

Related U.S. Application Data

(60) Provisional application No. 62/794,401, filed on Jan. 18, 2019.

(51) Int. Cl.

| | |
|---|---|
| *G06F 9/451* | (2018.01) |
| *G06F 3/0482* | (2013.01) |
| *G06F 11/34* | (2006.01) |
| *G06F 3/16* | (2006.01) |
| *H04N 21/472* | (2011.01) |

(Continued)

(52) U.S. Cl.
CPC ............ *G06F 9/453* (2018.02); *G06F 3/0482* (2013.01); *G06F 3/167* (2013.01); *G06F 11/3438* (2013.01); *G06F 16/639* (2019.01); *H04M 1/72442* (2021.01); *H04N 21/472* (2013.01);

(Continued)

(58) Field of Classification Search
CPC ......... H04M 1/72442; H04M 1/72454; H04M 1/247; G06F 3/0482; G06F 3/04886; G06F 2201/86; G06F 2201/81; G06F 21/629; G06F 9/453; G06F 11/3438; G06F 3/167; G06F 16/639; G10L 15/22; G10L 2015/223; G10L 2015/225; H04L 67/22;

(Continued)

(56) References Cited

U.S. PATENT DOCUMENTS

| | | |
|---|---|---|
| 6,323,846 B1 | 11/2001 | Westerman et al. |
| 6,570,557 B1 | 5/2003 | Westerman et al. |

(Continued)

FOREIGN PATENT DOCUMENTS

| | | |
|---|---|---|
| EP | 0617360 A2 | 9/1994 |
| WO | 2013/169849 A2 | 11/2013 |

(Continued)

OTHER PUBLICATIONS

International Search Report received for PCT Patent Application No. PCT/US2020/013942, dated May 4, 2020, 4 pages.

*Primary Examiner* — Nicholas Ulrich

(74) *Attorney, Agent, or Firm* — Kubota & Basol LLP

(57) ABSTRACT

In some embodiments, an electronic device presents information about a function of an application and facilitates performance of functions of the application. The information is optionally displayed in response to receiving an input to perform an action associated with the respective function when information-display criteria are met. In some embodiments, the criteria include a criterion that is satisfied when the respective function has not yet been initiated by the user on the electronic device.

69 Claims, 63 Drawing Sheets

(51) Int. Cl.
*H04N 21/482* (2011.01)
*G06F 16/638* (2019.01)
*H04M 1/72442* (2021.01)

(52) U.S. Cl.
CPC . *H04N 21/482* (2013.01); *G06F 2203/04803* (2013.01)

(58) Field of Classification Search
CPC ............... H04N 21/472; H04N 21/482; H04N 21/47217
See application file for complete search history.

(56) References Cited

U.S. PATENT DOCUMENTS

| | | | |
|---|---|---|---|
| 6,677,932 | B1 | 1/2004 | Westerman |
| 7,614,008 | B2 | 11/2009 | Ording |
| 7,633,076 | B2 | 12/2009 | Huppi et al. |
| 7,653,883 | B2 | 1/2010 | Hotelling et al. |
| 7,657,849 | B2 | 2/2010 | Chaudhri et al. |
| 7,663,607 | B2 | 2/2010 | Hotelling et al. |
| 7,844,914 | B2 | 11/2010 | Andre et al. |
| 7,957,762 | B2 | 6/2011 | Herz et al. |
| 8,006,002 | B2 | 8/2011 | Kalayjian et al. |
| 8,239,784 | B2 | 8/2012 | Hotelling et al. |
| 8,279,180 | B2 | 10/2012 | Hotelling et al. |
| 8,381,135 | B2 | 2/2013 | Hotelling et al. |
| 8,479,122 | B2 | 7/2013 | Hotelling et al. |
| 9,348,458 | B2 | 5/2016 | Hotelling et al. |
| 9,933,937 | B2 | 4/2018 | Lemay et al. |
| 9,974,045 | B2 * | 5/2018 | Ghosh .................. H04W 4/029 |
| 2002/0015024 | A1 | 2/2002 | Westerman et al. |
| 2005/0190059 | A1 | 9/2005 | Wehrenberg |
| 2006/0017692 | A1 | 1/2006 | Wehrenberg et al. |
| 2006/0033724 | A1 | 2/2006 | Chaudhri et al. |
| 2006/0197753 | A1 | 9/2006 | Hotelling |
| 2008/0250323 | A1* | 10/2008 | Huff ........................ G06F 9/453 715/733 |
| 2016/0103580 | A1* | 4/2016 | Fukui .................. G06F 3/04817 345/173 |
| 2016/0381658 | A1 | 12/2016 | Ghosh et al. |
| 2017/0192636 | A1* | 7/2017 | Wang ........................ G06F 8/38 |
| 2017/0249067 | A1* | 8/2017 | Marzke .............. G06F 16/24575 |
| 2018/0052696 | A1* | 2/2018 | Riscutia ................. G06Q 10/00 |
| 2018/0352091 | A1* | 12/2018 | Puri ..................... H04M 7/0036 |
| 2019/0286461 | A1* | 9/2019 | Toksos ................ G06F 11/3447 |

FOREIGN PATENT DOCUMENTS

| | | |
|---|---|---|
| WO | 2014/105276 A1 | 7/2014 |
| WO | 2016/191737 A2 | 12/2016 |

* cited by examiner (Number of items of streaming content added to library exceeds threshold and no items of streaming content have been downloaded)

(Number of items of streaming content added to library exceeds threshold and no playlists include streaming content)

(Number of application usage-sessions exceeds threshold, number of page views during current session exceeds threshold, and lyrics never viewed)

(Number of downloaded items of streaming content exceeds threshold and automatic downloads setting not enabled)

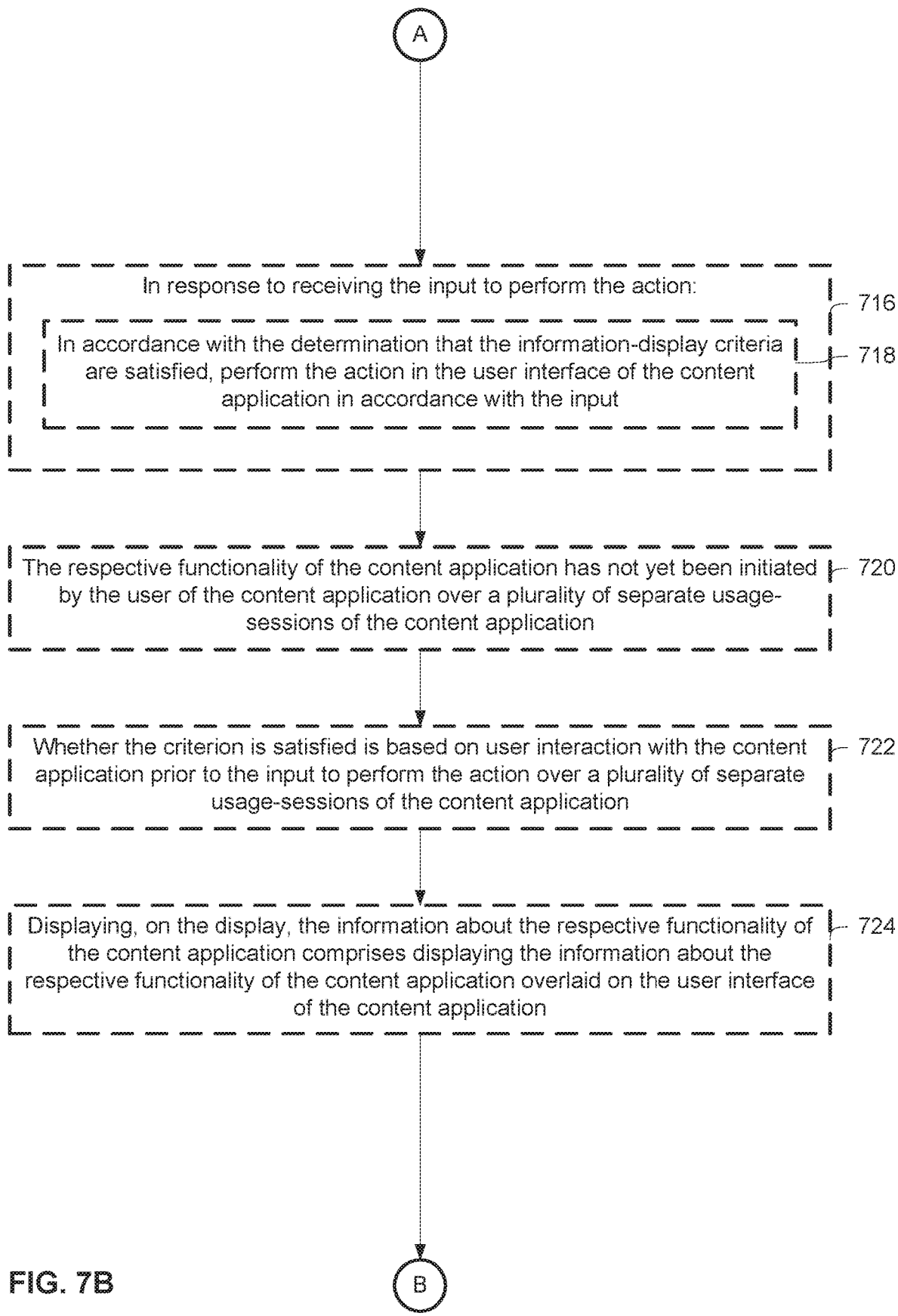

USER INTERFACES FOR PRESENTING INFORMATION ABOUT AND FACILITATING APPLICATION FUNCTIONS

CROSS-REFERENCE TO RELATED APPLICATION

This application claims the benefit of U.S. Provisional Patent Application No. 62/794,401, filed Jan. 18, 2019, the contents of which are incorporated herein by reference in its entirety for all purposes.

FIELD OF THE DISCLOSURE

This relates generally to electronic devices that present user interfaces including information about functions of an application and facilitating use of such functions, and user interactions with such devices.

BACKGROUND

User interaction with electronic devices has increased significantly in recent years. These devices can be devices such as computers, tablet computers, televisions, multimedia devices, mobile devices, and the like.

In some circumstances, users wish to receive information about functions of an application that they have not yet performed with the application, thus facilitating use of such functions. Enhancing these interactions improves the user's experience with the device and decreases user interaction time, which is particularly important where input devices are battery-operated.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

SUMMARY

Some embodiments described in this disclosure are directed to presenting information about functions of an application on an electronic device. The electronic device optionally presents the information in response to receiving an input to perform an action associated with the respective function when information-display criteria are met. In some embodiments, the criteria include a criterion that is satisfied when the respective function has not yet been initiated by the user on the electronic device, thus facilitating discovery of and use of the respective function.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

DETAILED DESCRIPTION

Figure 1A:
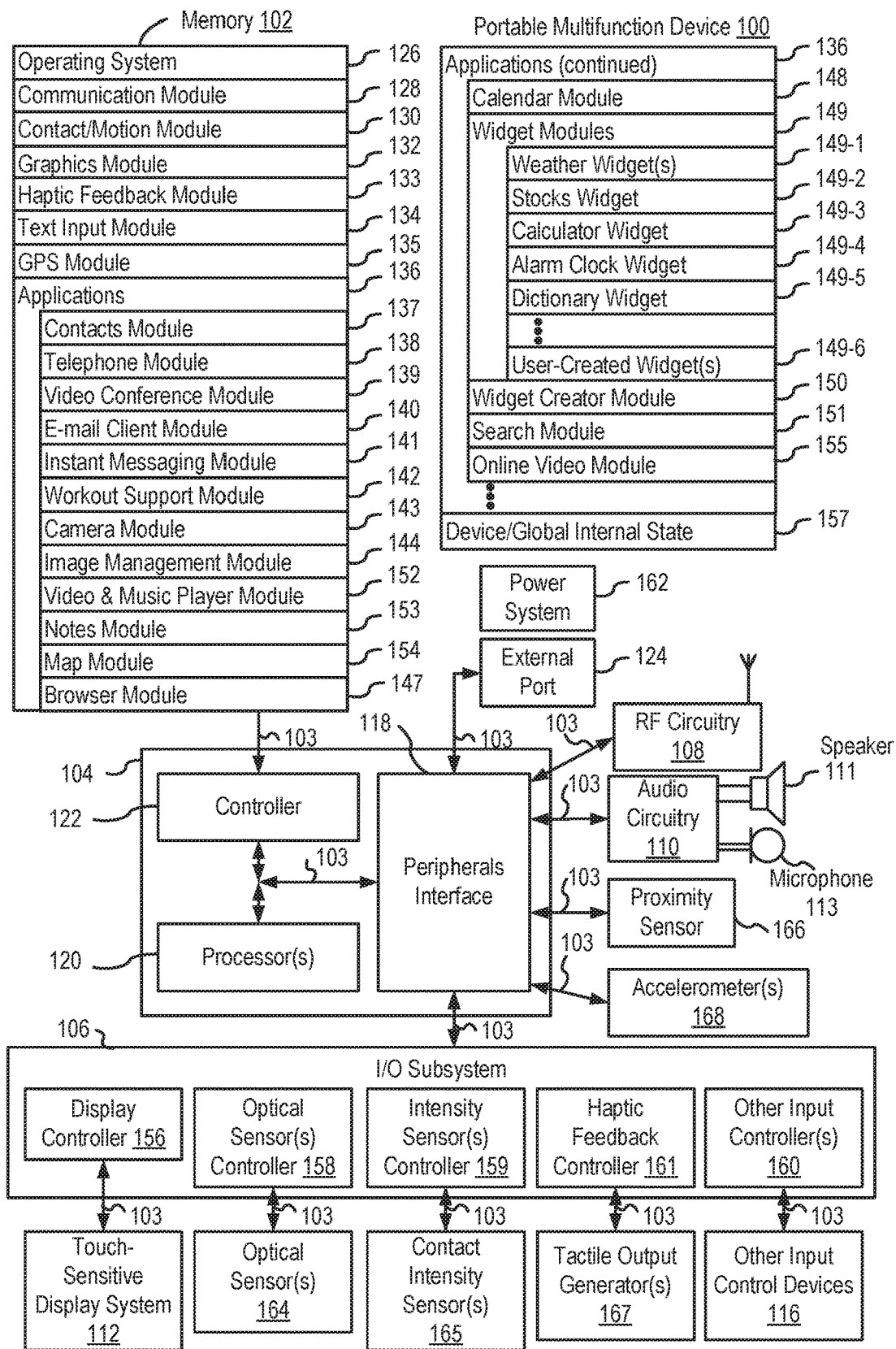
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods for presenting information about functionality of applications. Such techniques can reduce the cognitive burden on a user who uses such devices. Further, such techniques can reduce processor and battery power otherwise wasted on redundant user inputs.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
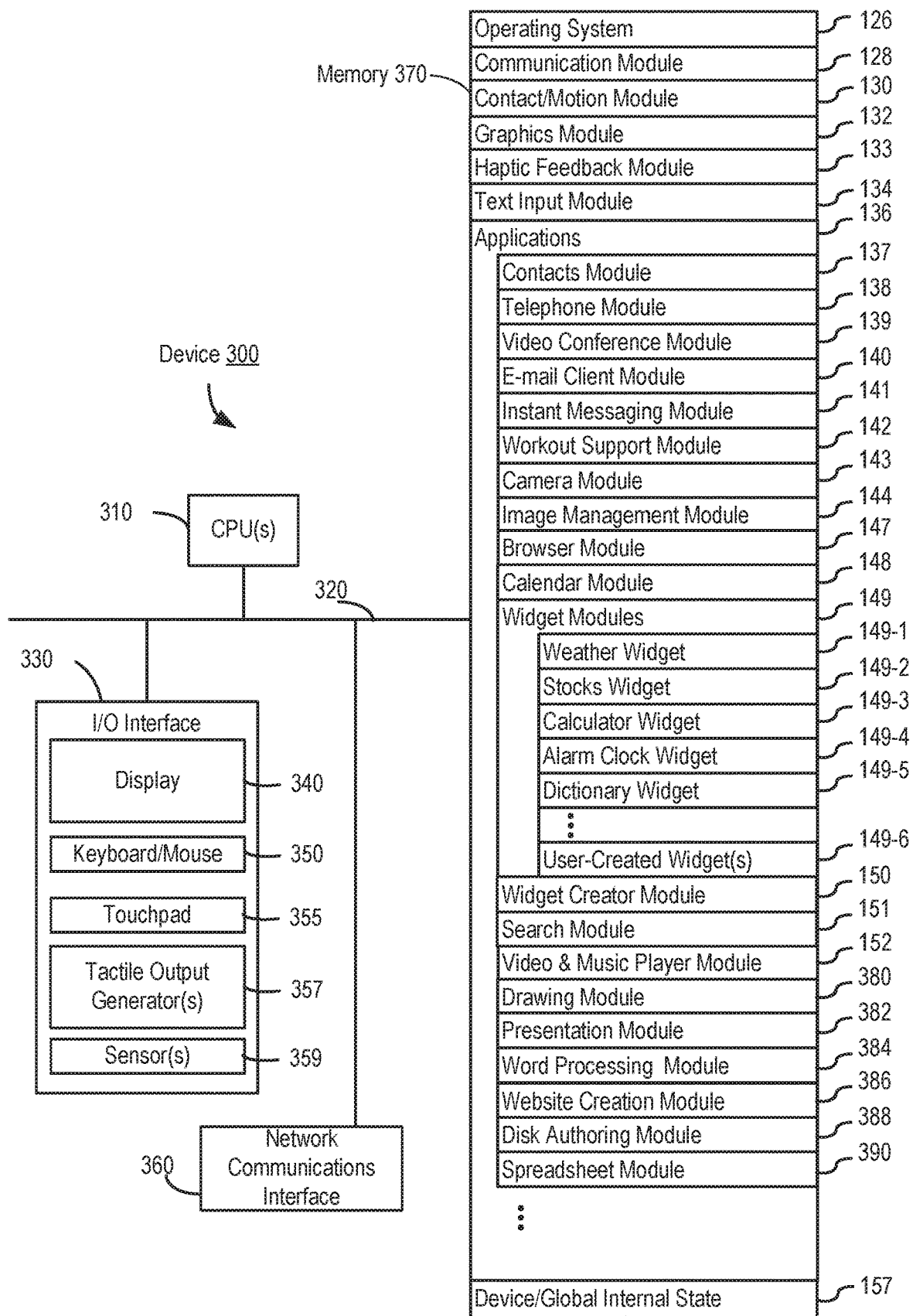
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are, optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
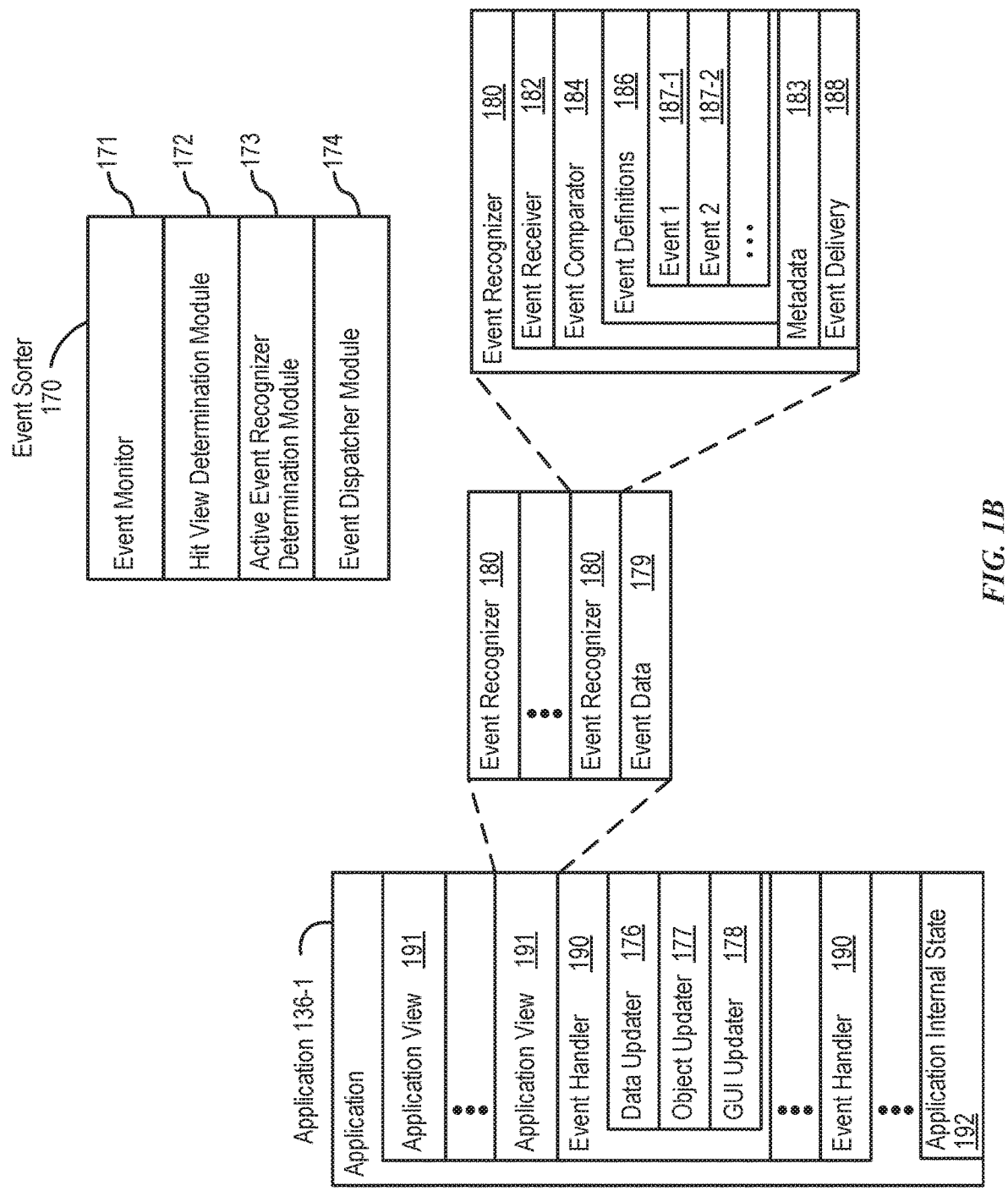
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
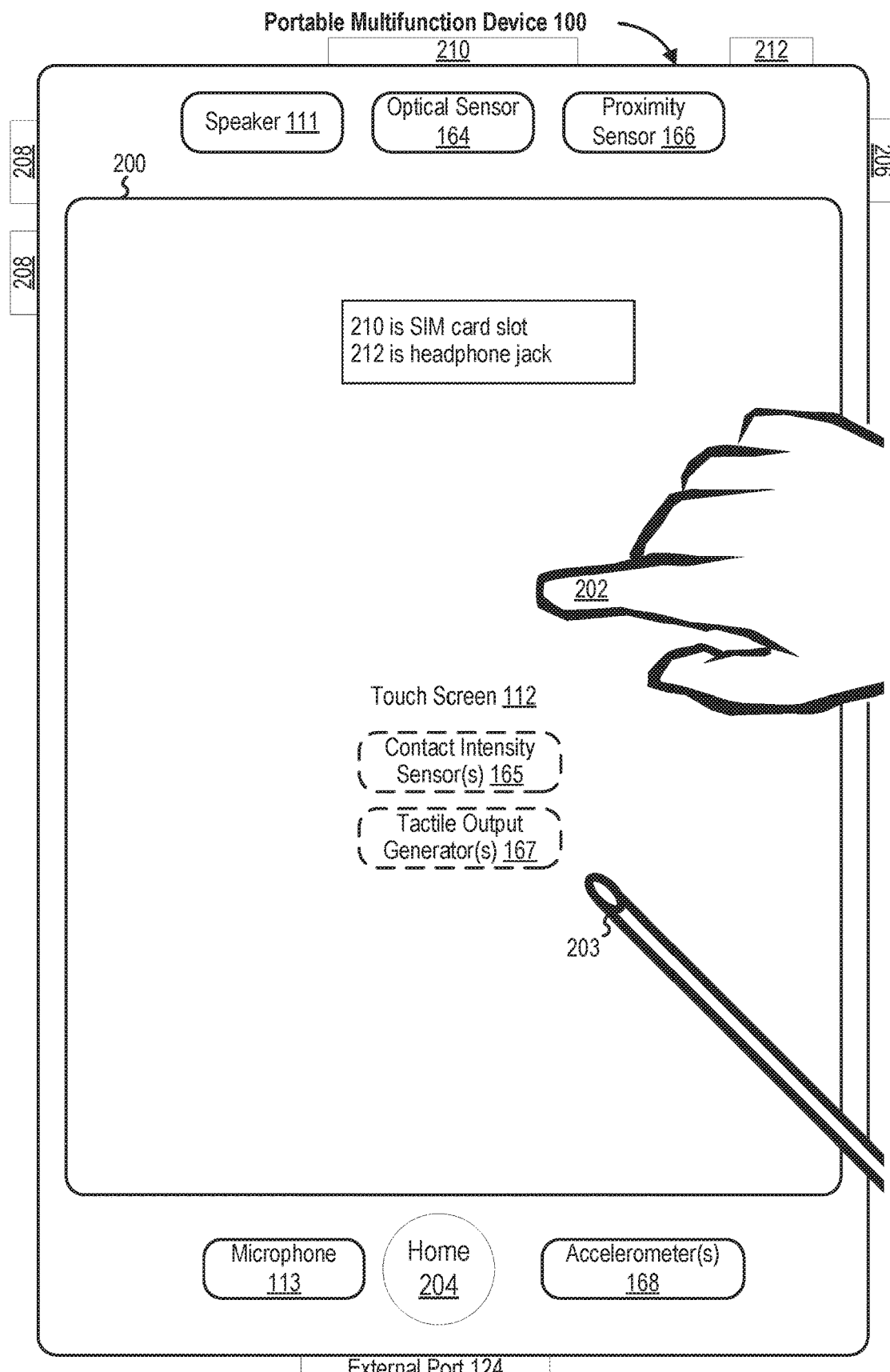
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
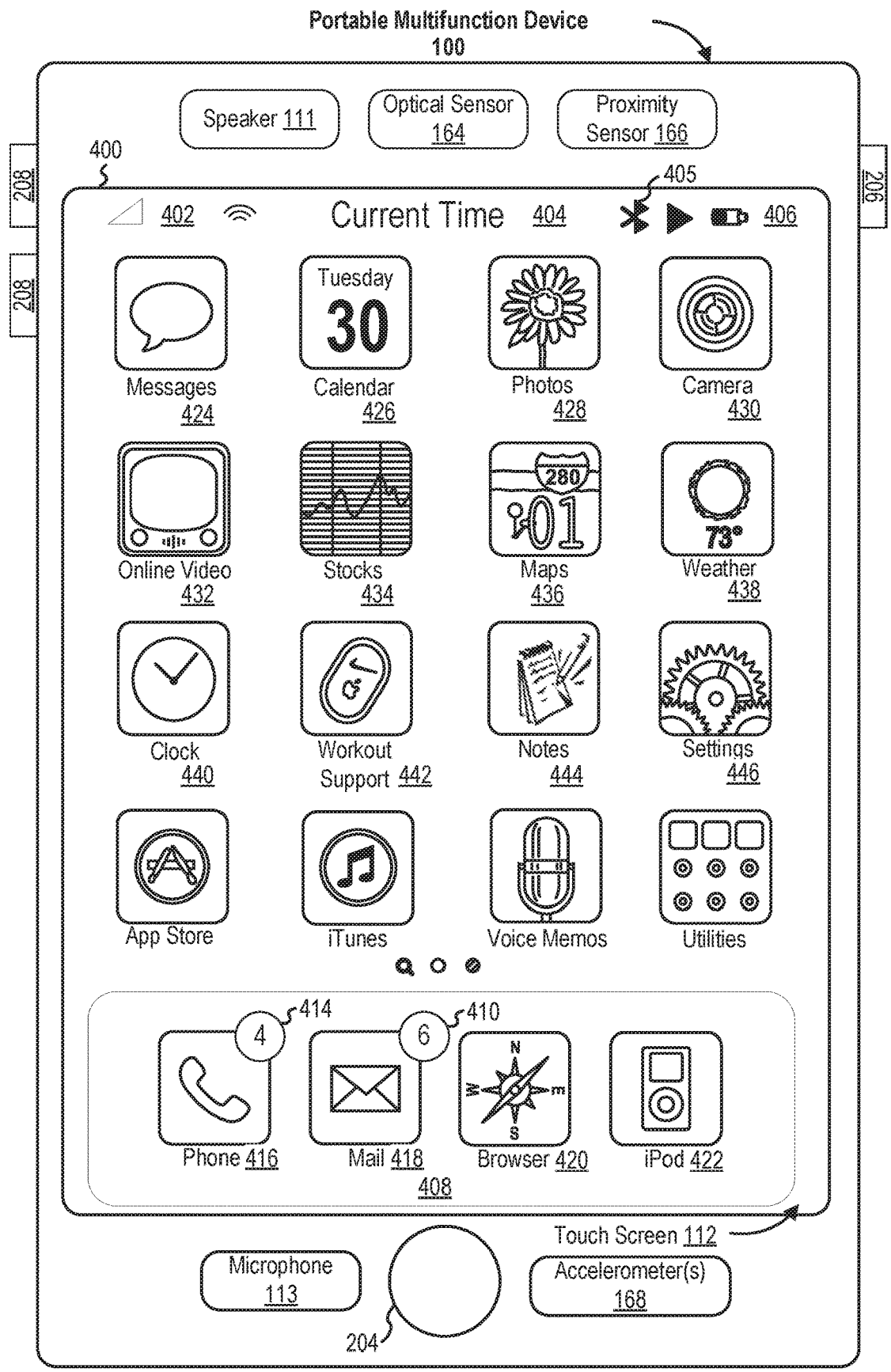
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
 Icon 416 for telephone module 138, labeled "Phone," which optionally includes an indicator 414 of the number of missed calls or voicemail messages;
 Icon 418 for e-mail client module 140, labeled "Mail," which optionally includes an indicator 410 of the number of unread e-mails;
 Icon 420 for browser module 147, labeled "Browser;" and
 Icon 422 for video and music player module 152, also referred to as iPod (trademark of Apple Inc.) module 152, labeled "iPod;" and
Icons for other applications, such as:
 Icon 424 for IM module 141, labeled "Messages;"
 Icon 426 for calendar module 148, labeled "Calendar;"
 Icon 428 for image management module 144, labeled "Photos;"
 Icon 430 for camera module 143, labeled "Camera;"
 Icon 432 for online video module 155, labeled "Online Video;"
 Icon 434 for stocks widget 149-2, labeled "Stocks;"
 Icon 436 for map module 154, labeled "Maps;"
 Icon 438 for weather widget 149-1, labeled "Weather;"
 Icon 440 for alarm clock widget 149-4, labeled "Clock;"
 Icon 442 for workout support module 142, labeled "Workout Support;"
 Icon 444 for notes module 153, labeled "Notes;" and
 Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
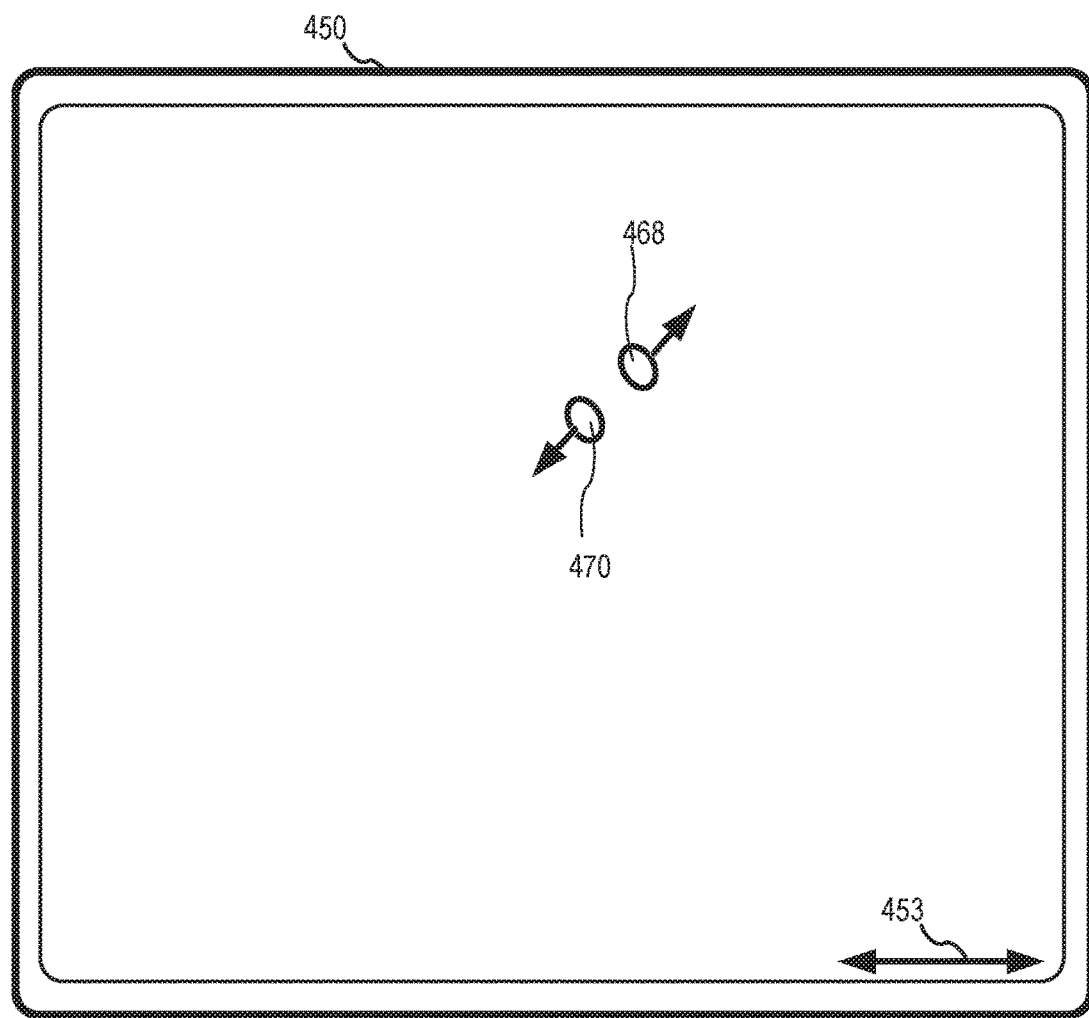
FIG. 4B illustrates an exemplary user interface for a multifunction device with a touch-sensitive surface that is separate from the display in accordance with some embodiments.
Figure 4B:
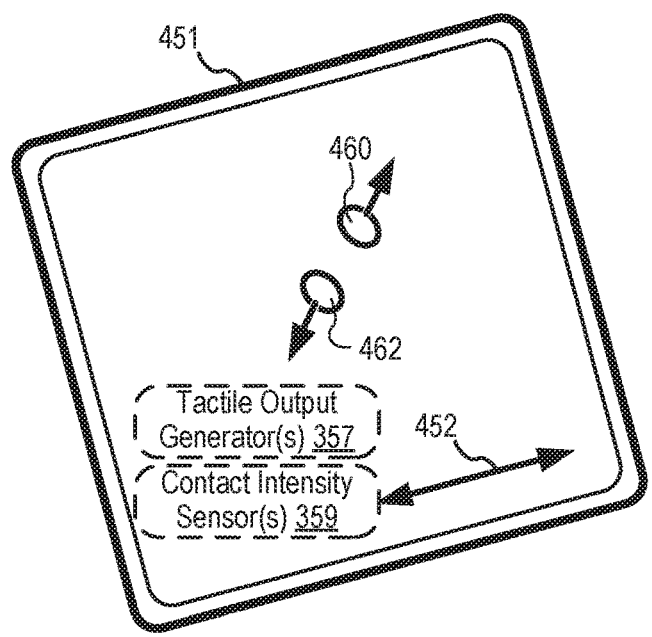

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
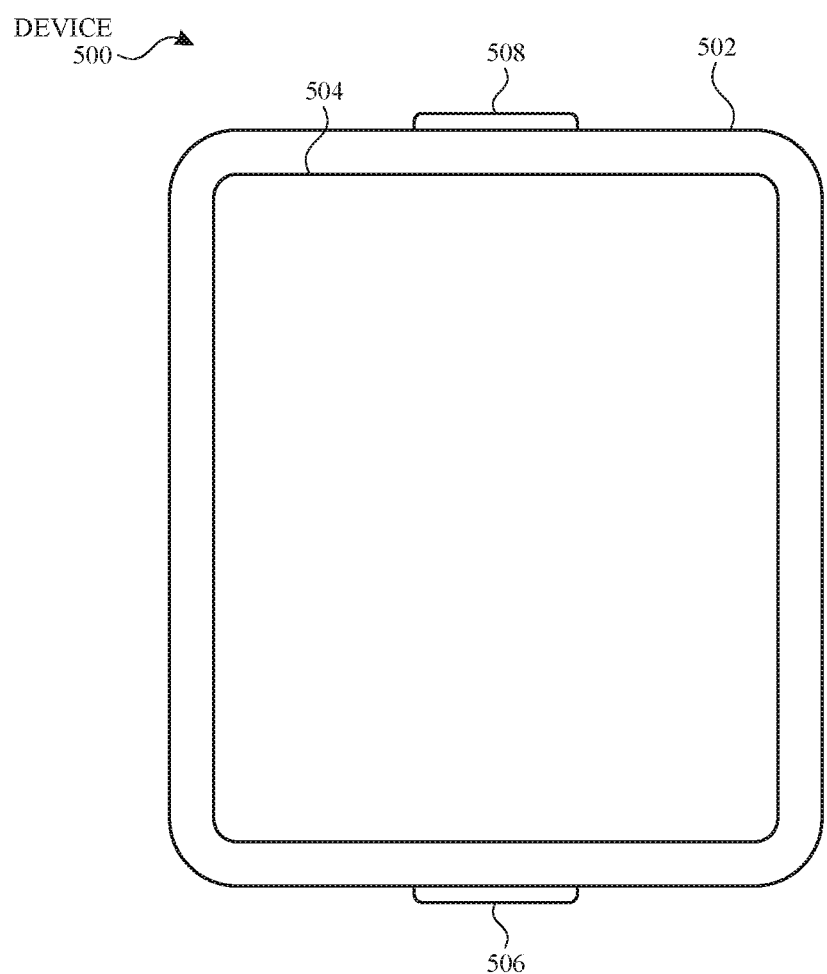
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications:

International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
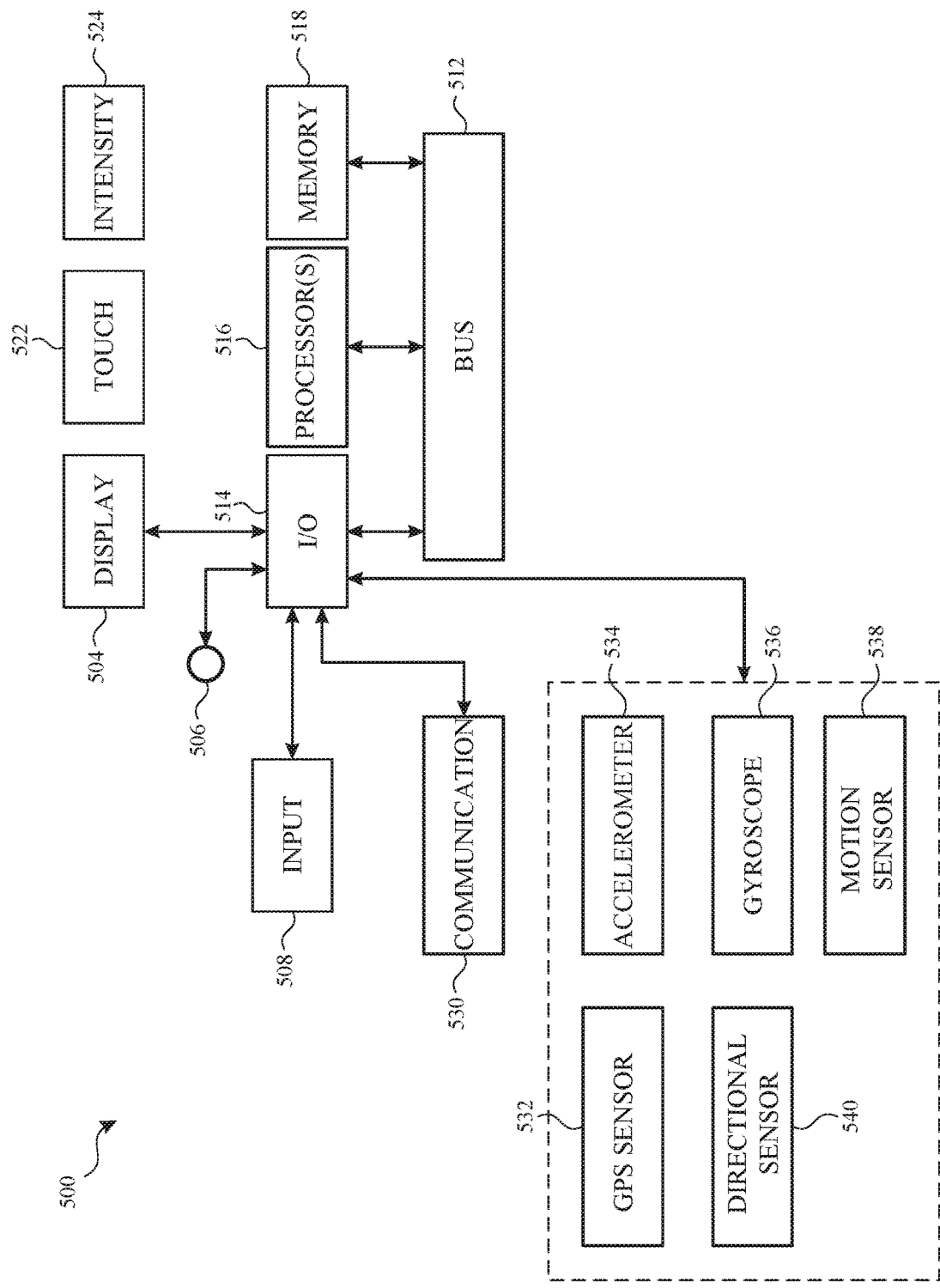
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including process 700 (FIG. 7). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
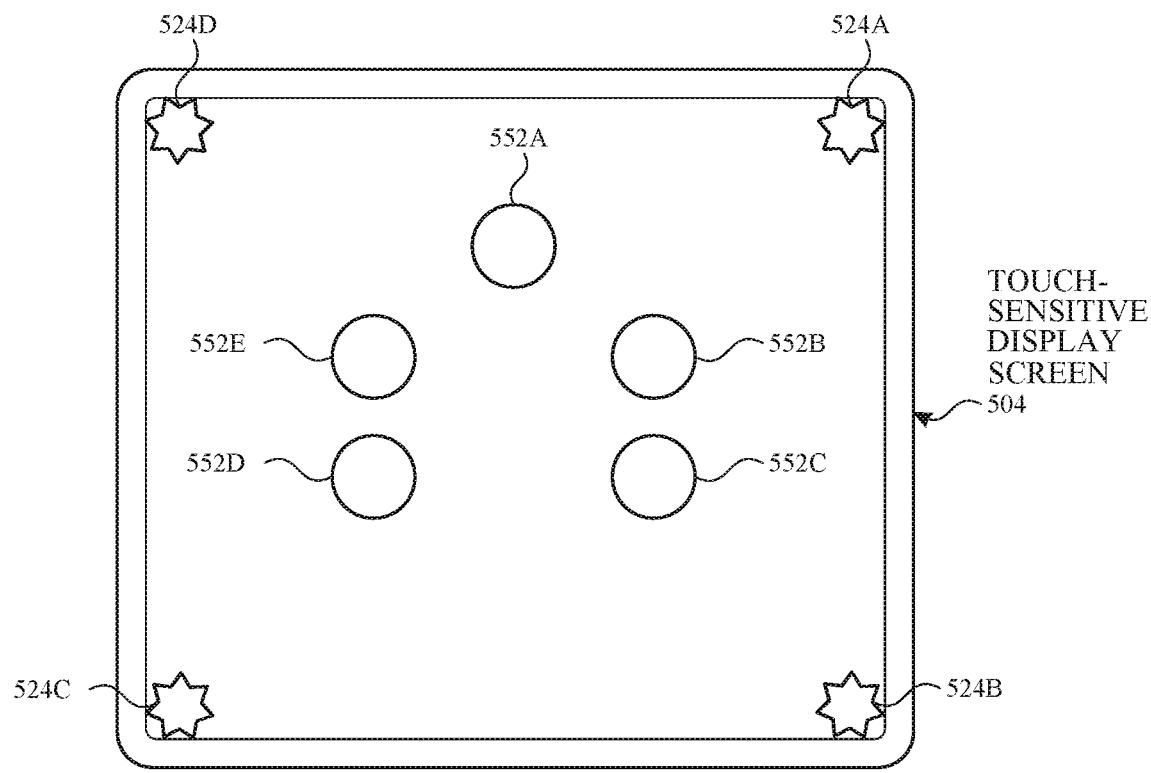
FIGS. 5C-5D illustrate exemplary components of a personal electronic device having a touch-sensitive display and intensity sensors in accordance with some embodiments.
Figure 5C:
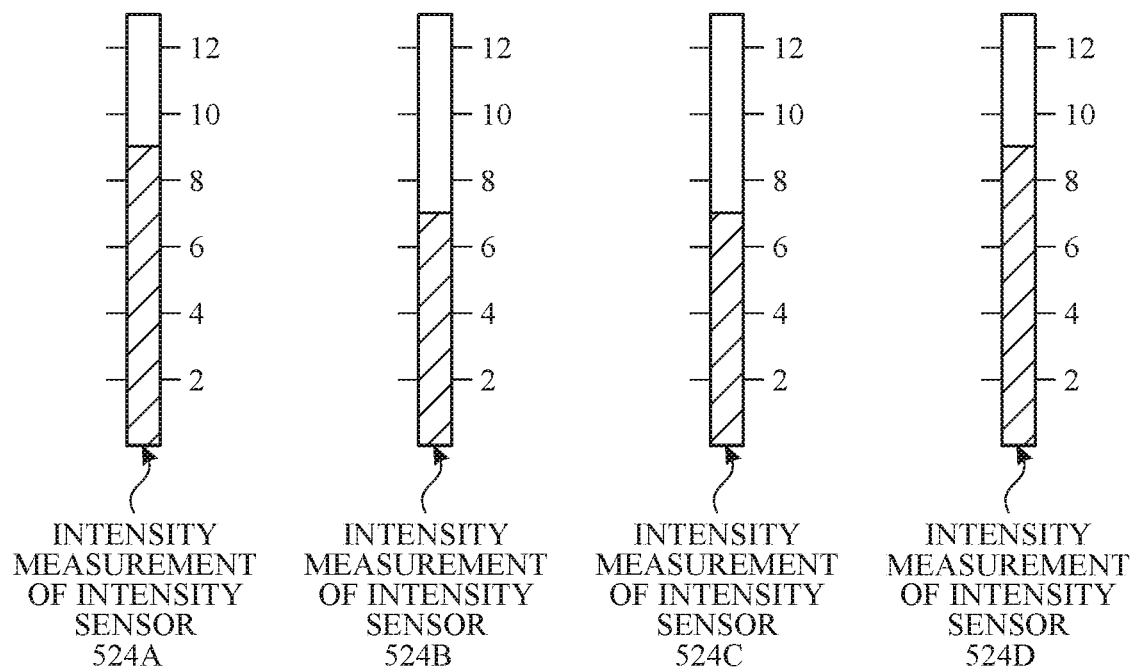
Figure 5D:
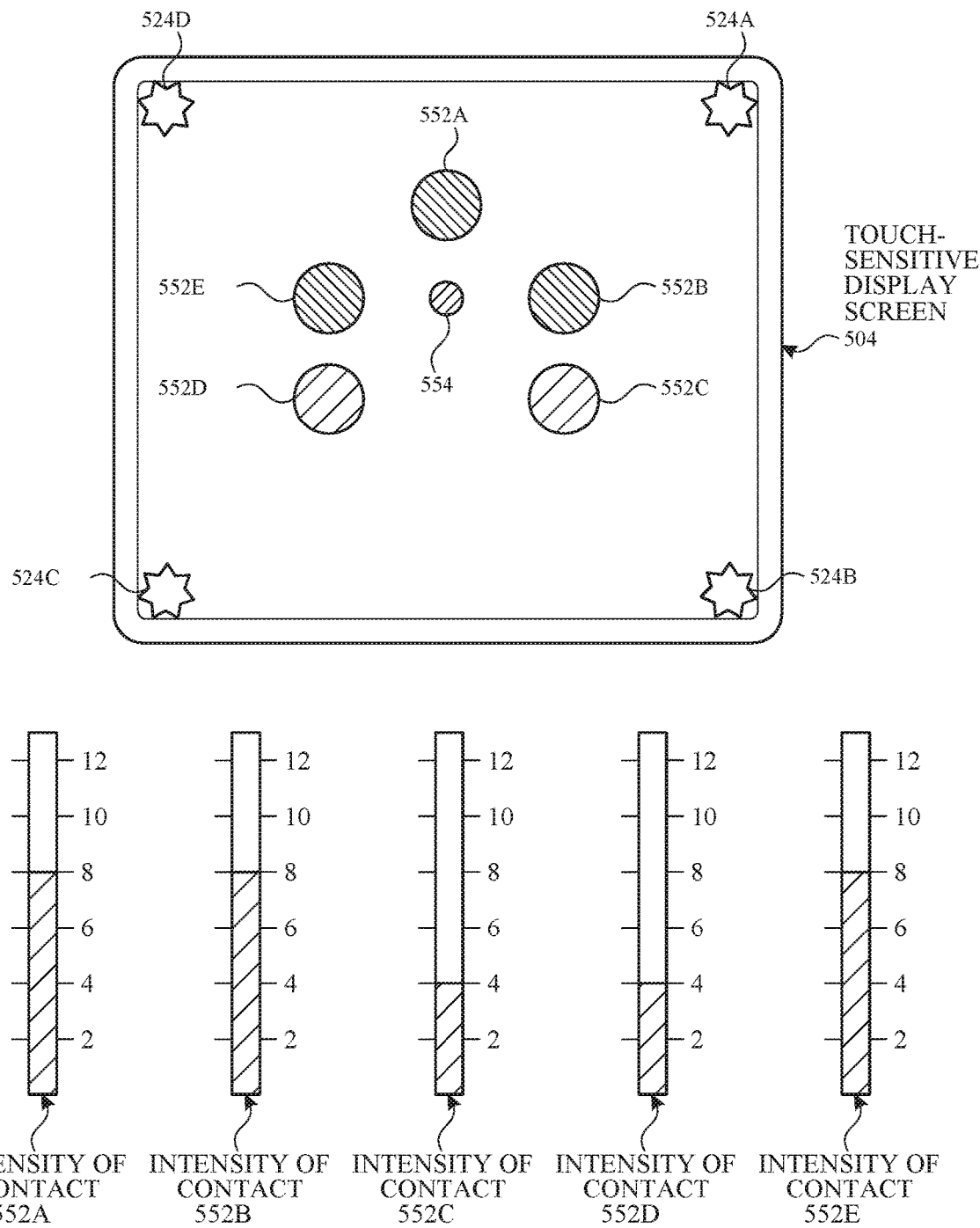

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A \cdot (Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
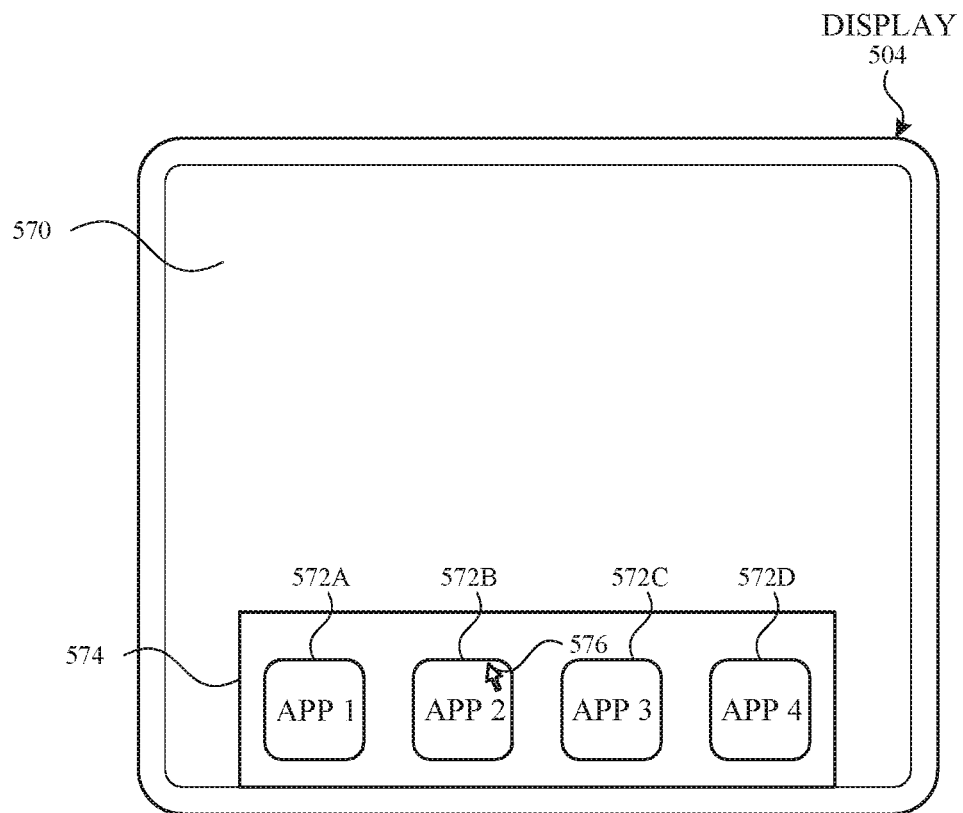
FIGS. 5E-5H illustrate exemplary components and user interfaces of a personal electronic device in accordance with some embodiments.
Figure 5E:
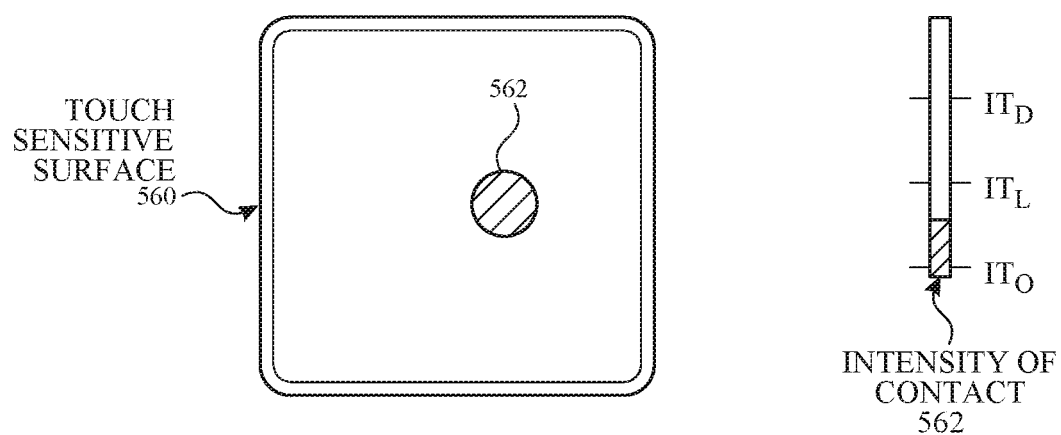
Figure 5F:
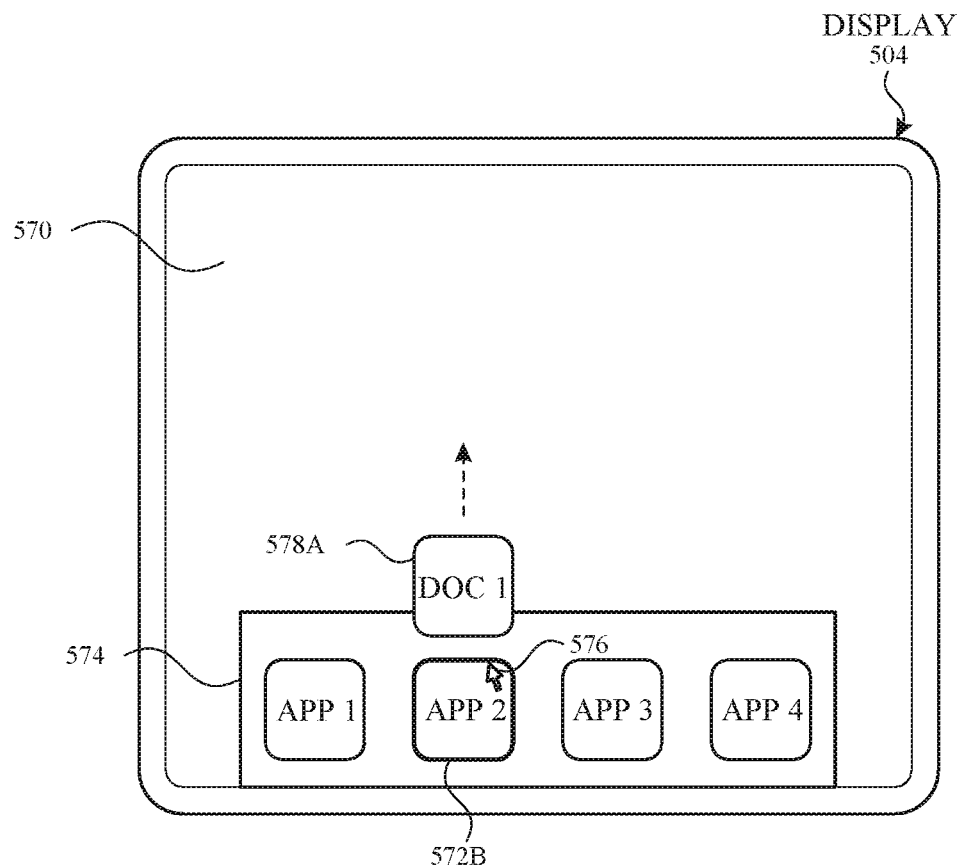
Figure 5F:
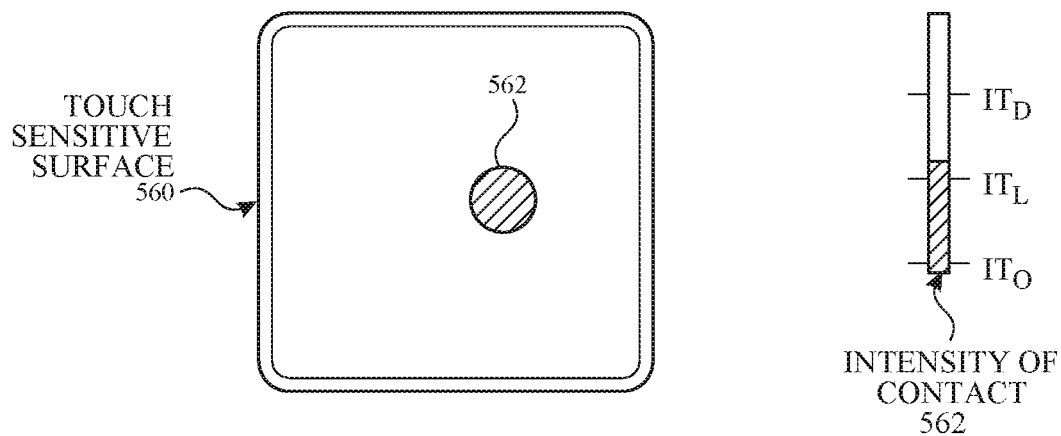
Figure 5G:
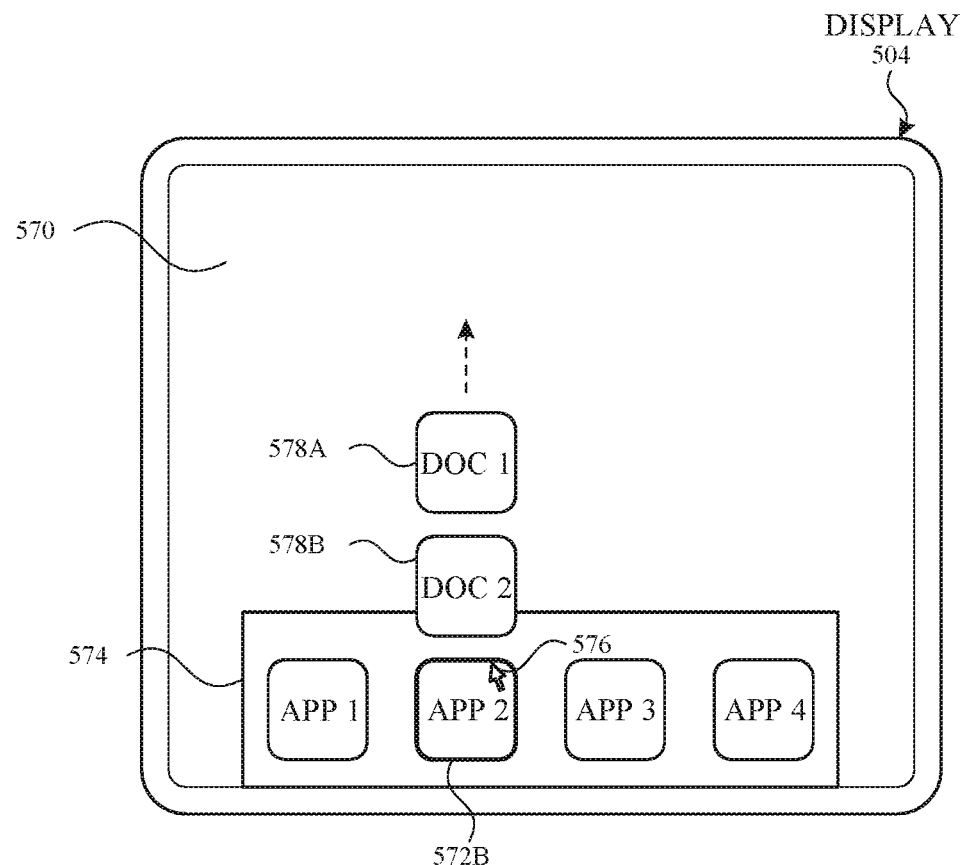
Figure 5G:
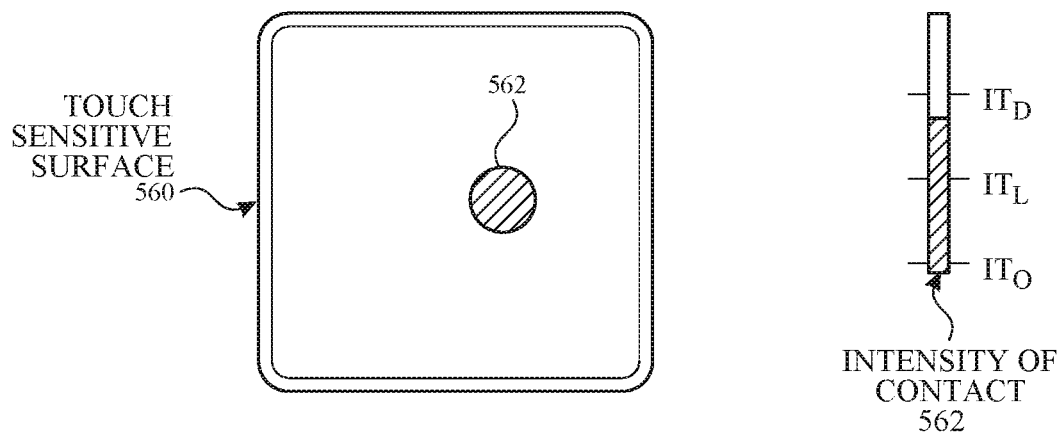
Figure 5H:
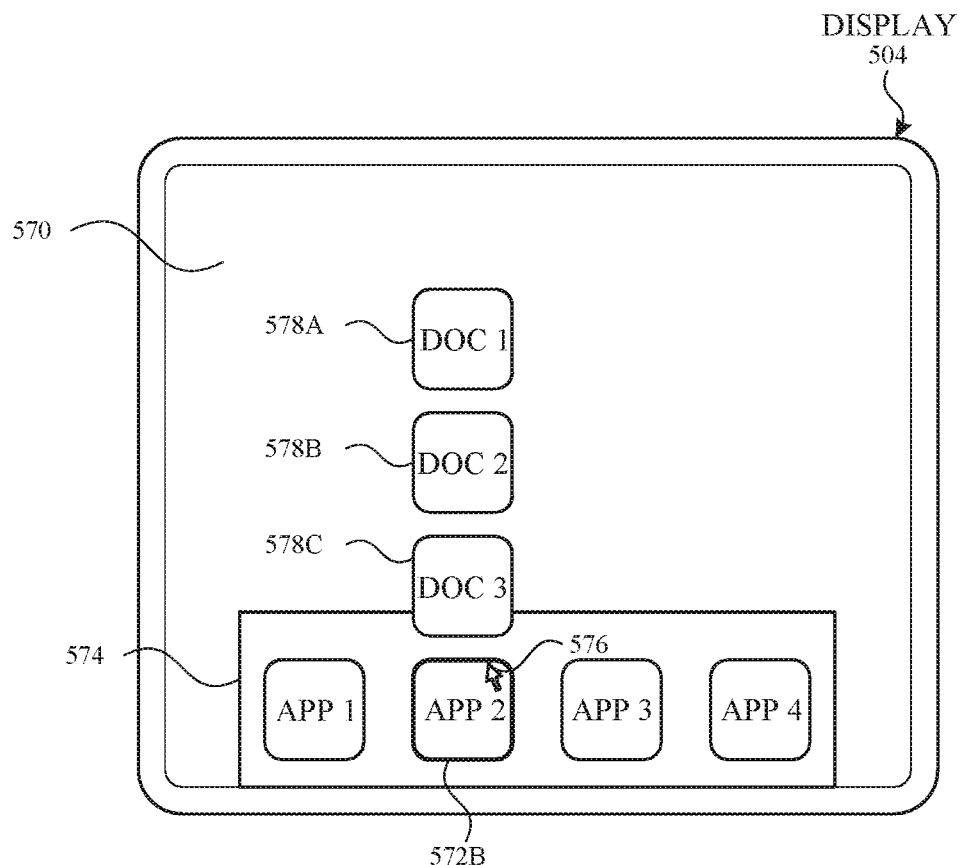
Figure 5H:
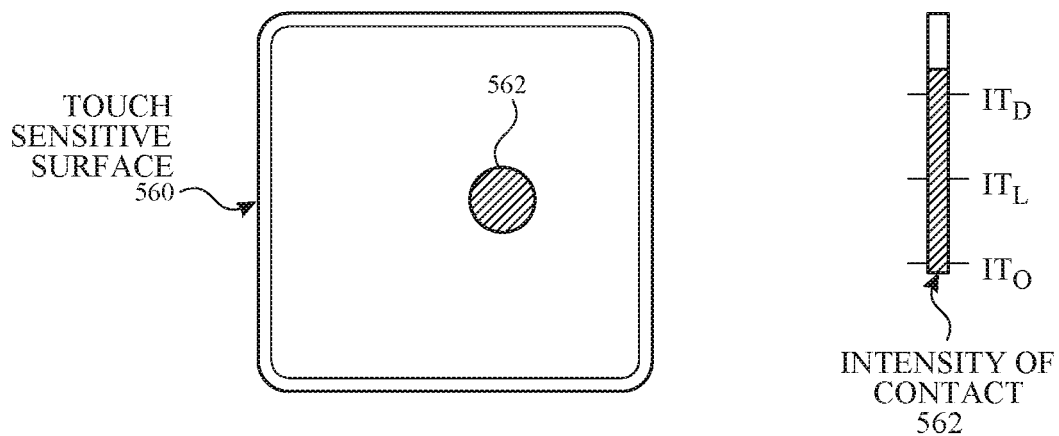

FIGS. 5E-5H illustrate detection of a gesture that includes a press input that corresponds to an increase in intensity of a contact 562 from an intensity below a light press intensity threshold (e.g., "ITL") in FIG. 5E, to an intensity above a deep press intensity threshold (e.g., "ITD") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "ITD"). Contact 562 is maintained on touch-sensitive surface 560. In response to the detection of the gesture, and in accordance with contact 562 having an intensity that goes above the deep press intensity threshold (e.g., "ITD") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "ITS"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

User Interfaces and Associated Processes

Users interact with electronic devices in many different manners, including using an electronic device to perform functions with an application. In some embodiments, an electronic device presents information about functions of an application that have not yet been initiated by the user, and optionally facilitates the use of such functions, accordingly. The embodiments described below provide ways in which a first electronic device detects information-display criteria and, when the information-display criteria are satisfied, presents the information about a respective function of the application and facilitates the use of the function. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

FIGS. 6A-6I illustrate exemplary ways in which an electronic device presents information about application functions and facilitates performance of the functions in accordance with some embodiments. The embodiments in these figures are used to illustrate the processes described below, including the processes described with reference to FIGS. 7A-7N.

Figure 6A:
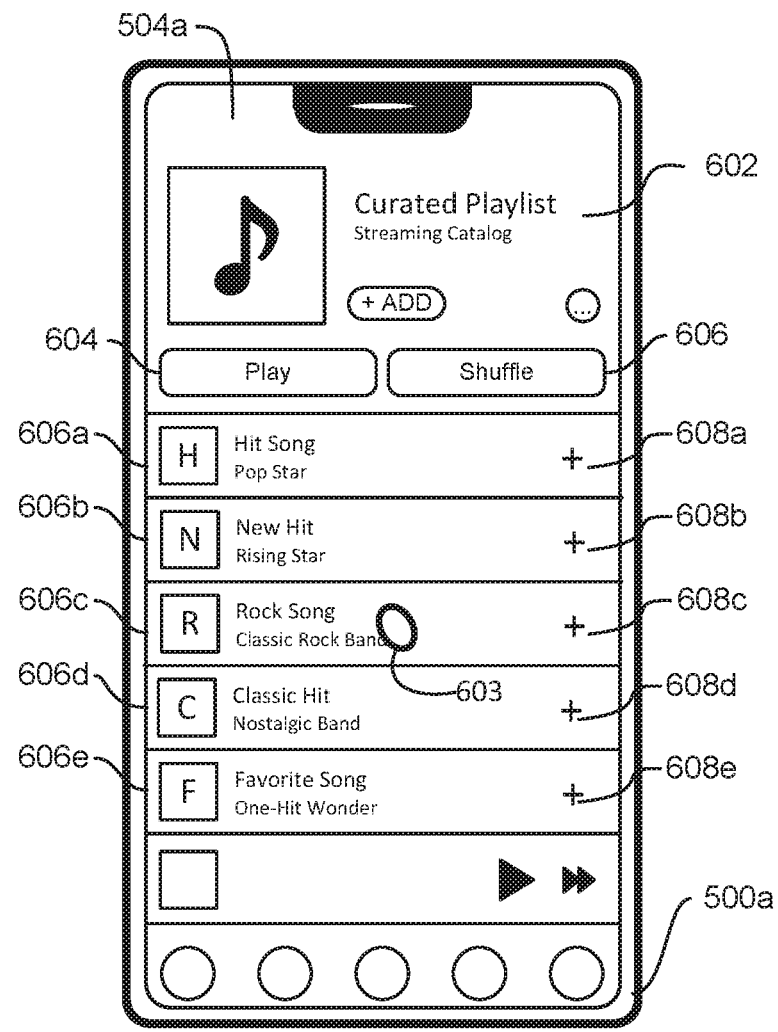
FIGS. 6A-6II illustrate exemplary ways in which an electronic device presents information about application functions and facilitates performance of the functions in accordance with some embodiments.
Figure 6B:
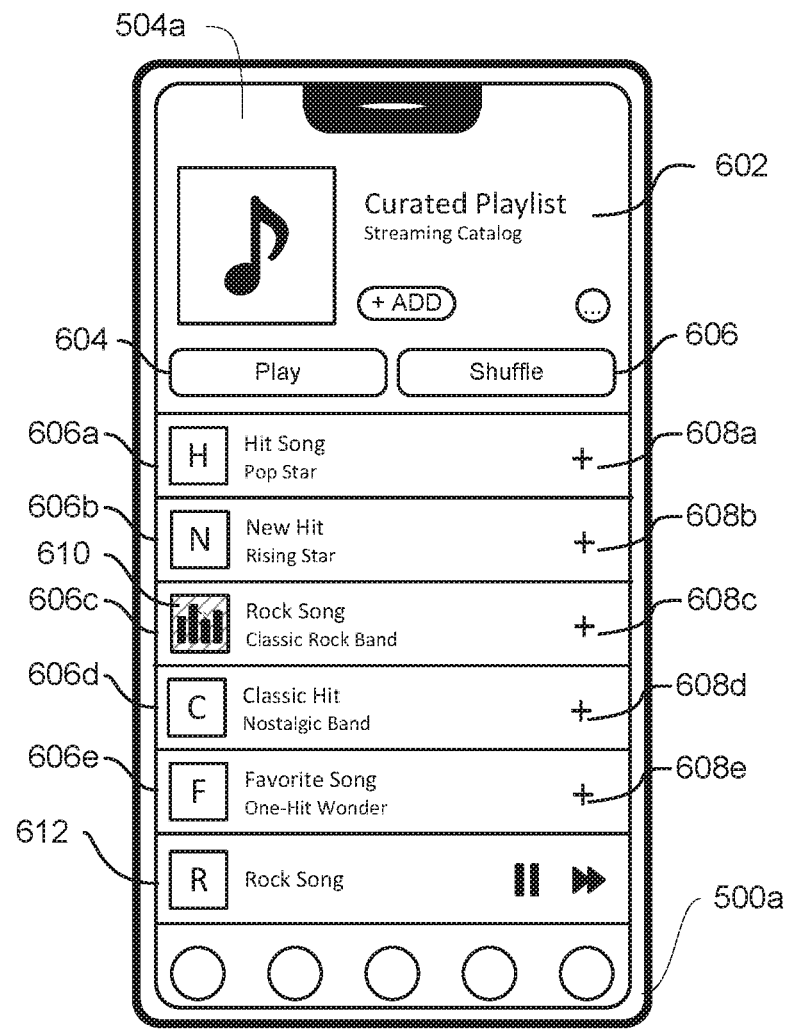

FIGS. 6A-6D illustrate an electronic device 500a presenting information about the content library functionality of a content application. In FIG. 6A, the electronic device 500a presents the user interface of a content application. The user interface includes an indication 602 of a curated playlist created by a content streaming service, a selectable option 604 to play the playlist, a selectable option 606 to toggle a shuffle playback setting of the content application, a plurality of representations 606a-e of items of content included in the playlist, and a plurality of selectable options 608a-e for saving respective items of content to a library of the content application. As shown in FIG. 6A, the user selects (e.g., with contact 603) one of the representations 606c of an item of content to play the content item. In response to the user's selection, the electronic device 500a plays the item of content, as shown in FIG. 6B.

In FIG. 6B, the electronic device 500a presents the content application user interface, including an indication 610 that the item of content is playing on the electronic device 500a. While displaying the user interface illustrated in FIG. 6B, the electronic device 500a plays the item of content. The user interface includes a playback information indication 612 that indicates the title of the content that is currently playing with the content application. As an example, information-display criteria for displaying information about a function of the content application are not met at the time the user's selection (e.g., with contact 603) illustrated in FIG. 6A is detected. Thus, the electronic device 500a initiates playback of the content without displaying information about functionality of the content application that has not yet been initiated by the user, which will be described in more detail below.

Figure 6C:
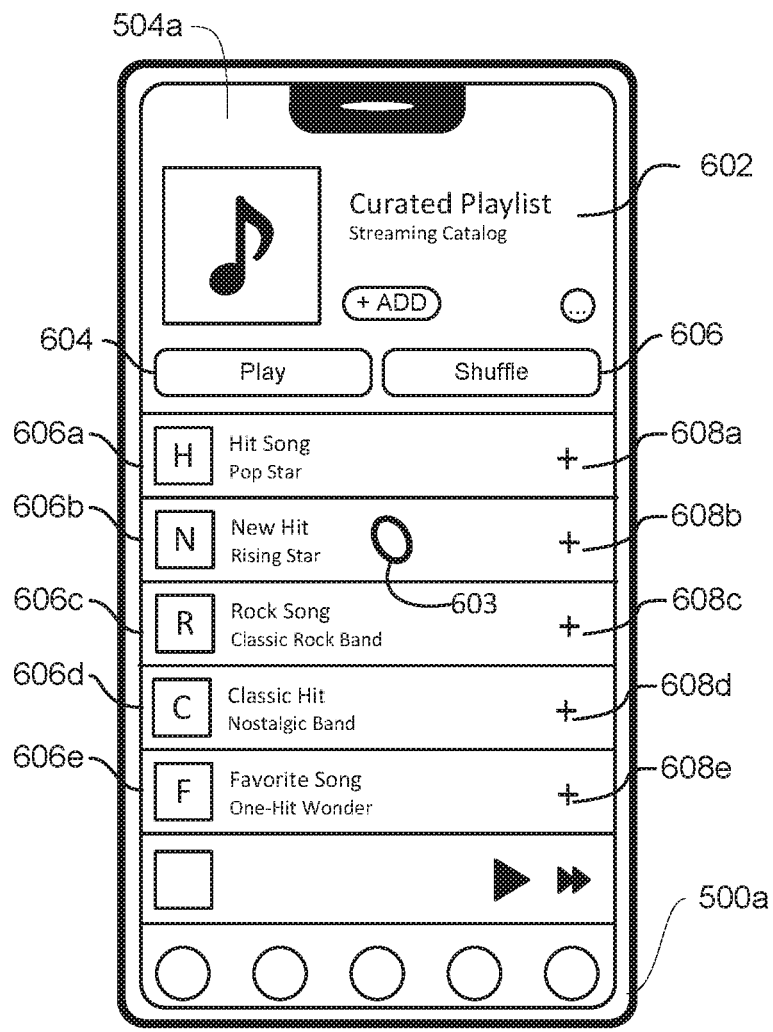

In FIG. 6C, the user selects (e.g., with contact 603) a representation 606b of an item of content to play the item of content with the content application. As indicated in FIG. 6C, when the contact 603 is detected, the electronic device 500a determines that the number of items of streaming content that have been played with the content application exceeds a predetermined threshold and the content library includes no items of streaming content. As an example, these conditions satisfy the information-display criteria. Thus, in response to the user's selection, the electronic device 500a plays the selected content and displays information 616 about the content library, as shown in FIG. 6D.

Figure 6D:
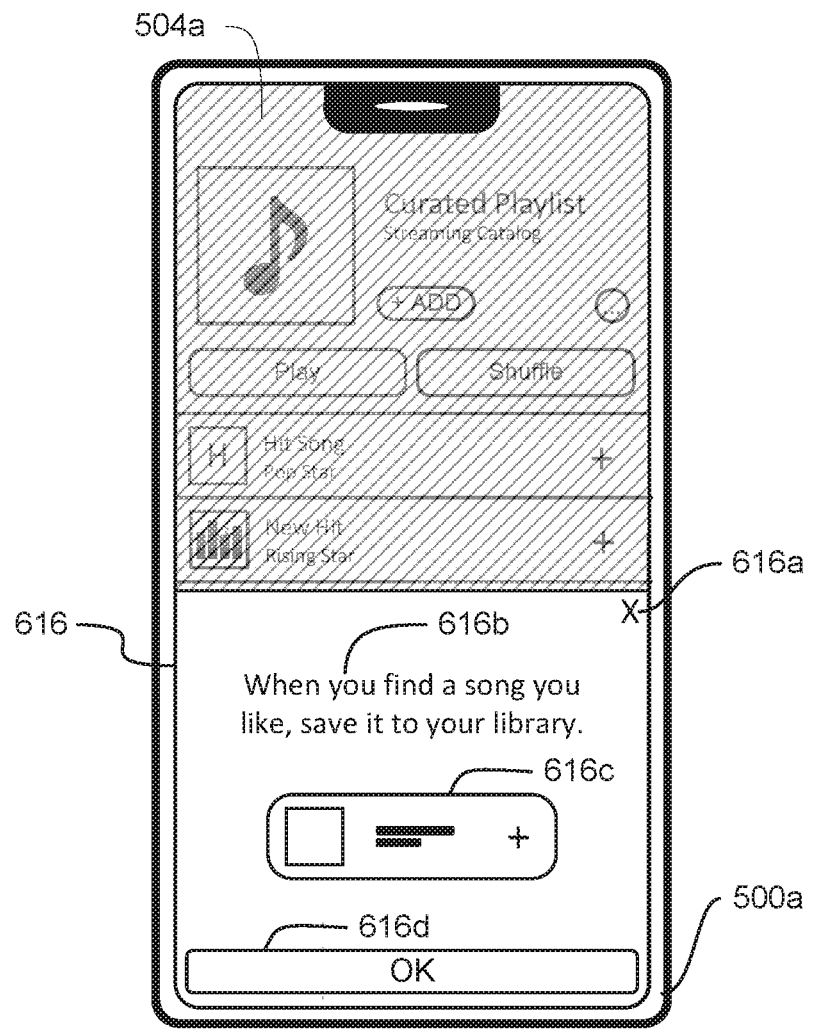

FIG. 6D illustrates the information 616 about the content library functionality of the content application. The information 616 is displayed overlaid on the user interface of the content application, which has a modified appearance, such as being greyed out. The information 616 includes a selectable option 616a to dismiss the information 616 about the library functionality of the content application, text 616b describing how to use the library functionality of the content application, an image 616c illustrating the library functionality of the content application, and a selectable option 616d to dismiss the information 616. In this way, because the user has taken certain actions (e.g., playing items of streaming content) in the content application that are related to the content library functionality, but has not yet taken advantage of the content library functionality, the electronic device 500a automatically presents the information 616 about the content library functionality to the user, which facilitates discovery of that functionality by the user and potentially use of that functionality as well. The image 616c may be a still image, such as a picture, photograph, screen shot, or illustration or a video, such as an animation or other video. If the user were to select either option 616a or 616d to dismiss the information 616, in response to the user's selection, the electronic device 500a would resume presenting a user interface of the content application, such as the user interface illustrated in FIG. 6C.

Figure 6E:
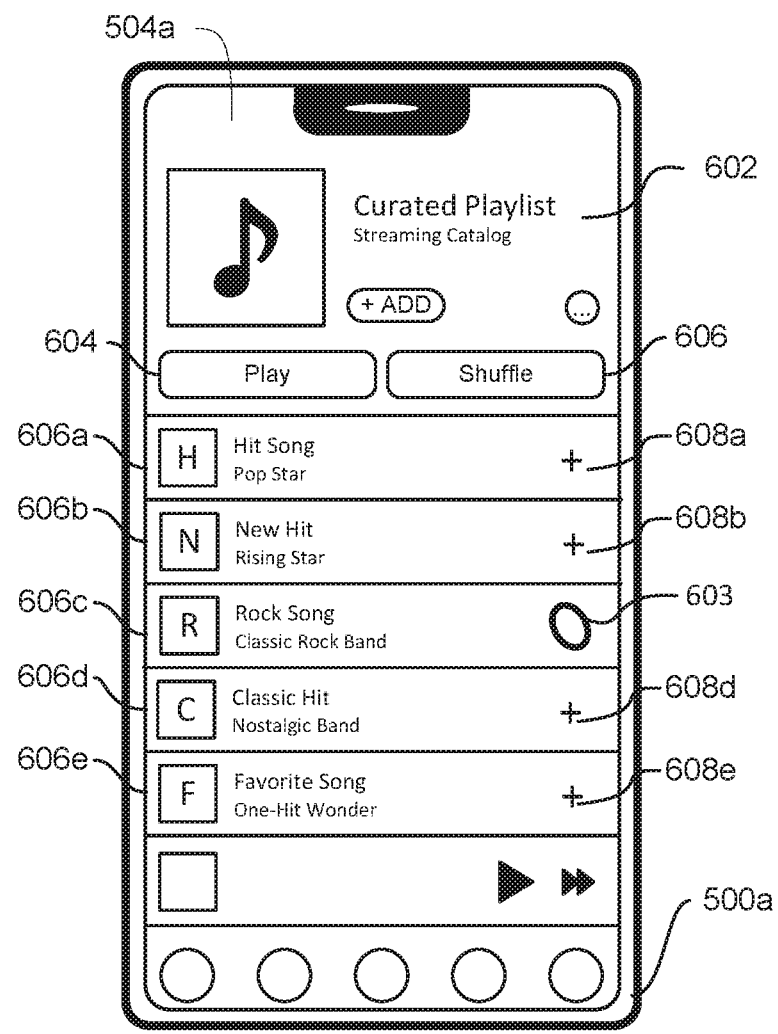
Figure 6F:
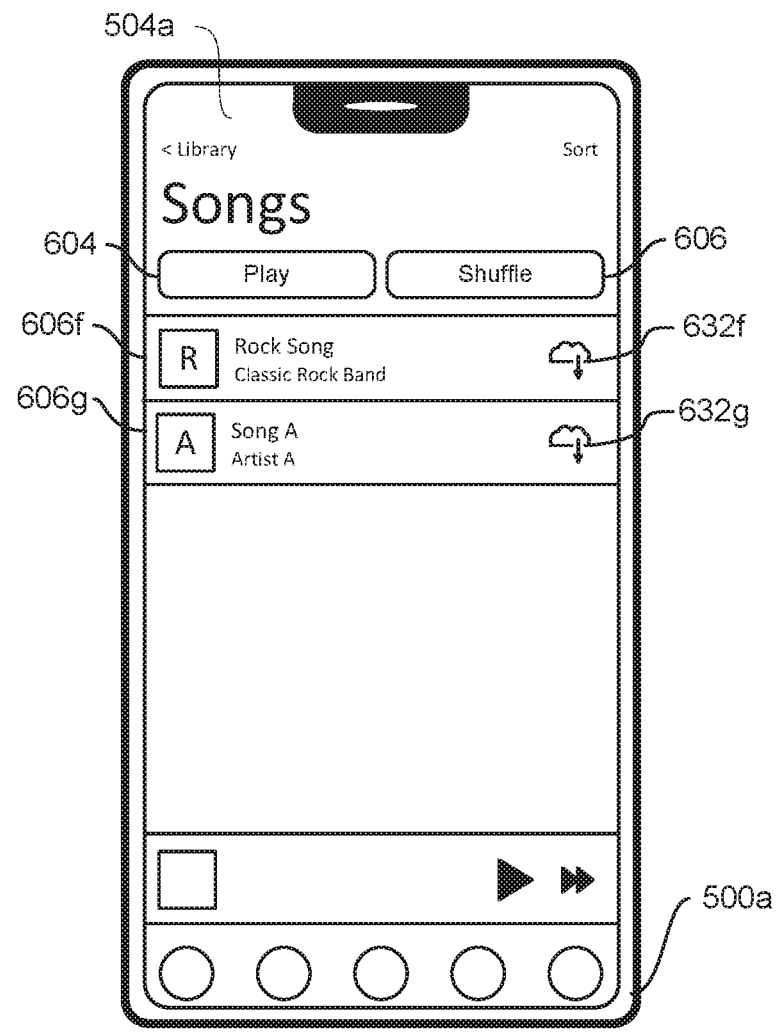

FIGS. 6E-6H illustrate an electronic device presenting information about a streaming content downloading functionality of the content application. In FIG. 6E, the electronic device presents the user interface of the content application that includes a playlist curated by the streaming service. The user selects (e.g., with contact 603) a selectable option to save an item of streaming content 606c to the content library. In response to the user's selection, the item of streaming content 606c will be saved to the content library, allowing the user to locate the item of content from the content library, as shown in FIG. 6F. As an example, information-display criteria for displaying information about a function of the content application are not met at the time the user's selection (e.g., with contact 603) illustrated in FIG. 6E is detected. Thus, the electronic device 500a saves the item of content to the content library without displaying information about functionality of the content application that has not yet been initiated by the user.

FIG. 6F illustrates the content library user interface of the content application. The content library user interface includes a selectable option 604 to play the items of content in the content library and a selectable option 606 to toggle the shuffle playback option. The content library further includes representations 606f-g of items of content in the content library and selectable options 632f-g to download the items of streaming content to the electronic device 500a for offline listening. The items of content in the library include the item of content 606f that the user selected to add to the library in FIG. 6E.

Figure 6G:
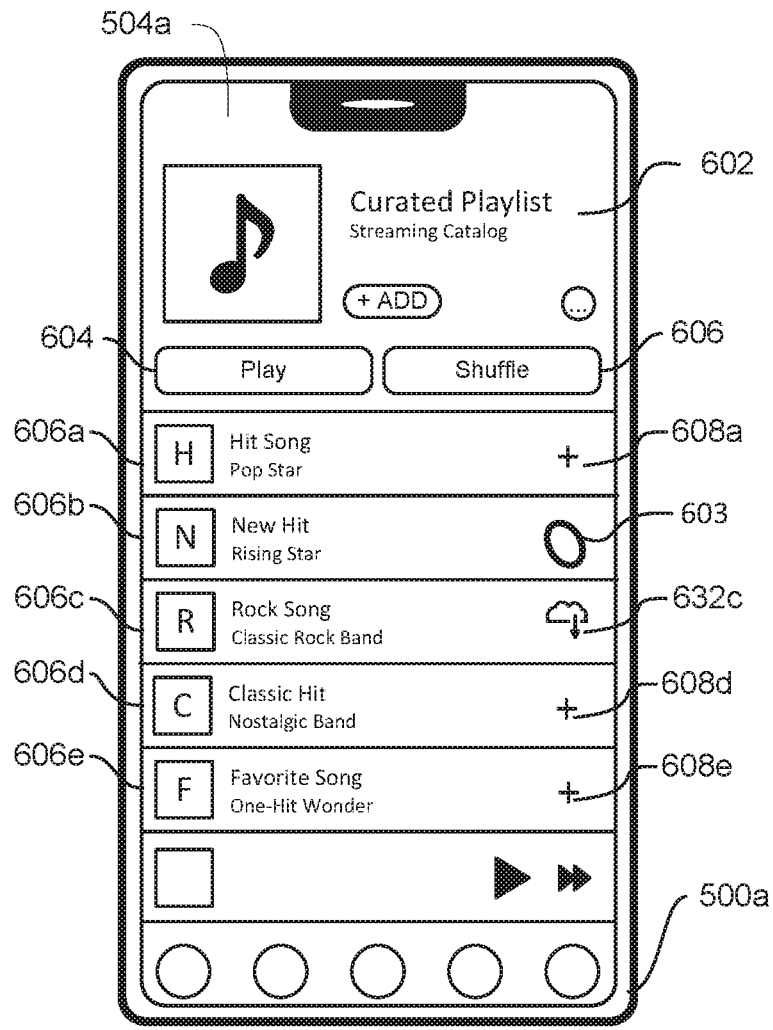

FIG. 6G illustrates the user interface including the curated playlist created by the streaming service. As shown in FIG. 6G, the representation 606c of the item of content that the user saved to their library includes a selectable option 632c to download the item of content to the electronic device 500a for offline playback. The user selects (e.g., with contact 603) an option to add another item of content 606b to the content library. As indicated in FIG. 6G, at the time the contact 603 is detected, the electronic device 500a has determined or determines that the number of items of streaming content in the content library exceeds a predetermined threshold and no items of streaming content have been downloaded to the electronic device 500a. As an example, these conditions satisfy the information-display criteria. Thus, in response to the user's selection, the electronic device 500a saves the item of content 606b to the content library and displays information 618 about downloading items of streaming content as shown in FIG. 6H.

Figure 6H:
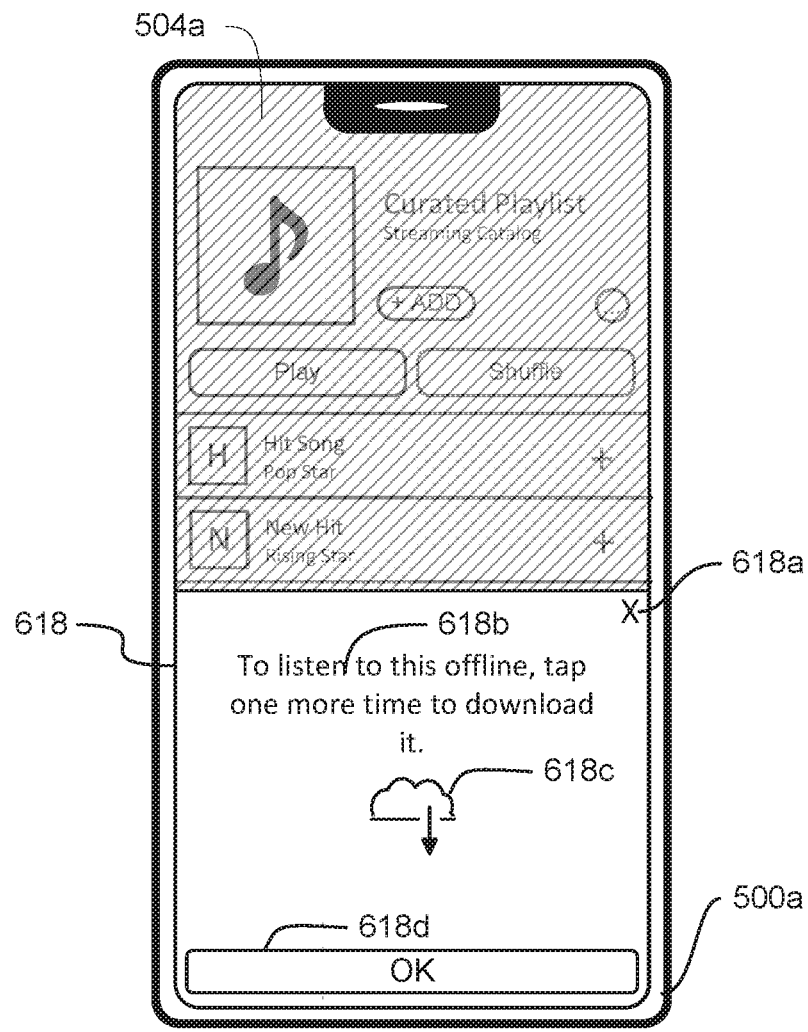

FIG. 6H illustrates the information 618 about the download functionality of the content application. The information 618 is displayed overlaid on the user interface of the content application, which has a modified appearance, such as being greyed out. The information 618 includes a selectable option 618a to dismiss the information 618 about the download functionality of the content application, text 618b describing how to use the download functionality of the content application, an image 618c illustrating the download functionality of the content application, and a selectable option 618d to dismiss the information 618. In this way, because the user has taken certain actions (e.g., saving items of content to the content library) in the content application that are related to the downloading functionality, but has not yet taken advantage of the downloading functionality, the electronic device 500a automatically presents the information 618 about the downloading functionality to the user, which facilitates discovery of that functionality by the user and potentially use of that functionality as well. The image 618c may be a still image, such as a picture, photograph, screen shot, or illustration or a video, such as an animation or other video. If the user were to select either option 618a or 618d to dismiss the information 618, in response to the user's selection, the electronic device 500a would resume presenting a user interface of the content application, such as the user interface illustrated in FIG. 6G.

Figure 6I:
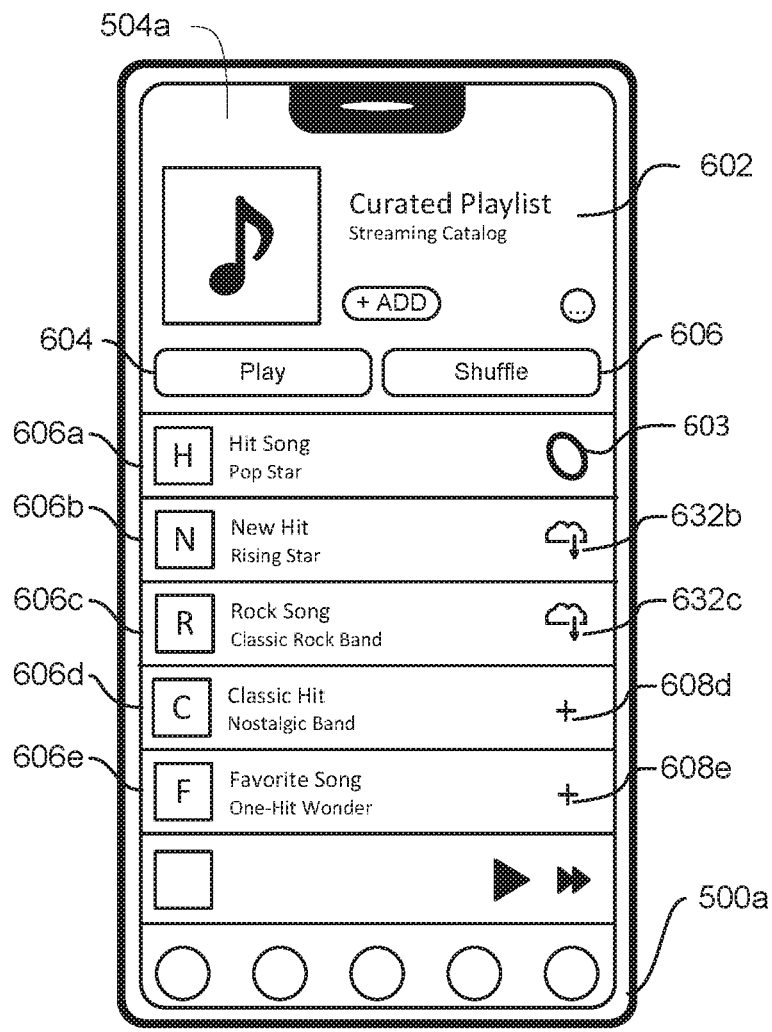
Figure 6J:
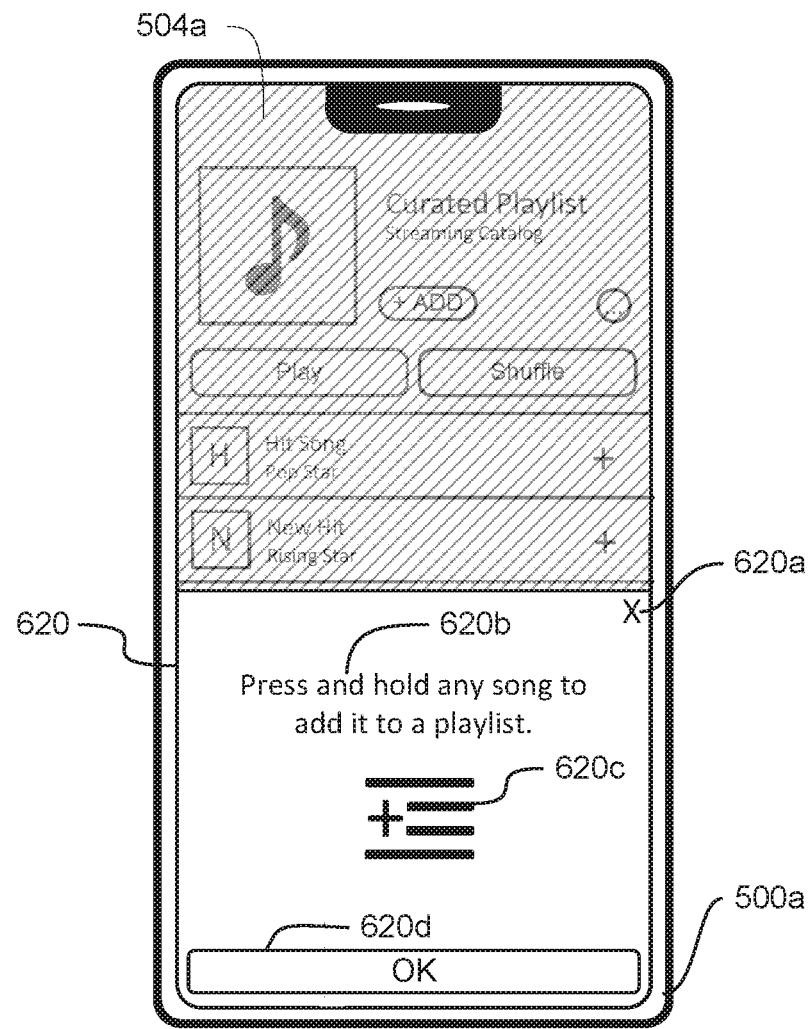

FIGS. 6I-6J illustrate an electronic device 500a presenting information about the playlist functionality of the content application. In FIG. 6I, the user selects (e.g., with contact 603) an option to save an item of streaming content 606a to the content library. As indicated in FIG. 6I, at the time the contact 603 is detected, the electronic device 500a has determined or determines that the number of items of streaming content in the content library exceeds a predetermined threshold and the content application does not include any playlists that include streaming content. As an example, these conditions satisfy the information-display criteria. Thus, in response to the user's selection, the electronic device 500a saves the item of streaming content 606a to the content library and displays information 620 about the playlist functionality of the content application as shown in FIG. 6J.

FIG. 6J illustrates the information 620 about the playlist functionality of the content application. The information 620 is displayed overlaid on the user interface of the content application, which has a modified appearance, such as being greyed out. The information 620 includes a selectable option 620a to dismiss the information 620 about the playlist functionality of the content application, text 620b describing how to use the playlist functionality of the content application, an image 620c illustrating the playlist functionality of the content application, and a selectable option 620d to dismiss the information 620. In this way, because the user has taken certain actions (e.g., saving items of content to the content library) in the content application that are related to the playlist functionality, but has not yet taken advantage of the playlist functionality, the electronic device 500a automatically presents the information 620 about the playlist functionality to the user, which facilitates discovery of that functionality by the user and potentially use of that functionality as well. The image 620c may be a still image, such as a picture, photograph, screen shot, or illustration or a video, such as an animation or other video. If the user were to select either option 620a or 620d to dismiss the information 620, in response to the user's selection, the electronic device 500a would resume presenting a user interface of the content application, such as the user interface illustrated in FIG. 6I.

Figure 6K:
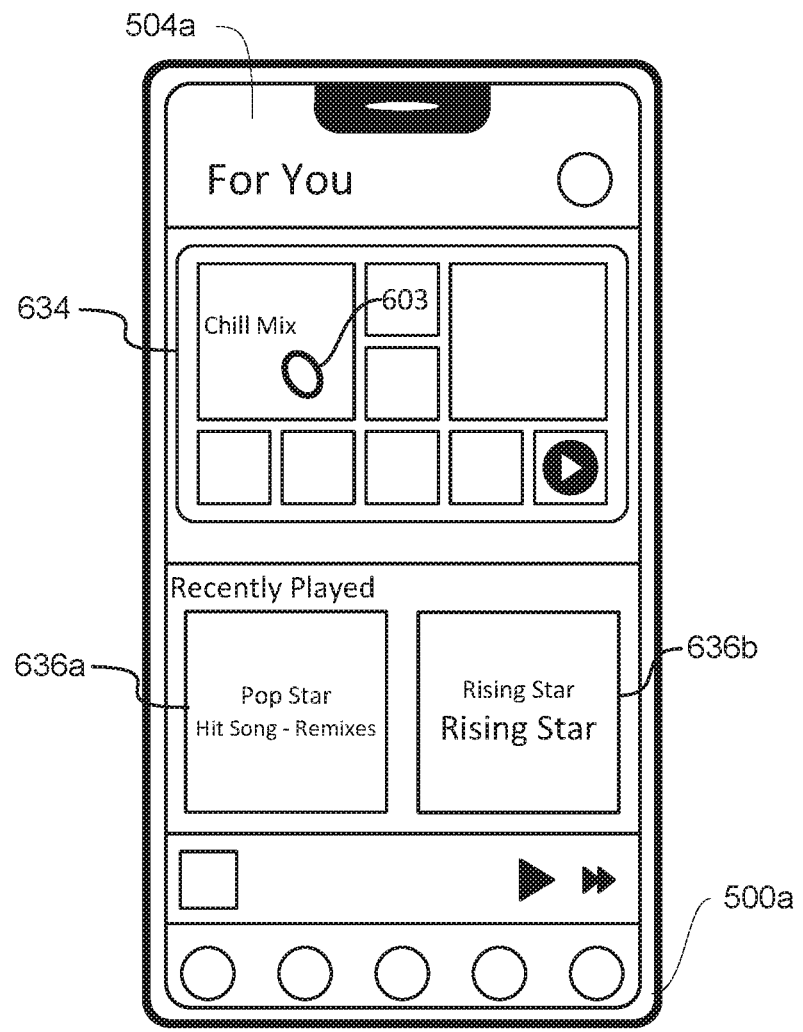
Figure 6L:
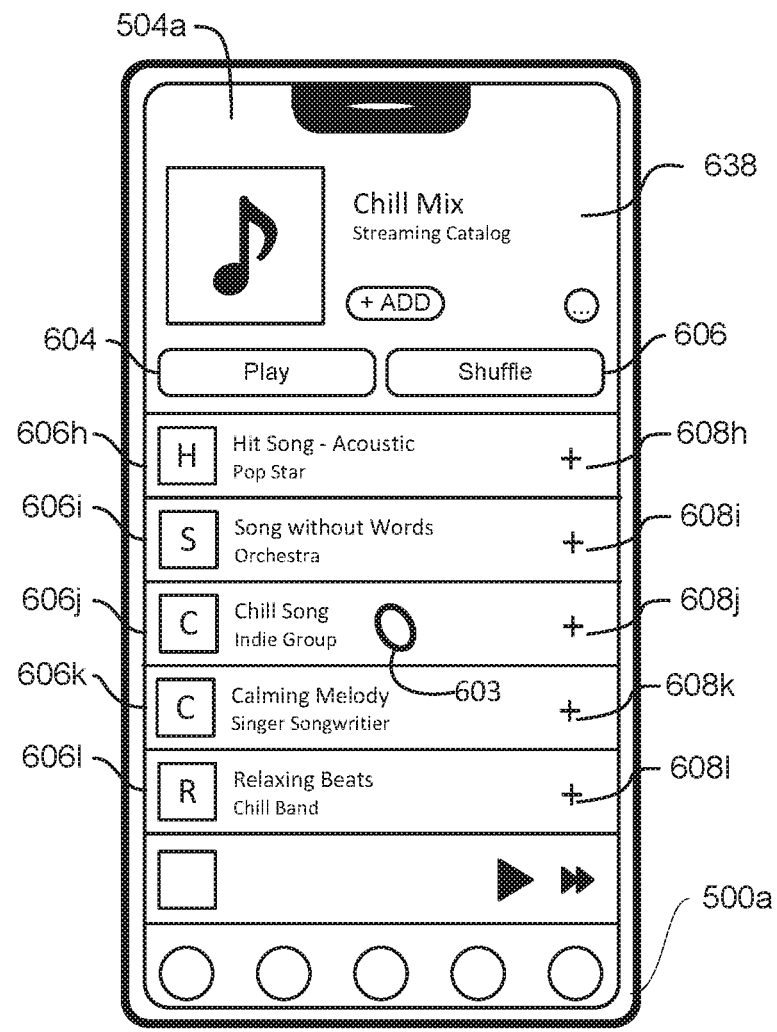

FIGS. 6K-6O illustrate the electronic device 500a presenting information about a lyrics functionality of the content application. In FIG. 6K, the electronic device 500a presents a user interface of the content application that includes recommendations based on the user's content consumption history. The user interface includes a representation 634 of a customized playlist and representations 636a and 636b of content items that were recently played by the user using the content application. As shown in FIG. 6K, the user selects (e.g., with contact 603) the representation 634 of the customized playlist. In response to the user's selection, the electronic device 500 presents the customized playlist, as shown in FIG. 6L.

FIG. 6L illustrates a content application user interface including information about a playlist. The user interface includes an indication 638 of the playlist, a selectable option 604 to play the playlist, a selectable option 606 to toggle a shuffle playback setting of the content application, a plurality of representations 606h-1 of items of content included in the playlist, and a plurality of selectable options 608h-1 that, when selected, save the respective item of content to the content library of the content application.

As shown in FIG. 6L, the user selects (e.g., with contact 603) one of the representations 606j of an item of streaming content to play the item of content. As indicated in FIG. 6L, at the time the contact 603 is detected, the electronic device 500a has determined or determines that the number of application usage-sessions exceeds a predetermined threshold, a number of page views in the content application during the current session exceeds a predetermined threshold, and the user has never initiated the lyrics functionality of the content application. As an example, these conditions satisfy the information-display criteria. Thus, in response to the user's selection, the electronic device 500a plays the item of content 606j and displays information 622 about the lyrics functionality of the content application as shown in FIG. 6M.

Figure 6M:
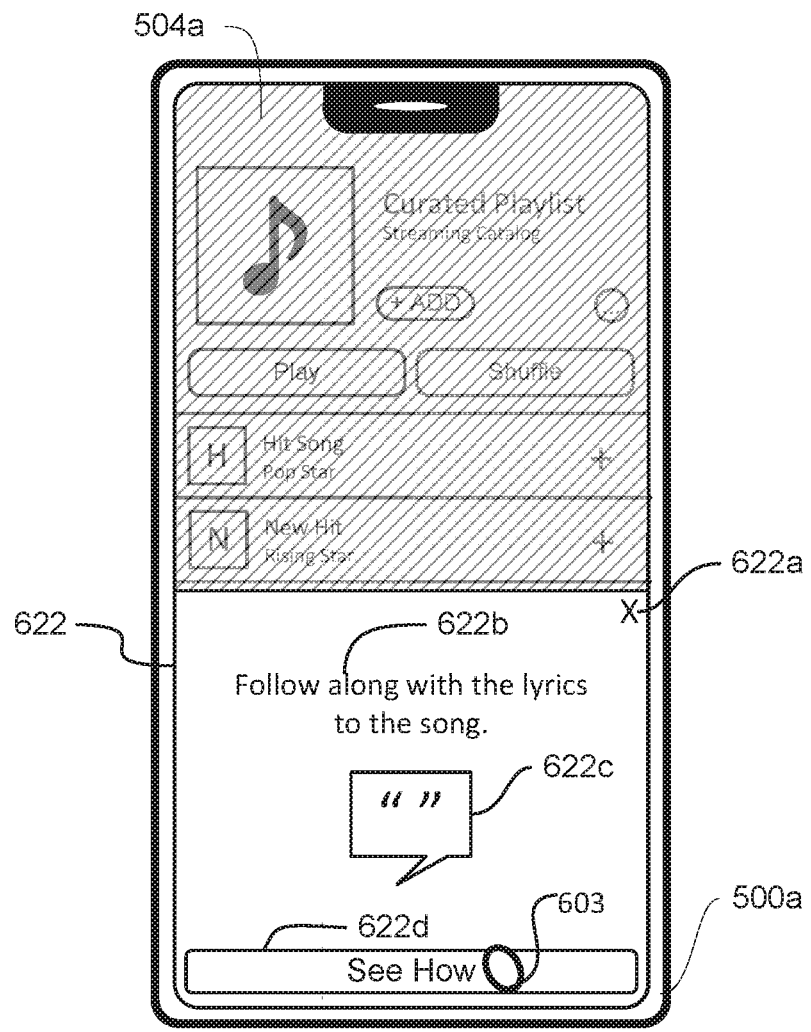

FIG. 6M illustrates the information 622 about the lyrics functionality of the content application. The information 622 is displayed overlaid on the user interface of the content application, which has a modified appearance, such as being greyed out. The information 622 includes a selectable option 622a to dismiss the information 622 about the lyrics functionality of the content application, text 622b describing the lyrics functionality of the content application, an image 622c illustrating the lyrics functionality of the content application, and a selectable option 622d to dismiss the information 622 about the lyrics functionality of the content application and to present a user interface for viewing the lyrics of an item of content. In some embodiments, instead of displaying a selectable option 622d to dismiss the information 622 and present a user interface for viewing the lyrics of the item of content, a selectable option is displayed in information 622 that, when selected, causes the electronic device 500a to dismiss the information 622 without presenting the user interface for viewing the lyrics of the item of content. In this way, because the user has taken certain actions (e.g., browsing the features and user interfaces of the content application) in the content application that are related to the lyrics functionality, but has not yet taken advantage of the lyrics functionality, the electronic device 500a automatically presents the information 622 about the lyrics functionality to the user, which facilitates discovery of that functionality by the user and potentially use of that functionality as well. The image 62s2c may be a still image, such as a picture, photograph, screen shot, or illustration or a video, such as an animation or other video. If the user were to select option 622a to dismiss the information 622, in response to the user's selection, the electronic device 500a would resume presenting a user interface of the content application, such as the user interface illustrated in FIG. 6L. As shown in FIG. 6M, the user selects (e.g., with contact 603) the option 622d to dismiss the information 622 about the lyrics functionality of the content application and to present a user interface for viewing the lyrics of an item of content, as shown in FIGS. 6N-6O.

Figure 6N:
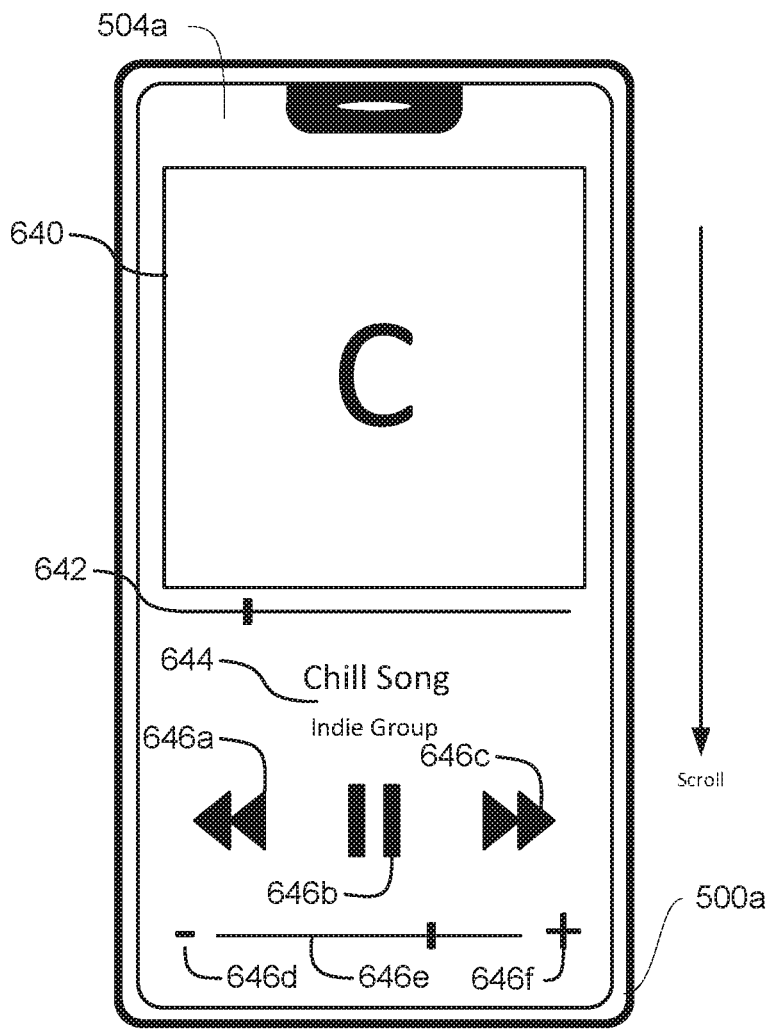

In response to the user's selection in FIG. 6M, the electronic device 500a presents the user interface illustrated in FIG. 6N. The user interface is a now playing user interface of the content application that includes information about the item of content currently being played using the content application. The user interface includes artwork 640 associated with the item of content, a playback scrubber bar 642, an indication 644 of the title of the item of content, a skip back option 646a, a pause option 646b, a skip forward option 646c, a volume down option 646d, a volume bar 646e, and a volume up option 646f. As indicated in FIG. 6N, the electronic device 500a automatically scrolls the now playing user interface down to the lyrics section of the now playing user interface, as illustrated in FIG. 6O.

Figure 6O:
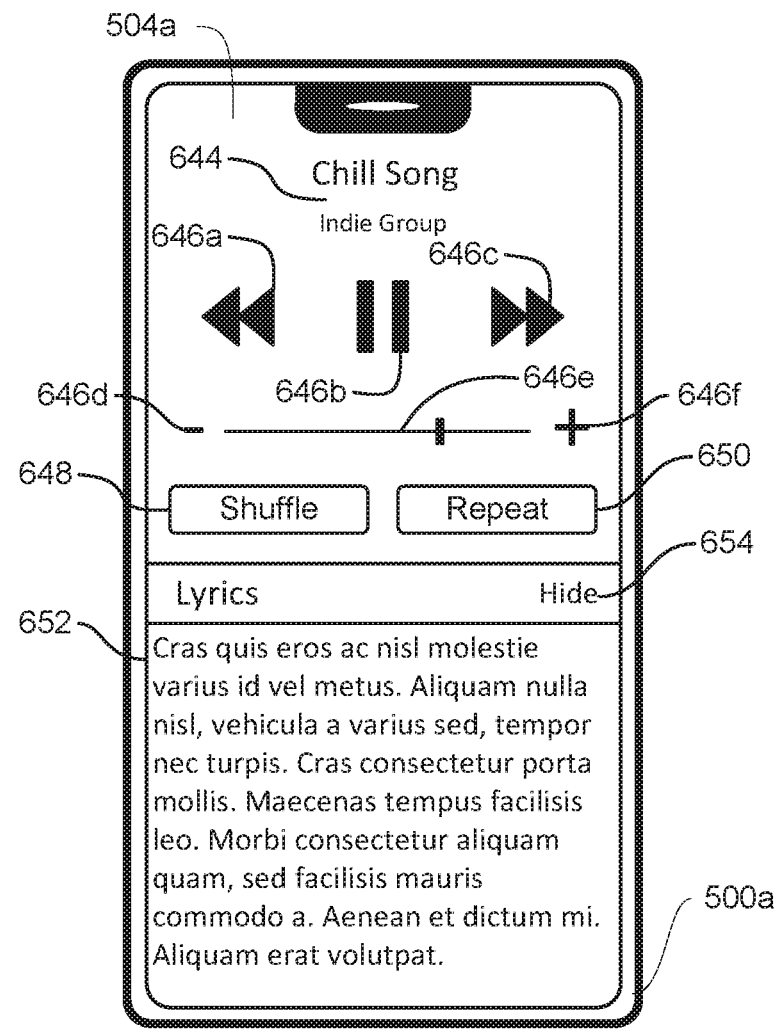

FIG. 6O illustrates the now playing user interface after the electronic device 500a scrolls the user interface. Scrolling the now playing user interface reveals an option 648 to toggle a shuffle playback setting, an option 650 to toggle a repeat playback setting, and the lyrics 652 of the item of content. The lyrics 652 are presented near an option 654 to hide the lyrics. When the option 654 to hide the lyrics is activated, the hide option 654 is replaced with an option to show the lyrics (e.g., a show option). In some examples, the lyrics 652 are initially hidden when the electronic device 500a scrolls the now playing user interface and the electronic device 500a animates selection of the show lyrics option to expand and display the lyrics, as shown in FIG. 6O.

Figure 6P:
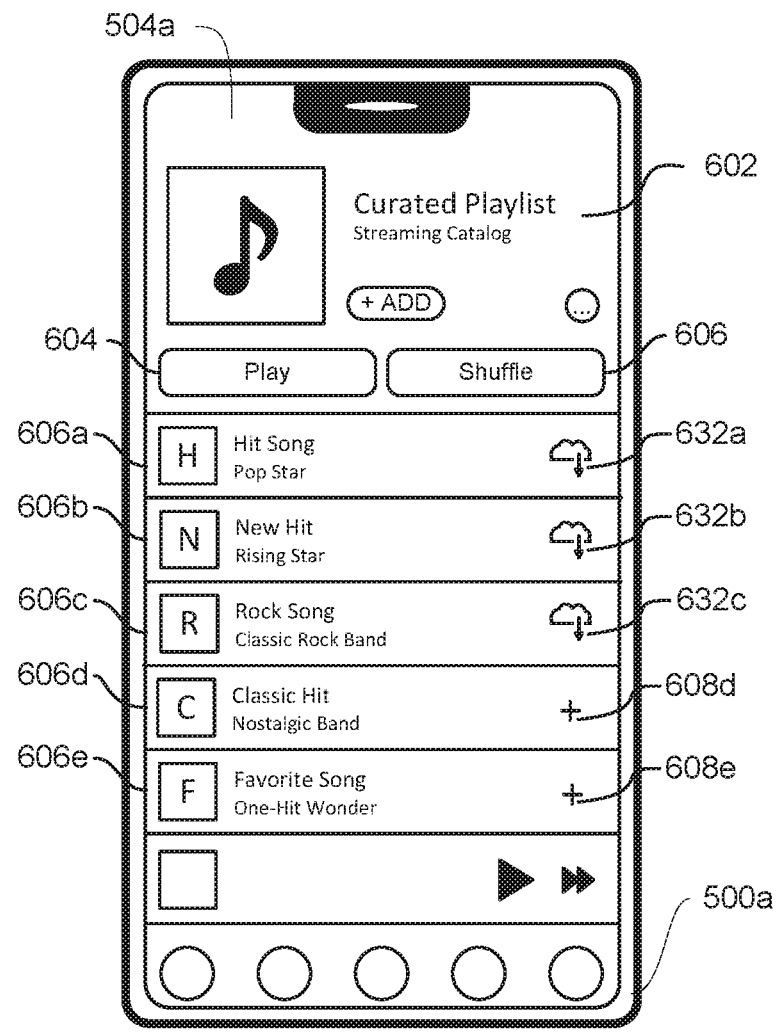
Figure 6Q:
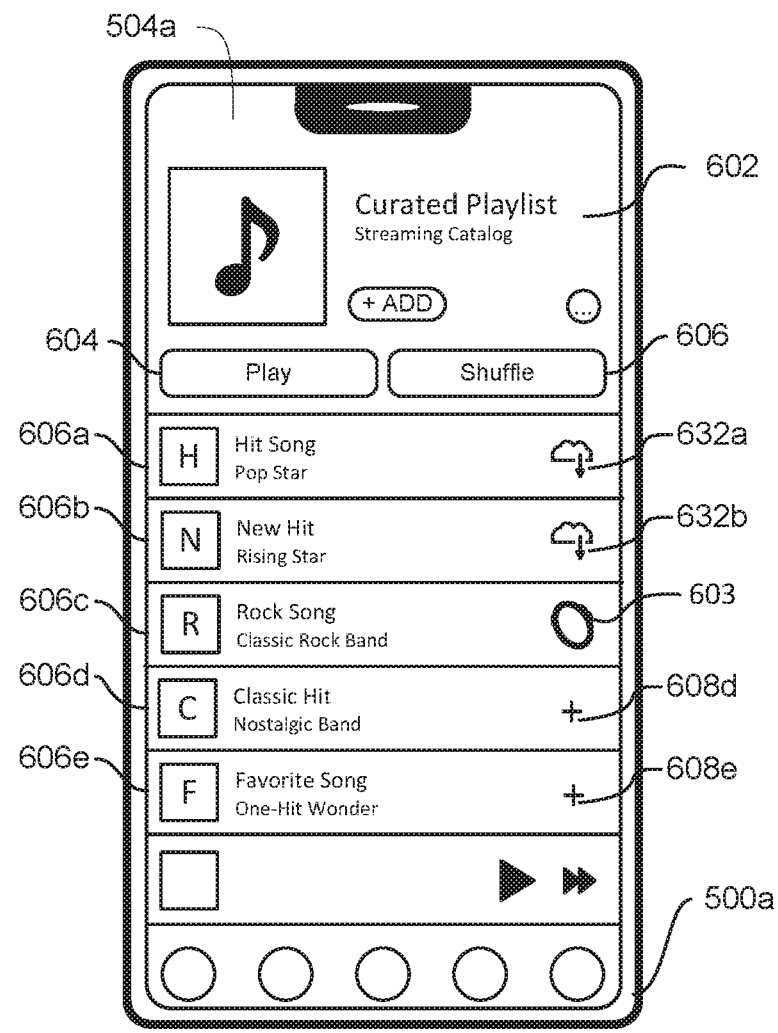

FIGS. 6P-6V illustrate the electronic device 500a presenting information about the automatic downloads functionality of the content application. In FIGS. 6P-Q, the electronic device 500a presents the playlist user interface of the content application. The playlist includes a plurality of representations 606a-e of items of content. Some of the items of content 606a-c have been saved to the content library of the content application. The representations 606a-c of these items of content include selectable options 632a-c for downloading the respective item of content to device 500a.

As shown in FIG. 6Q, the user selects (e.g., with contact 603) one of the options for downloading an item of content 606c. In response to the user's selection, the item of content is saved to the electronic device 500a for offline playback. As an example, information-display criteria for displaying information about a function of the content application are not met at the time the user's selection (e.g., with contact 603) illustrated in FIG. 6Q is detected. Thus, the electronic device 500a downloads the item of content 606c without displaying information about functionality of the content application that has not yet been initiated by the user.

Figure 6R:
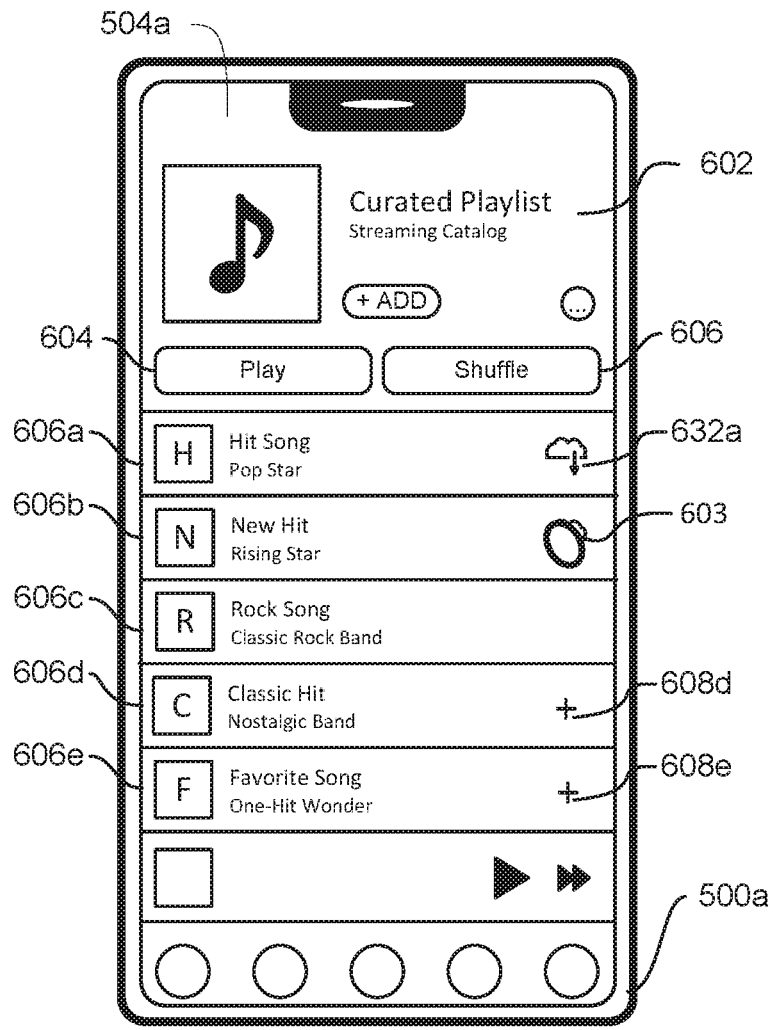
Figure 6S:
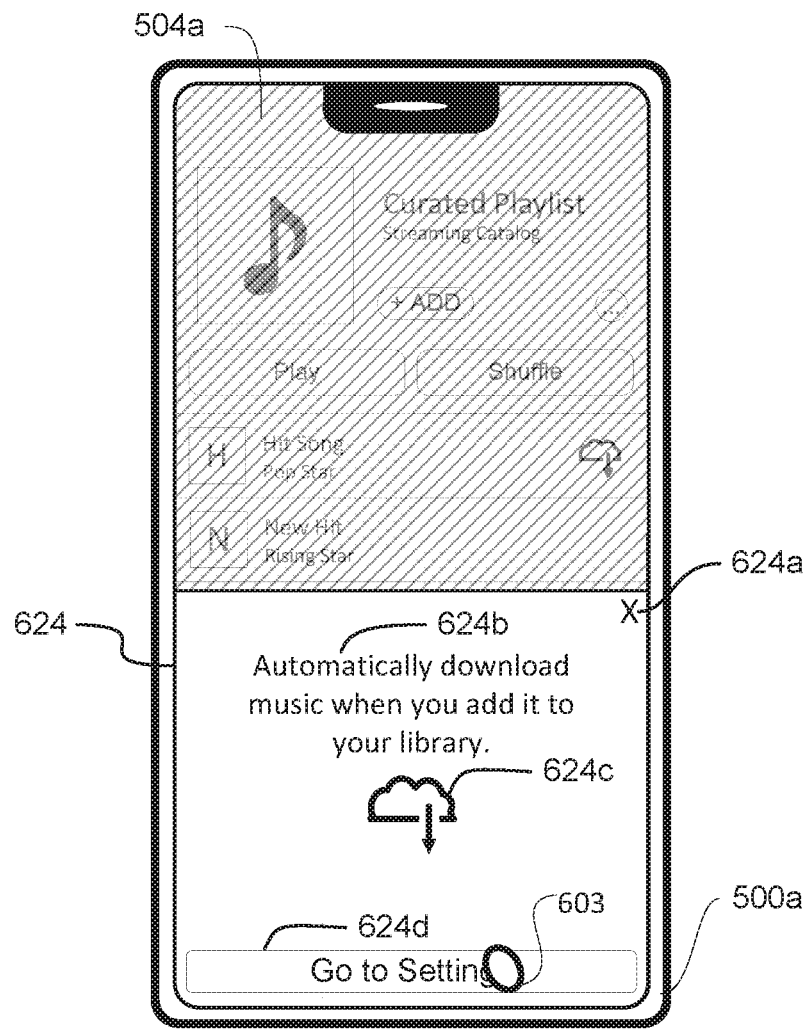

In FIG. 6R, the user selects (e.g., with contact 603) one of the options for downloading an item of content 606b. As indicated in FIG. 6R, at the time the contact 603 is detected, the electronic device 500a has determined or determines that the number of items of streaming content that have been downloaded exceeds a predetermined threshold and the automatic downloads setting of the content application has not been enabled. As an example, these conditions satisfy the information-display criteria. Thus, in response to the user's selection, the electronic device 500a downloads the item of content 606b and displays information 624 about the automatic downloads functionality of the content application as shown in FIG. 6S. The automatic downloads setting is optionally a setting that causes the content application to automatically download items of streaming content to the electronic device 500a for offline playback when the items of content are saved to the content library of the content application.

FIG. 6S illustrates the information 624 about the automatic downloading functionality of the content application. The information 624 is displayed overlaid on the user interface of the content application, which has a modified appearance, such as being greyed out. The information 624 includes a selectable option 624a to dismiss the information 624 about the automatic downloading functionality of the content application, text 624b describing the automatic downloading functionality of the content application, an image 624c illustrating the automatic downloading functionality of the content application, and a selectable option 624d to dismiss the information 624 and present a settings user interface. In some embodiments, instead of displaying the selectable option 624d to dismiss the information 624 and present the settings user interface, the electronic device displays a selectable option in information 624 that, when selected, causes the electronic device 500a to activate the automatic downloading functionality without displaying the settings user interface and a selectable option in information 624 that, when selected, causes the electronic device 500a to dismiss the information 624 and display the user interface that was previously displayed (e.g., the user interface in FIG. 6R) without activating the automatic downloading functionality. In this way, because the user has taken certain actions (e.g., downloading a plurality of items of streaming content for offline playback) in the content application that are related to the automatic downloading functionality, but has not yet taken advantage of the automatic downloading functionality, the electronic device 500a automatically presents the information 624 about the automatic downloading functionality to the user, which facilitates discovery of that functionality by the user and potentially use of that functionality as well. The image 624c may be a still image, such as a picture, photograph, screen shot, or illustration or a video, such as an animation or other video. If the user were to select option 624*a* to dismiss the information 624 in response to the user's selection, the electronic device 500*a* would resume presenting a user interface of the content application, such as the user interface illustrated in FIG. 6R. As shown in FIG. 6S, the user selects (e.g., with contact 603) the option 624*d* to present the settings user interface, as will be shown in FIG. 6T.

Figure 6T:
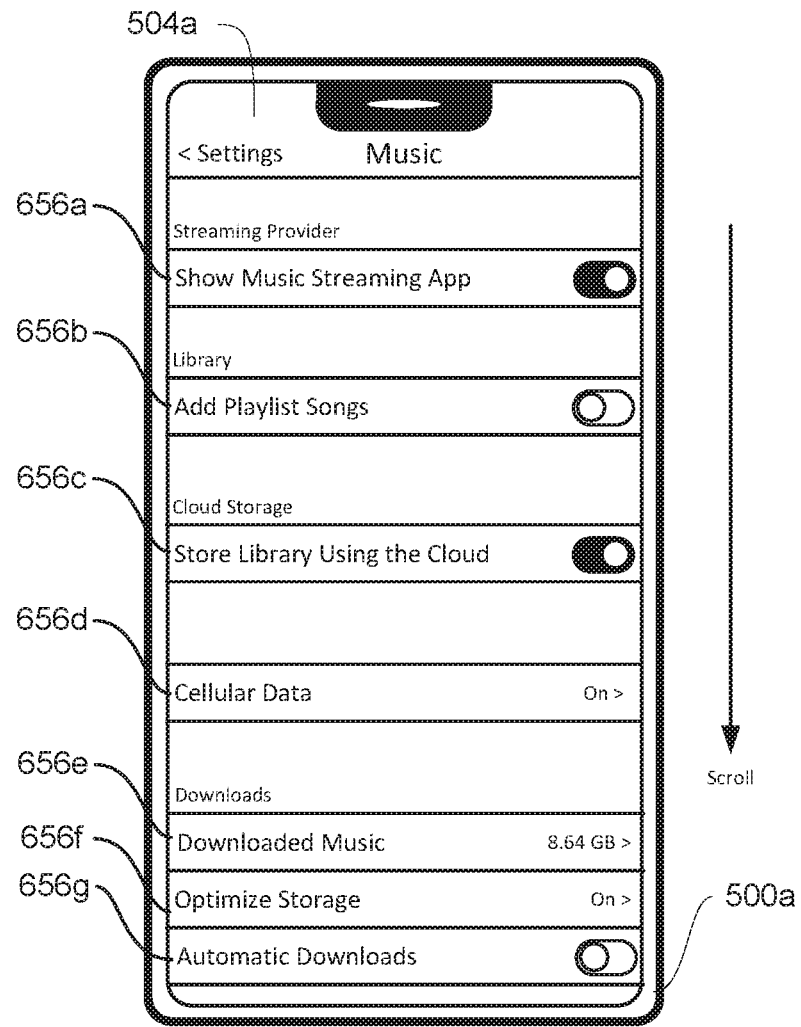

FIG. 6T illustrates the electronic device 500*a* presenting a settings user interface, either of the content application or of the operating system of the device 500*a* (e.g., a settings user interface outside of the content application). The settings user interface includes a plurality of selectable options 656*a-g* for controlling various settings of the content application. The electronic device 500*a* automatically scrolls the settings user interface down to scroll to the automatic downloads setting 656*g*. Although the automatic downloads setting 656*g* is visible in FIG. 6T, in some embodiments, the automatic downloads setting 656*g* is not initially visible until the electronic device 500*a* scrolls the settings user interface.

Figure 6U:
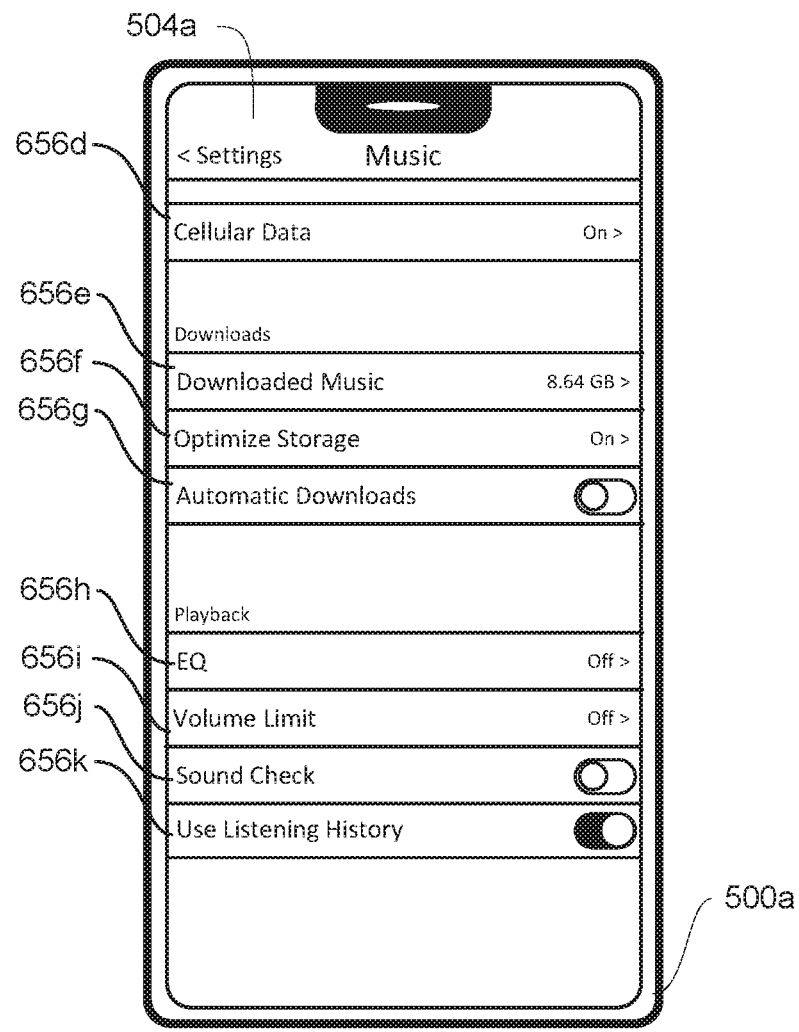

FIG. 6U illustrates the electronic device 500*a* presenting the settings user interface after device 500*a* automatically scrolled the settings user interface. The automatic downloads setting 656*g* is now towards the center of the settings user interface, allowing the user to see where in the list of settings the automatic downloads setting 646*g* is located, and if desired, change the automatic downloads setting 646*g* by toggling its respective control in the settings user interface.

Figure 6V:
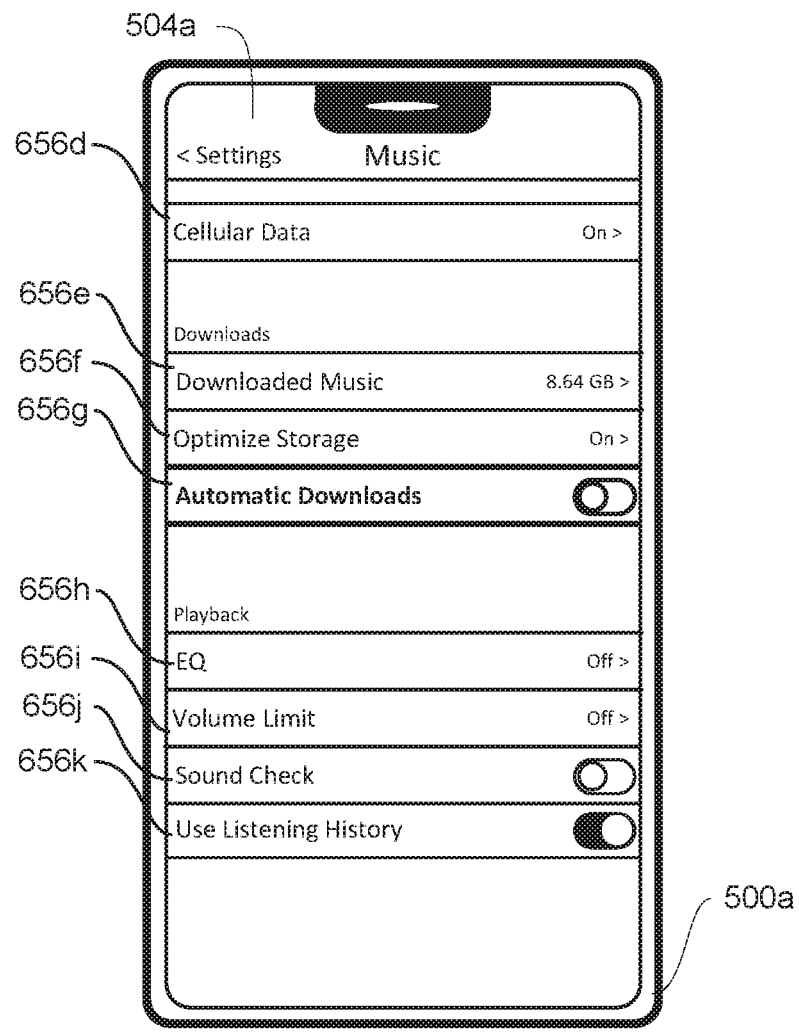

FIG. 6V illustrates the electronic device 500*a* highlighting the automatic downloads setting 656*g* in the settings user interface. As an example, the electronic device 500*a* presents the settings user interface including the automatic downloads setting 656*g*, which has a bolded appearance. Other forms of visual emphasis such as color change, animation, and the like are additionally or alternatively possible.

FIGS. 6W-6Z illustrate an electronic device 500*b* presenting information about a song station functionality of the content application. Electronic device 500*b* is a tablet or a similar electronic device. Electronic device 500*b* is capable of concurrently presenting user interfaces of multiple applications by splitting the display 504*b* into a section for each user interface.

Figure 6W:
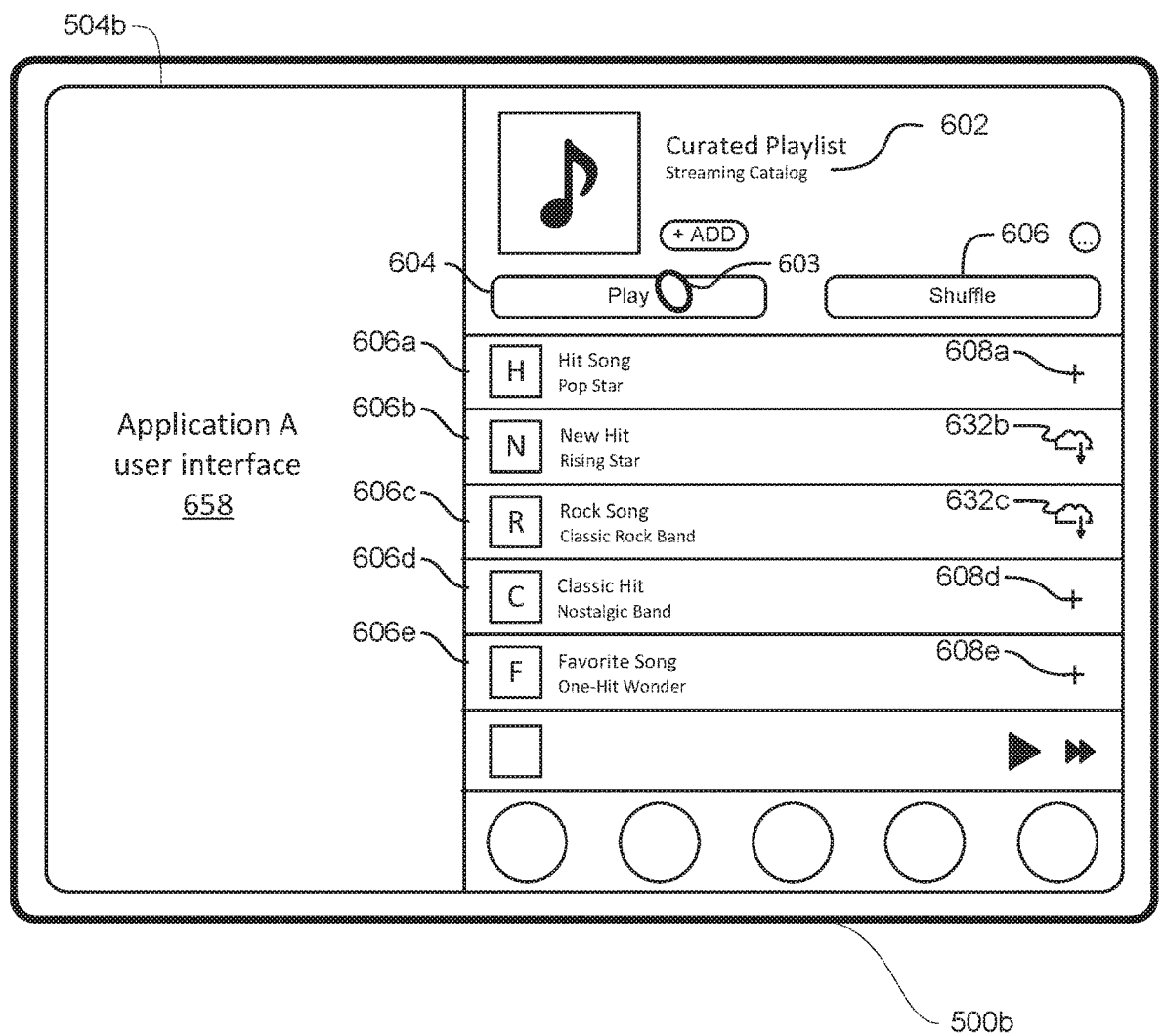

FIG. 6W illustrates an electronic device 500*b* presenting a playlist user interface of the content application on one part of the display 504*b* and the user interface 658 of another application on the other part of the display. As shown in FIG. 6W, the content application user interface occupies more space on display 504*b* than the space occupied by the other application user interface 658. The playlist user interface includes an indication 602 of the title of the playlist, a selectable option 604 to play the playlist, a selectable option 606 to toggle a shuffle playback setting of the content application, and a plurality of representations 606*a-e* of items of content in the playlist. Some of the representations 606*b-c* of items of content include selectable options 632*b-c* to download the respective item of content and the rest of the representations 606*a* and 606*d-e* include selectable options 608*a* and 608*d-e* to save the respective item of content to the content library. As shown in FIG. 6W, the user selects (e.g., with contact 603) the option 604 to play the playlist. In response to the user's selection, the electronic device 500*b* plays the playlist.

Figure 6X:
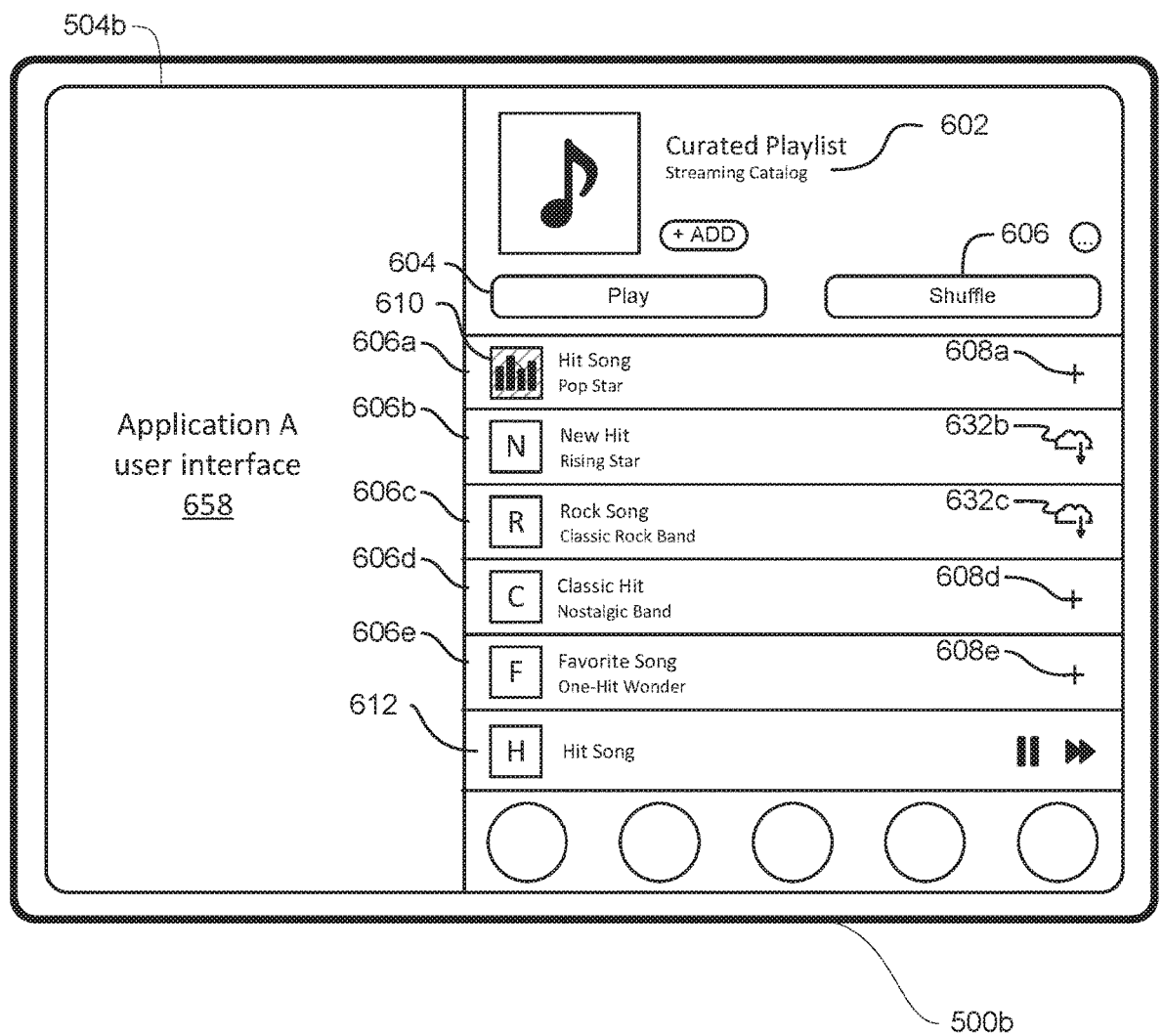

FIG. 6X illustrates the electronic device 500*b* as it begins to play the playlist in response to the user's selection in FIG. 6W. The electronic device 500*b* presents a playback indication 610 indicating which item of content in the playlist it is currently playing and a playback information indication 612 that indicates the title of the content that is currently playing with the content application.

Figure 6Y:
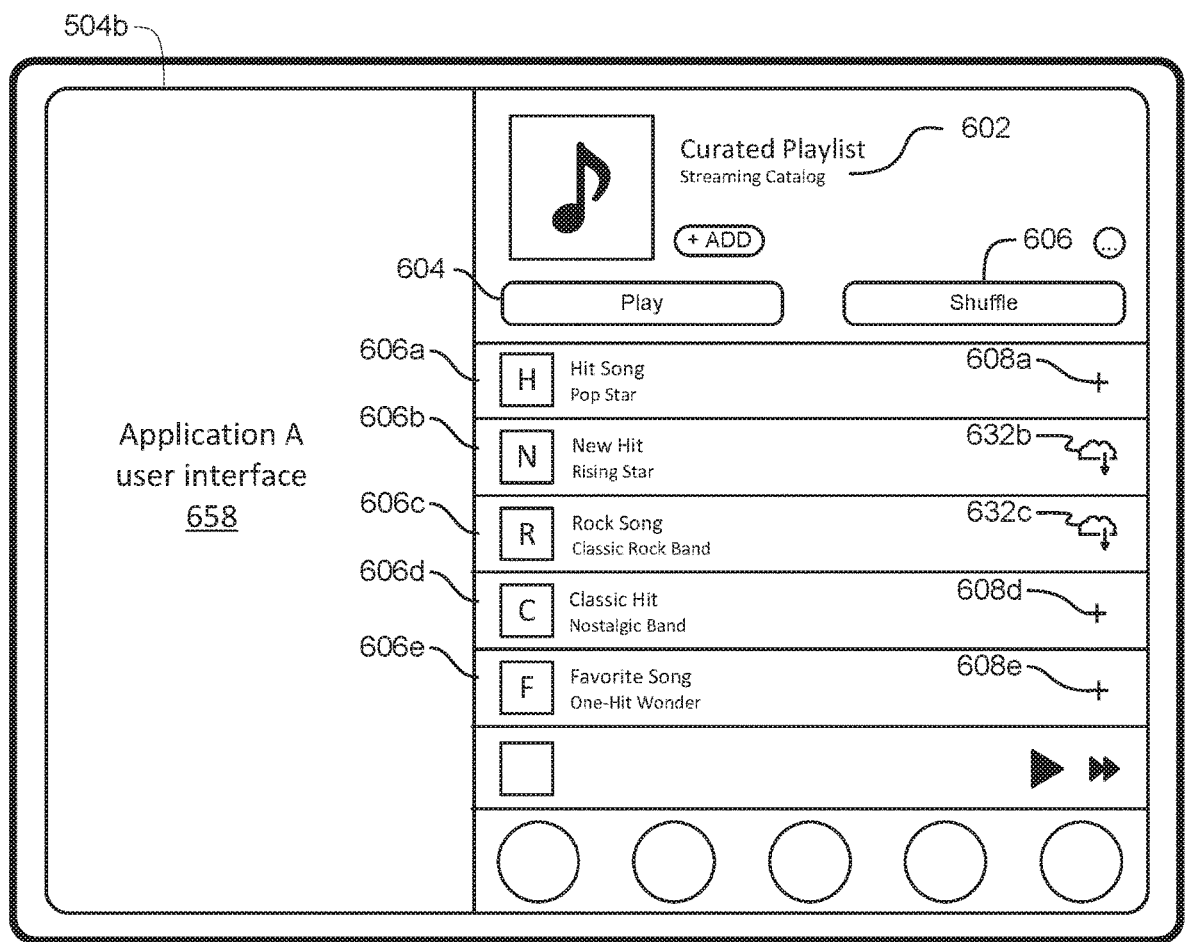
Figure 6Z:
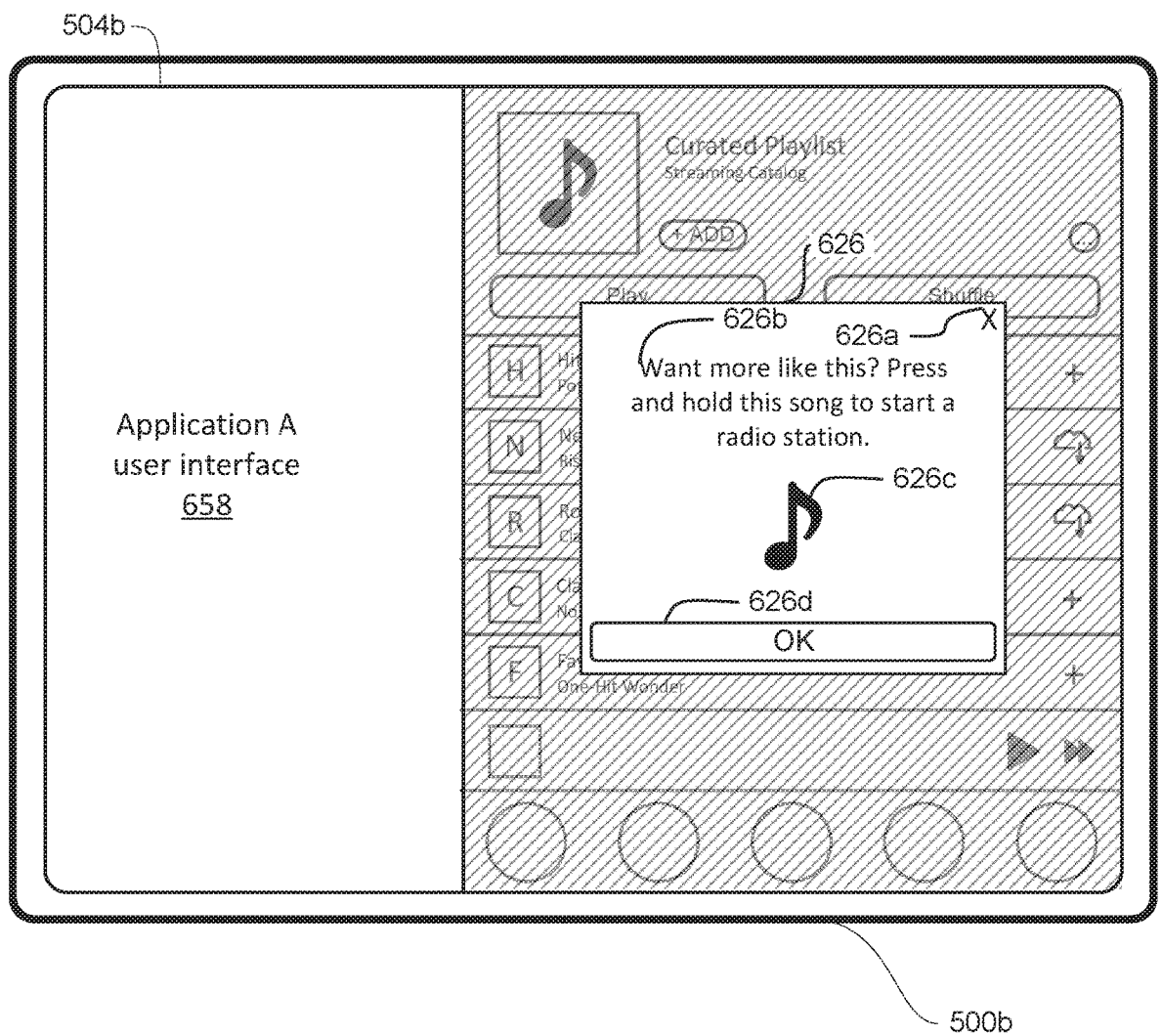
Figure 6A:
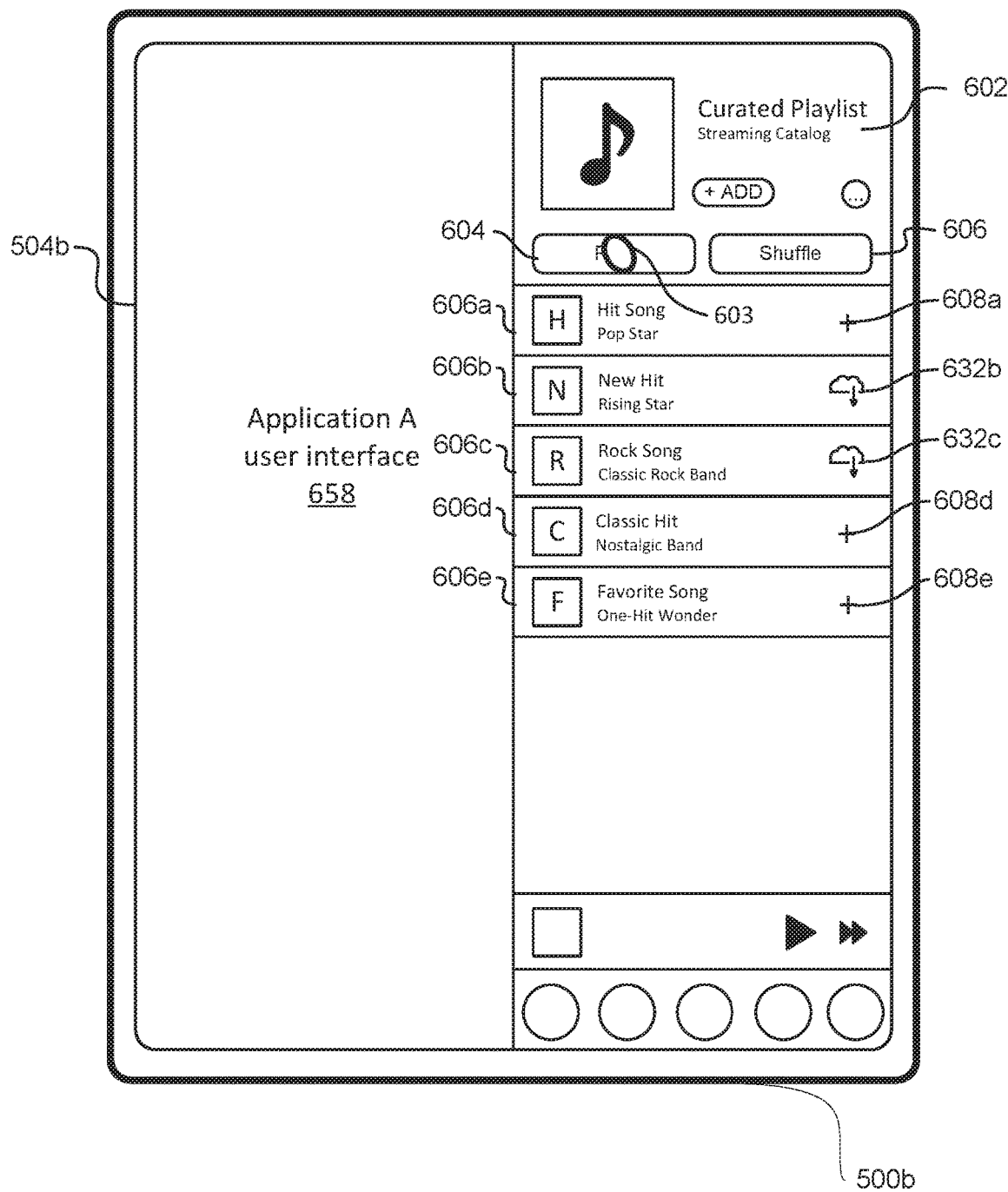
Figure 6B:
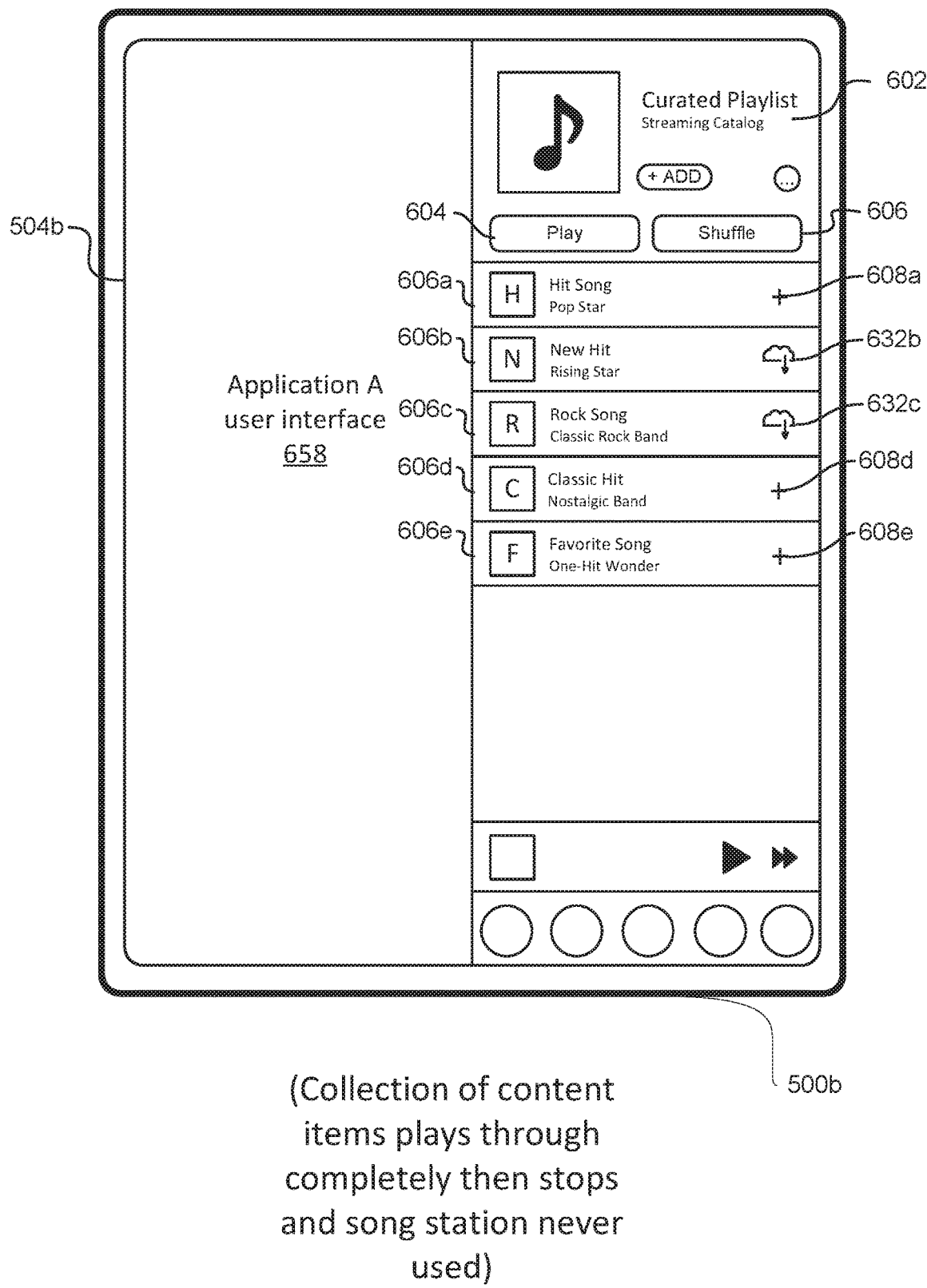
Figure 6C:
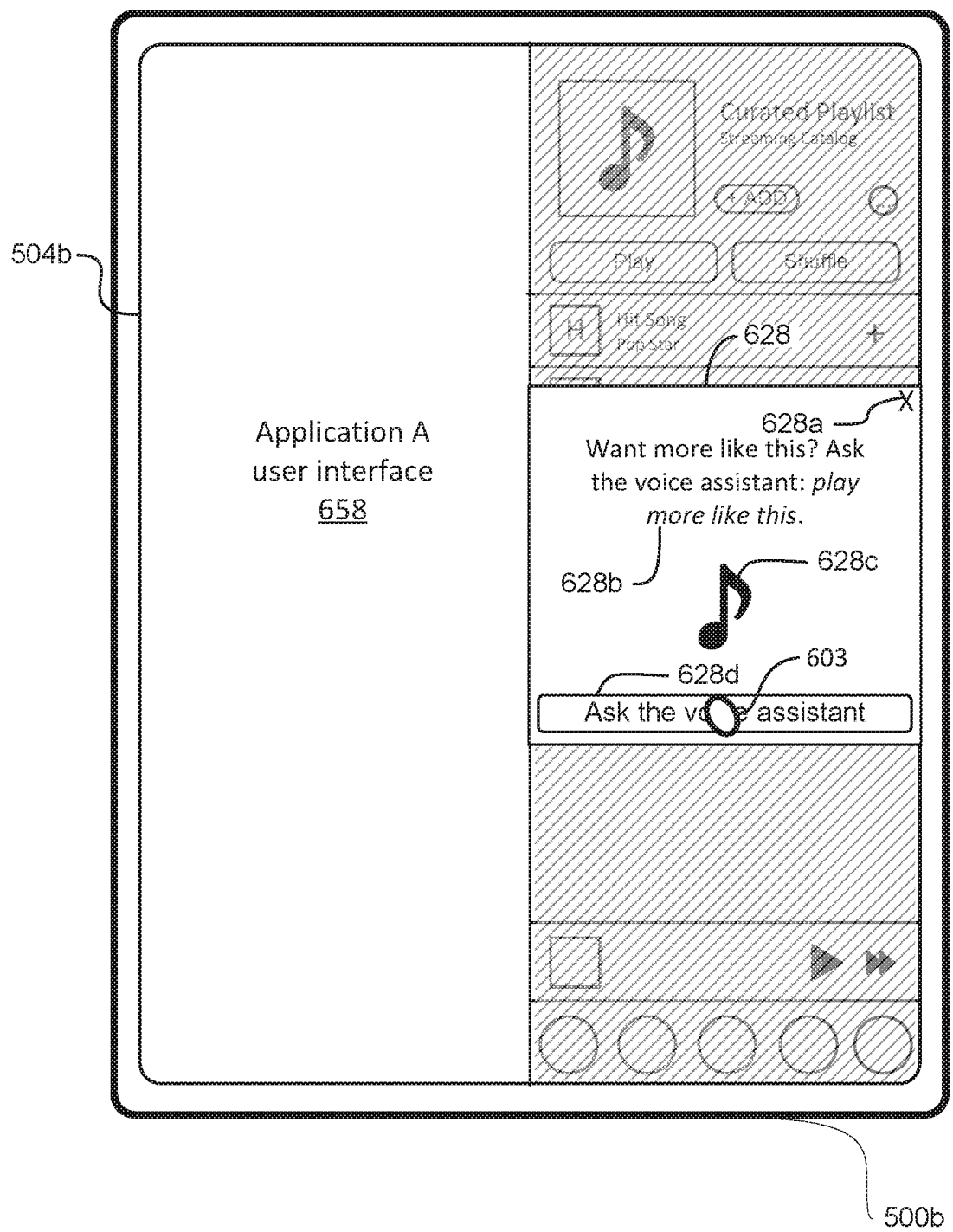
Figure 6D:
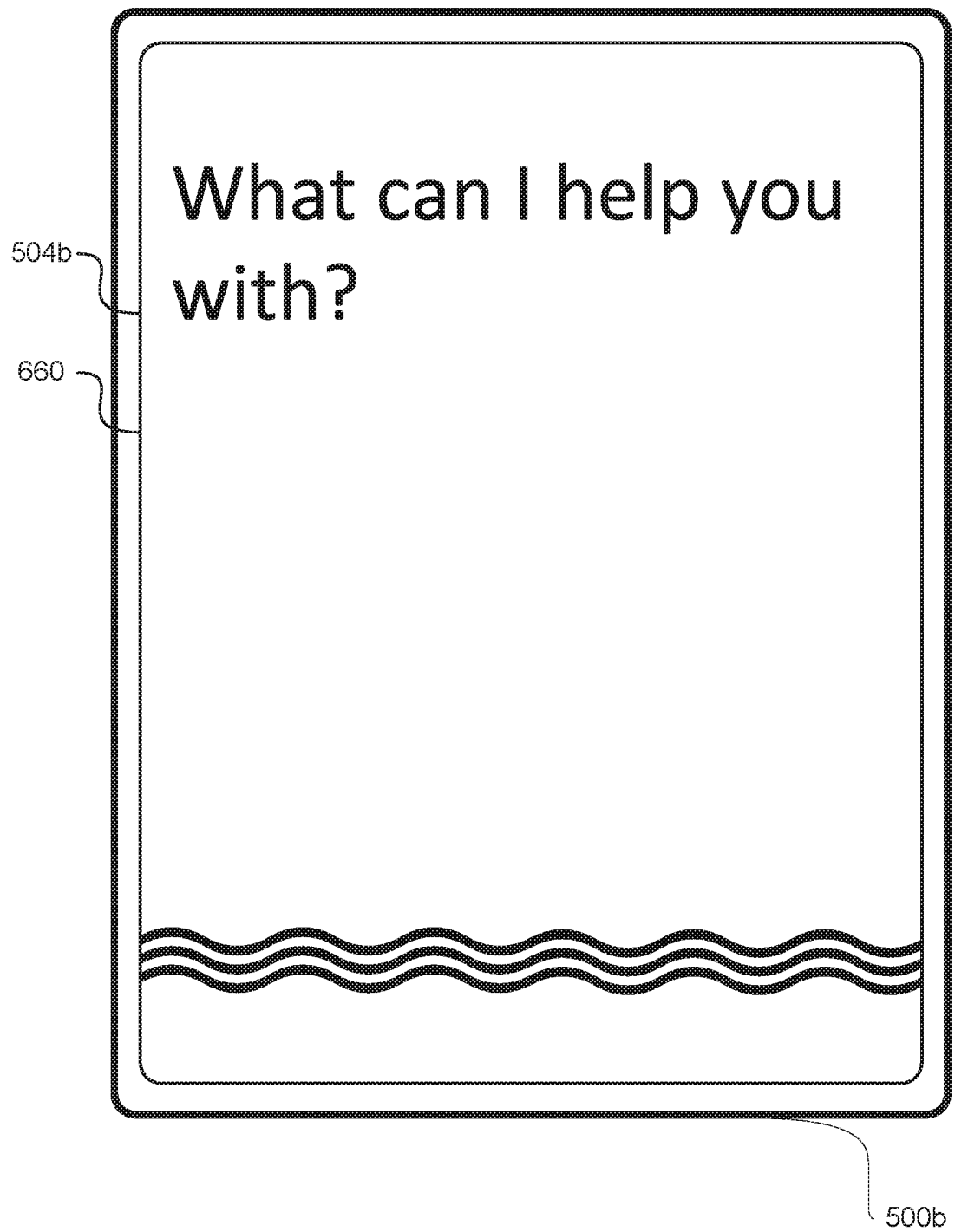
Figure 6E:
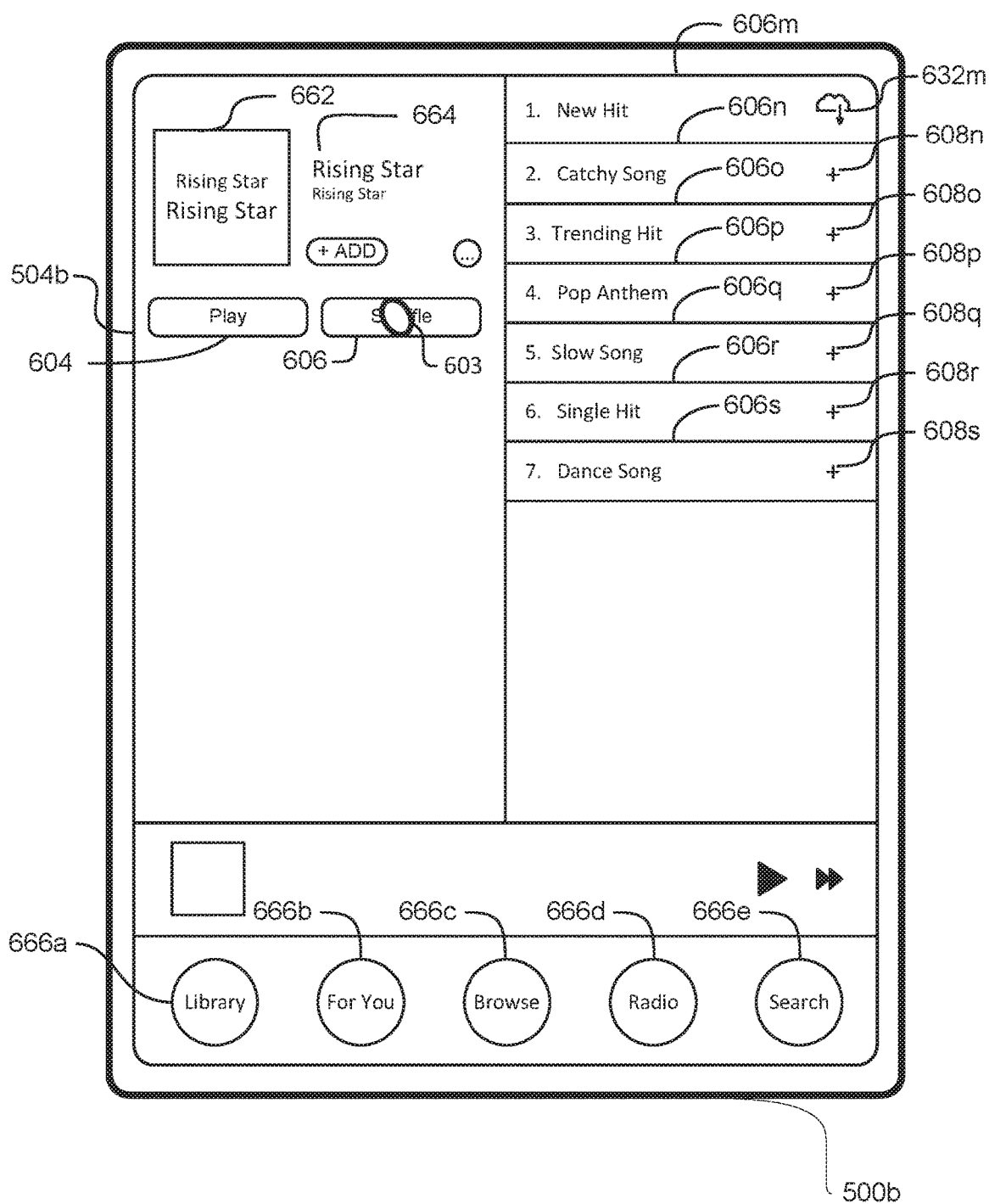
Figure 6F:
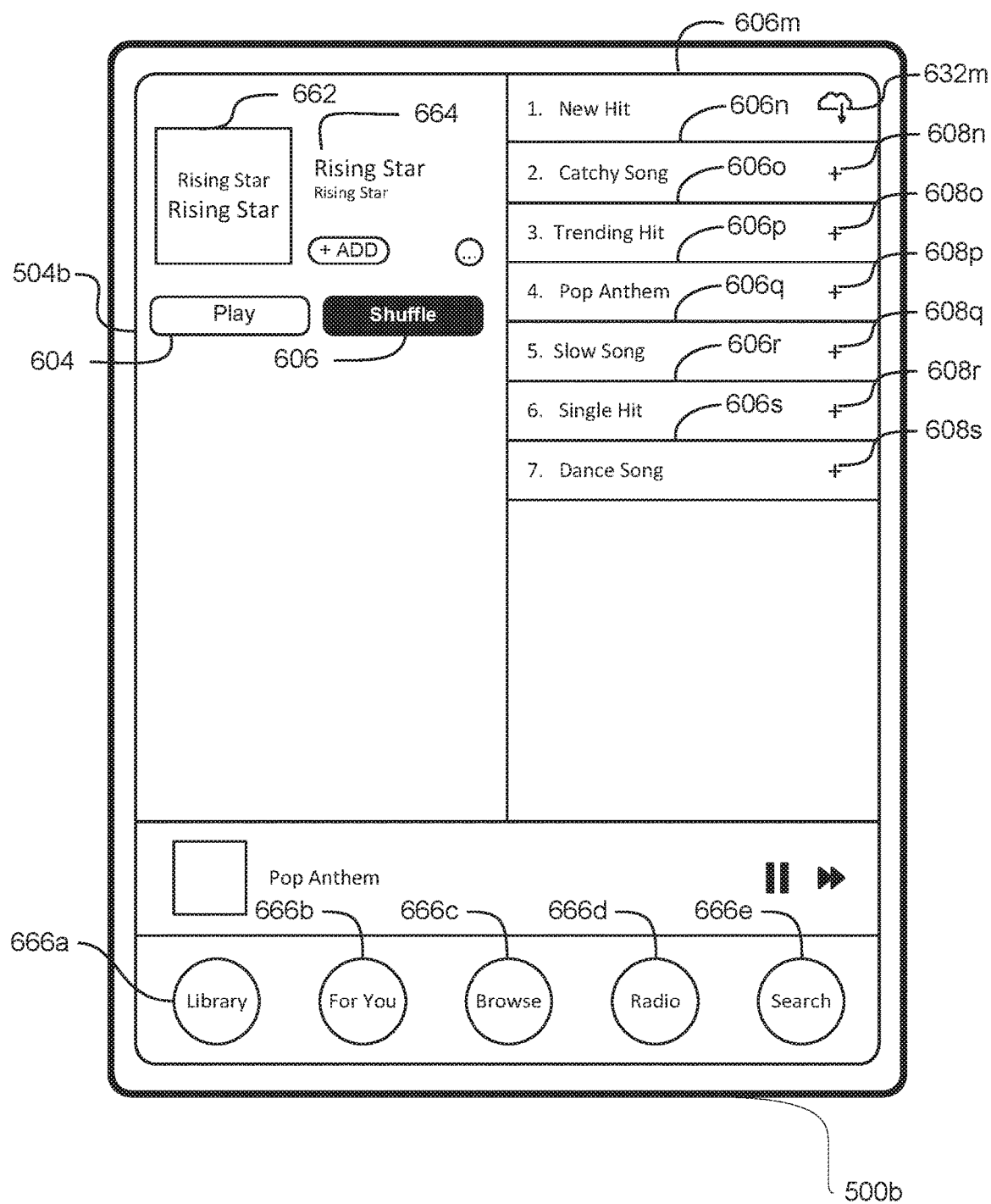
Figure 6G:
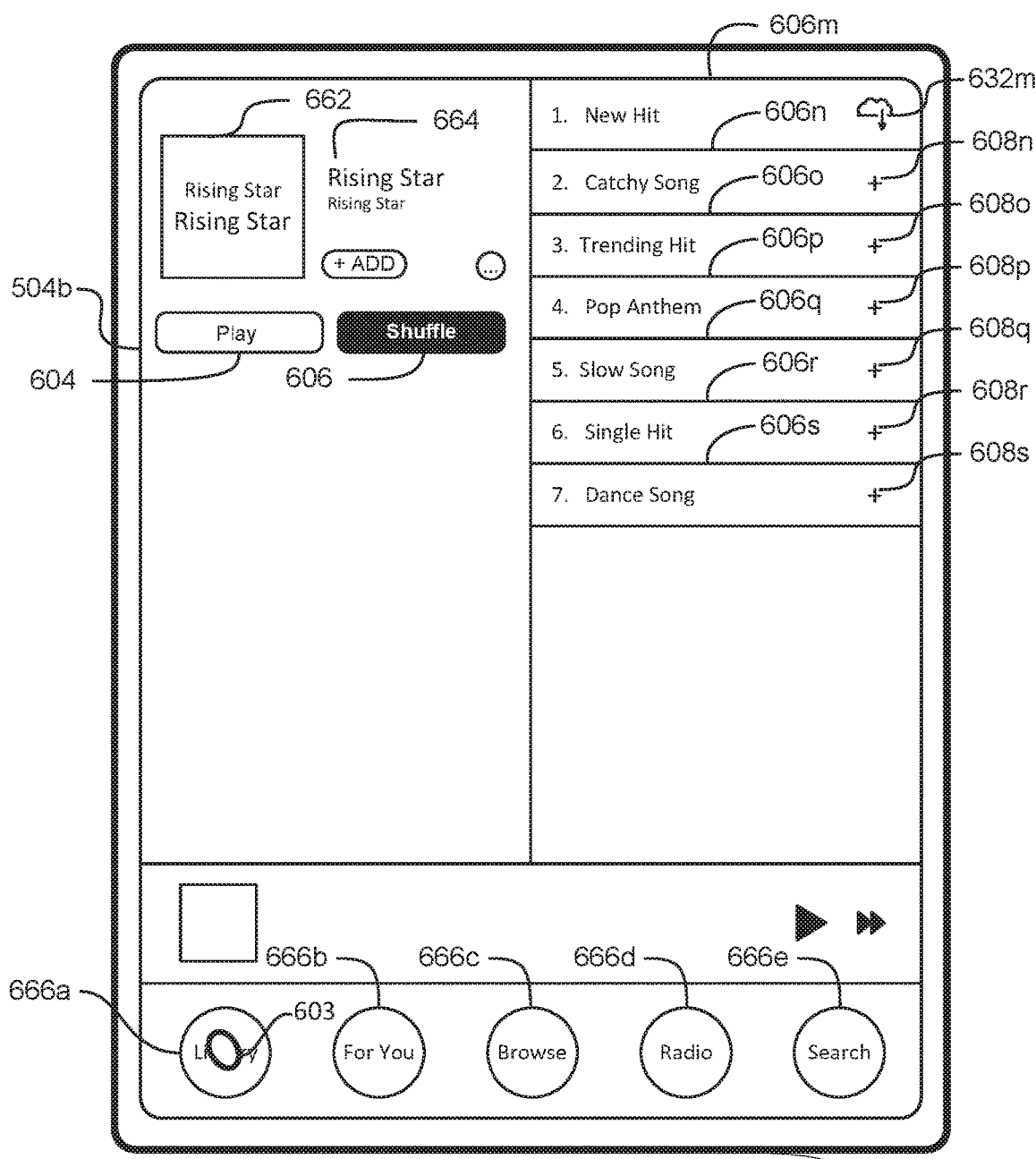
Figure 6H:
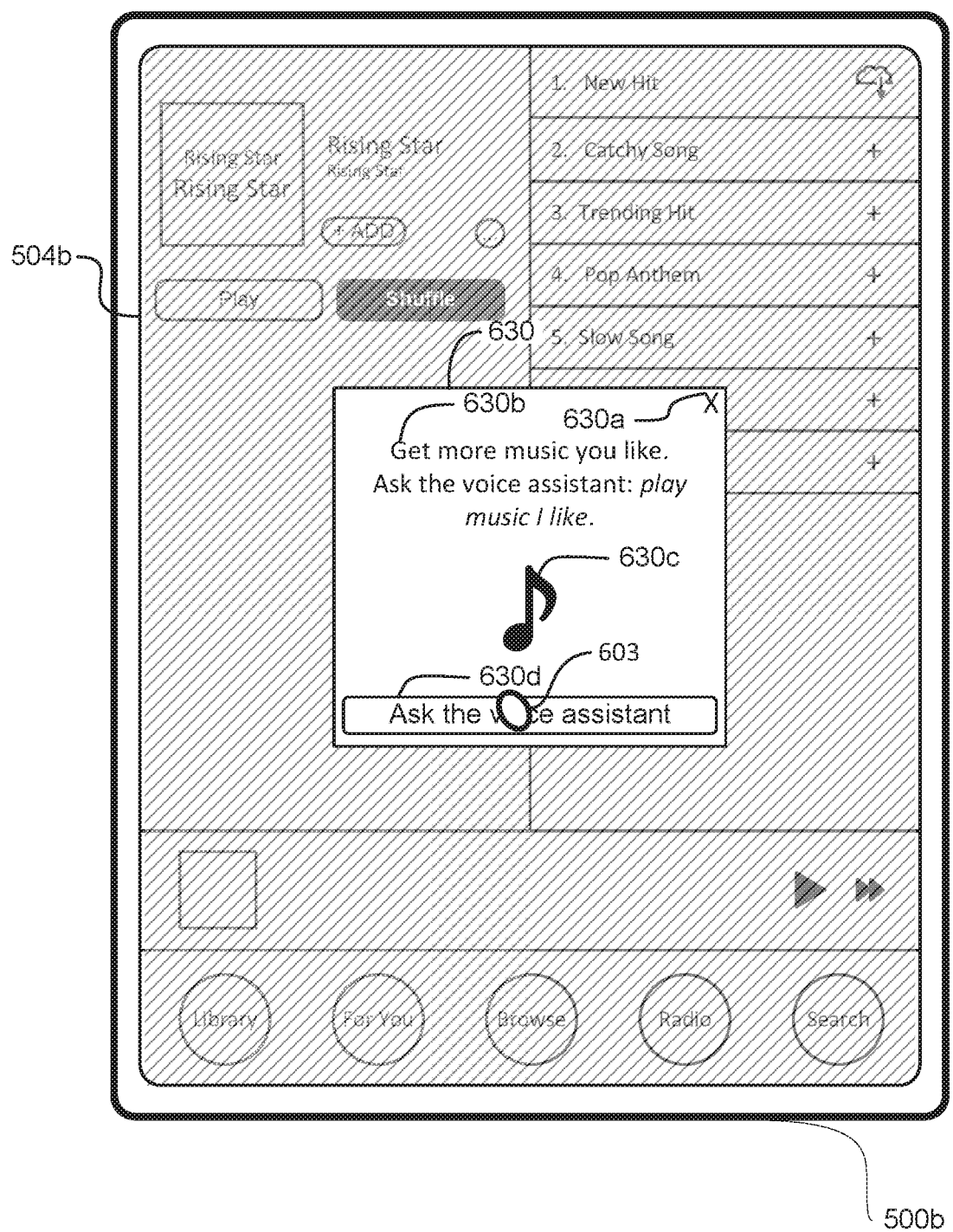
Figure 6I:
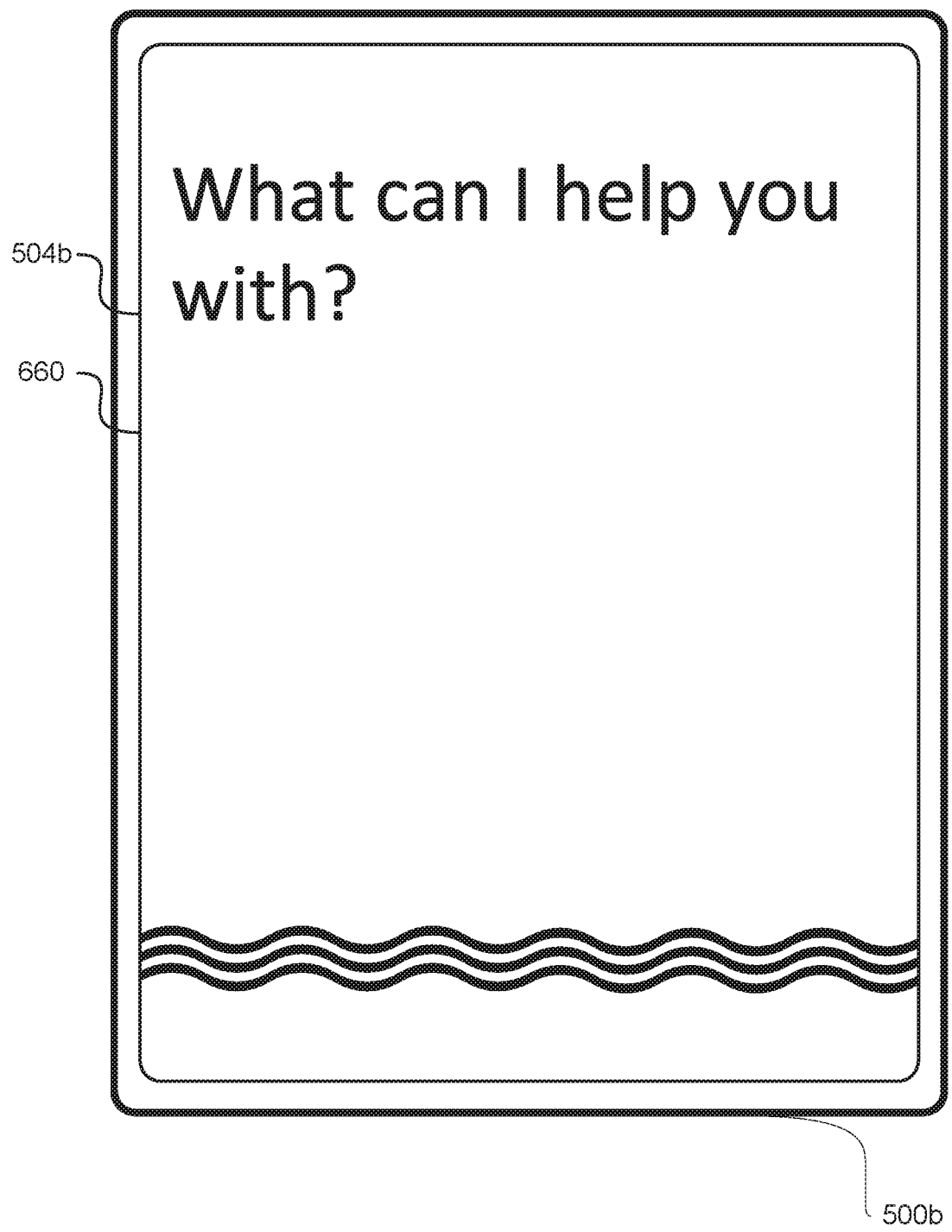

In FIG. 6Y, the electronic device 500*b* is finished playing the playlist. As indicated in FIG. 6Y, at the time the user views the content application user interface after the playlist finishes playing, the electronic device 500*b* has determined or determines that the collection of content (e.g., the playlist) has been played through and has stopped playing and that the song station functionality of the content application has not been initiated by the user. As an example, these conditions satisfy the information-display criteria. Thus, in response to the user's selection, the electronic device 500*b* displays information 626 about the song station functionality of the content application as shown in FIG. 6Z. The song station functionality causes the content application to play items of content that are similar to the song that the station is based on (e.g., same or similar artist or genre as the selected song or frequently played by users who also frequently play the selected song).

FIG. 6Z illustrates the information 626 about the song station functionality of the content application. The information 626 is displayed overlaid on the user interface of the content application, which has a modified appearance, such as being greyed out. In some embodiments, the electronic device 500*b* presents an animation of the information 626 appearing from the bottom of the display. The information 626 is centered on the side of the display 504*b* that displays the content application user interface but does not span the width of the content application user interface because the width of the content application user interface exceeds a predetermined threshold width. The information 626 includes a selectable option 626*a* to dismiss the information 626 about the song station functionality of the content application, text 626*b* describing how to use the song station functionality of the content application, an image 626*c* illustrating the song station functionality of the content application, and a selectable option 626*d* to dismiss the information 626. In this way, because the user has taken certain actions (e.g., playing the items of content in an album) in the content application that are related to the song station functionality, but has not yet taken advantage of the song station functionality, the electronic device 500*b* automatically presents the information 626 about the song station functionality to the user, which facilitates discovery of that functionality by the user and potentially use of that functionality as well. The image 626*c* may be a still image, such as a picture, photograph, screen shot, or illustration or a video, such as an animation or other video. If the user were to select either option 626*a* or 626*d* to dismiss the information 626, in response to the user's selection, the electronic device 500*b* would resume presenting a user interface of the content application, such as the user interface illustrated in FIG. 6Y.

FIGS. 6AA-6DD illustrate another example of the electronic device 500*b* presenting information about the song station functionality of the content application. In FIG. 6AA, the electronic device 500*b* presents the playlist user interface in one portion of the display 504*b* and the user interface of another application 658 in another portion of the display. The content application user interface and the user interface 658 of the other application occupy similar amounts of space on the display 504*b*. As shown in FIG. 6AA, the user selects (e.g., with contact 603) the option 604 to play the playlist. In response to the user's selection, the electronic device 500*b* plays the playlist in a manner similar to that described above with reference to FIG. 6X.

FIG. 6BB illustrates the electronic device 500*b* presenting the playlist user interface after finishing playing the whole playlist. As indicated in FIG. 6BB, at the time the user views the content application user interface after the playlist finishes playing, the electronic device 500*b* has determined or determines that the collection of content (e.g., the playlist) has been played through and has stopped playing and that the song station functionality of the content application has not been initiated by the user. As an example, these conditions satisfy the information-display criteria. Thus, in response to the user's selection, the electronic device 500*b* displays information 628 about the song station functionality of the content application as shown in FIG. 6CC.

FIG. 6CC illustrates the information 628 about the song station functionality of the content application. The information 628 is displayed overlaid on the user interface of the content application, which has a modified appearance, such as being greyed out. In some embodiments, the electronic device 500*b* presents an animation of the information 628 appearing from the bottom of the display. The information 628 spans the width of the content application user interface because the width of the user interface is less than a predetermined threshold width. The information 628 includes a selectable option 628 to dismiss the information 628 about the song station functionality of the content application, text 628*b* describing how to use the song station functionality of the content application, an image 628*c* illustrating the song station functionality of the content application, and a selectable option 628*d* to dismiss the information 628 and present a voice assistant user interface, as will be illustrated in FIG. 6DD. In this way, because the user has taken certain actions (e.g., playing the items of content in an album) in the content application that are related to the song playlist functionality, but has not yet taken advantage of the song playlist functionality, the electronic device 500*b* automatically presents the information 628 about the song playlist functionality to the user, which facilitates discovery of that functionality by the user and potentially use of that functionality as well. The image 628*c* may be a still image, such as a picture, photograph, screen shot, or illustration or a video, such as an animation or other video. If the user were to select option 628*a* to dismiss the information 628, in response to the user's selection, the electronic device 500*b* would resume presenting a user interface of the content application, such as the user interface illustrated in FIG. 6BB. As shown in FIG. 6CC, the user selects (e.g., with contact 603) the option 628*d* to present the voice assistant user interface. In response to the user's selection, the electronic device 500*b* presents the voice assistant user interface, as shown in FIG. 6DD.

FIG. 6DD illustrates the electronic device 500*b* presenting the voice assistant user interface in response to the user's selection in FIG. 6CC. While presenting the voice assistant user interface, the electronic device 500*b* is configured to receive voice inputs from the user. For example, if the user were to say "Play more like this," the electronic device 500*b* would create a song station with the content application based on the song that is currently playing or most recently played.

FIGS. 6EE-6II illustrate an example of an electronic device 500*b* presenting information about a personal station functionality of the content application. As shown in FIG. 6EE, the electronic device 500*b* presents a user interface of the content application that includes an album. The user interface includes an indication 664 of the album title, album artwork 662, a selectable option 604 to play the album in order, a selectable option 606 to play the items of content in the album in a shuffled order, a plurality of representations 606*m*-606*s* of items of content included in the album, and a plurality of navigation options 666*a* for navigating to various user interfaces of the content application. As shown in FIG. 6EE, the user selects (e.g., with contact 603) the option 606 to play the album in a shuffled order. In response to the user's selection, the content application to plays the content in the album in a shuffled order, as shown in FIG. 6FF.

FIG. 6FF illustrates the content application user interface after the user's selection in FIG. 6EE. The option 606 to play the album in a shuffled order has a different appearance to indicate that the shuffle setting is toggled on (e.g., different color). While presenting the user interface illustrated in FIG. 6FF, the electronic device 504*b* plays the items of content in the album in a shuffled order.

FIG. 6GG illustrates the content application user interface after the user begins playing the album in a shuffled order. After initiating playback of the album in a shuffled order, the user selects (e.g., with contact 603) the option 666*a* to present the content library user interface of the content application. As indicated in FIG. 6GG, at the time the contact 603 is detected, the electronic device 500*b* has determined or determines that the content application has played a collection of content in a shuffled order at least a threshold number of times, that the contact 603 is an input to view the content library, and that the personal station functionality has not yet been initiated by the user. The personal station functionality of the content application causes the content application to generate a content radio station based on content consumption history of the content application. As an example, these conditions satisfy the information-display criteria. Thus, in response to the user's selection, the electronic device 500*b* displays information 630 about the personal station functionality of the content application as shown in FIG. 6HH.

FIG. 6HH illustrates the information 630 about the personal station functionality of the content application. The information 630 is displayed overlaid on the user interface of the content application, which has a modified appearance, such as being greyed out. In some embodiments, the electronic device 500*b* initiates presentation of the information 630 by animating the information 630 appearing from the bottom of the display. The information 630 is centered within the content application user interface but does not span the width of the content application user interface because the content application user interface has a width that exceeds a predetermined threshold width. The information 630 includes a selectable option 630*a* to dismiss the information 630 about the personal station functionality of the content application, text 630*b* describing how to use the personal station functionality of the content application, an image 630*c* illustrating the personal station functionality of the content application, and a selectable option 630*d* to dismiss the information 630 and present a voice assistant user interface. In this way, because the user has taken certain actions (e.g., playing a collection of content, such as an album, in a shuffled order) in the content application that are related to the personal station functionality, but has not yet taken advantage of the personal station functionality, the electronic device 500*b* automatically presents the information 630 about the song station functionality to the user, which facilitates discovery of that functionality by the user and potentially use of that functionality as well. The image 630*c* may be a still image, such as a picture, photograph, screen shot, or illustration or a video, such as an animation or other video. If the user were to select the option 630a to dismiss the information 630, in response to the user's selection, the electronic device 500b would present the content library user interface of the content application in accordance with the selection made by the user in FIG. 6GG. In some embodiments, prior to displaying the information 630 about the personal station, the electronic device 500b presents the content library user interface of the content application and then presents the information 630 about the personal station overlaid on the content library user interface. Thus, dismissing the information 630 about the personal station would cause the information 630 to cease being displayed to reveal the content library user interface. As shown in FIG. 6HH, the user selects (e.g., with contact 603) the option 630d to present the voice assistant 630d user interface, as shown in FIG. 6II.

FIG. 6II illustrates the electronic device 500b presenting the voice assistant user interface in response to the user's selection in FIG. 6HH. While presenting the voice assistant user interface, the electronic device 500b is configured to receive voice inputs from the user. For example, if the user were to say "Play music that I like," the electronic device 500b would create a personal station with the content application based on content consumption history of the content application.

Although the examples described above with reference to FIGS. 6A-6V are illustrated with electronic device 500a (e.g., a smartphone or media player) and the examples described with reference to FIGS. 6W-6II are illustrated with electronic device 500b (e.g., a tablet), it should be understood that electronic devices 500a and 500b are optionally able to each perform all of the examples described herein. Further, electronic devices not illustrated here (e.g., personal computers, set top boxes coupled to displays and speakers) are optionally able to be used to perform one or more examples described herein without departing from the scope of the disclosure.

Figure 7A:
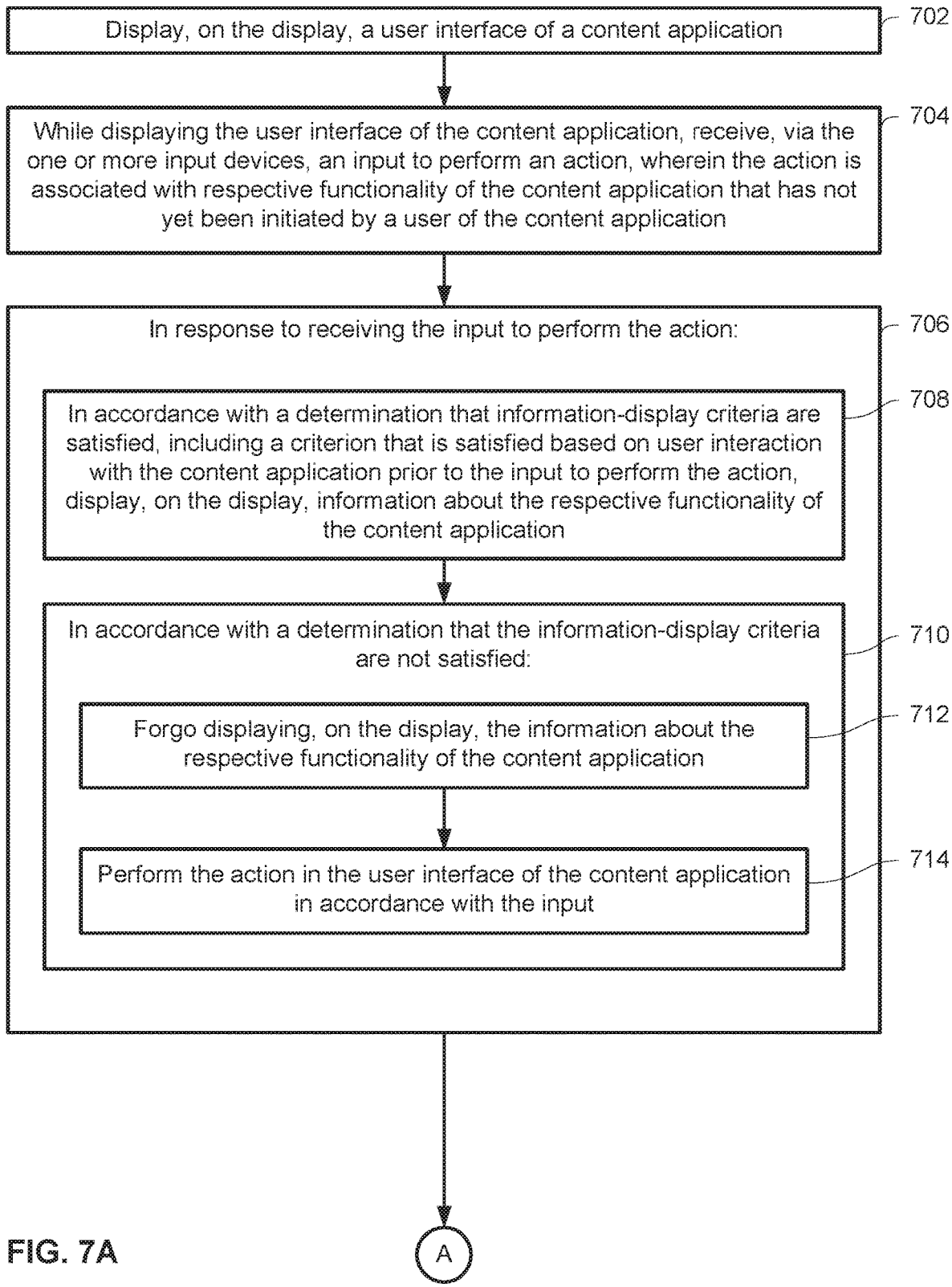
FIGS. 7A-7N are flow diagrams illustrating a method of presenting information about application functions and facilitates performance of the functions in accordance with some embodiments.
Figure 7C:
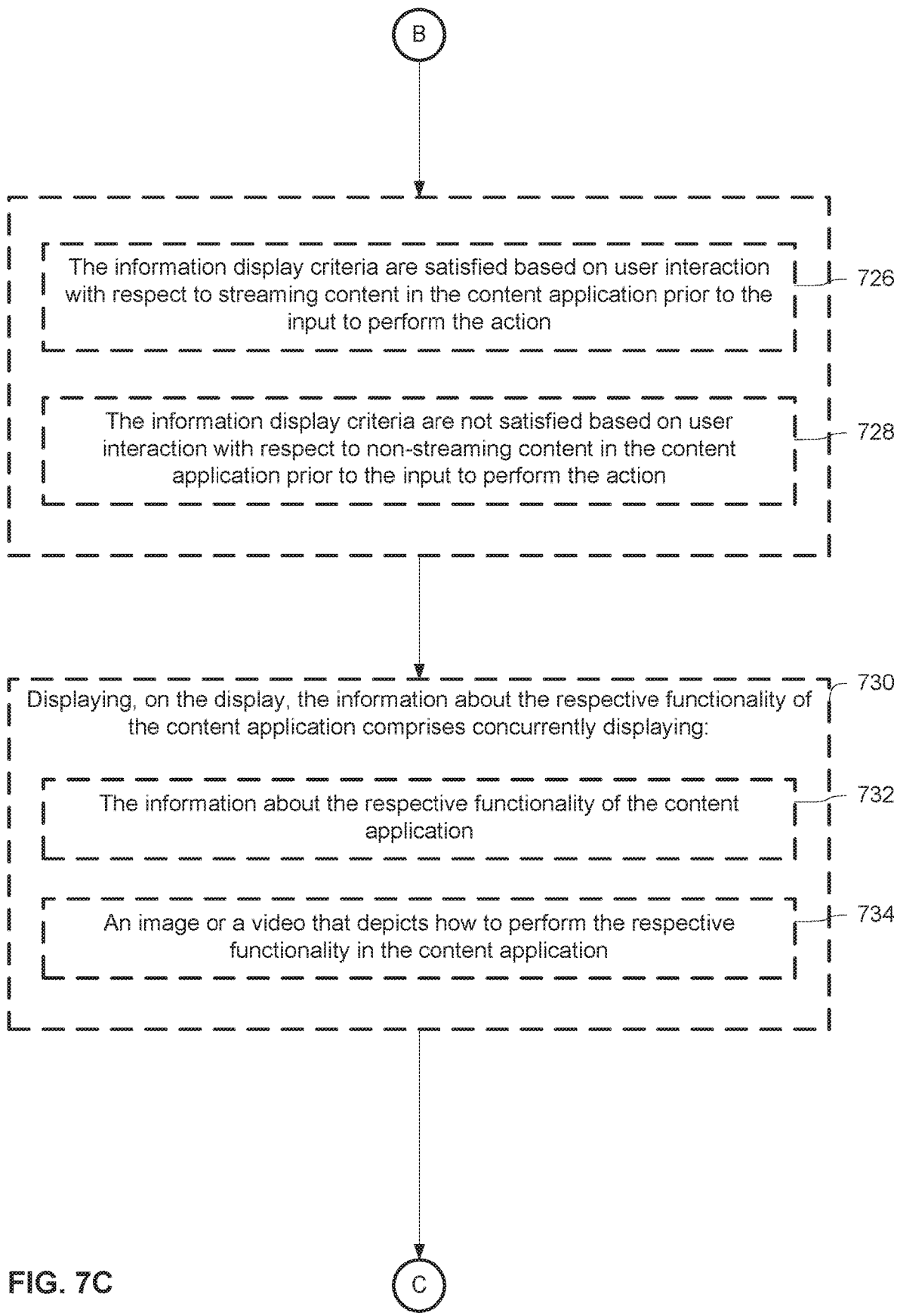
Figure 7D:
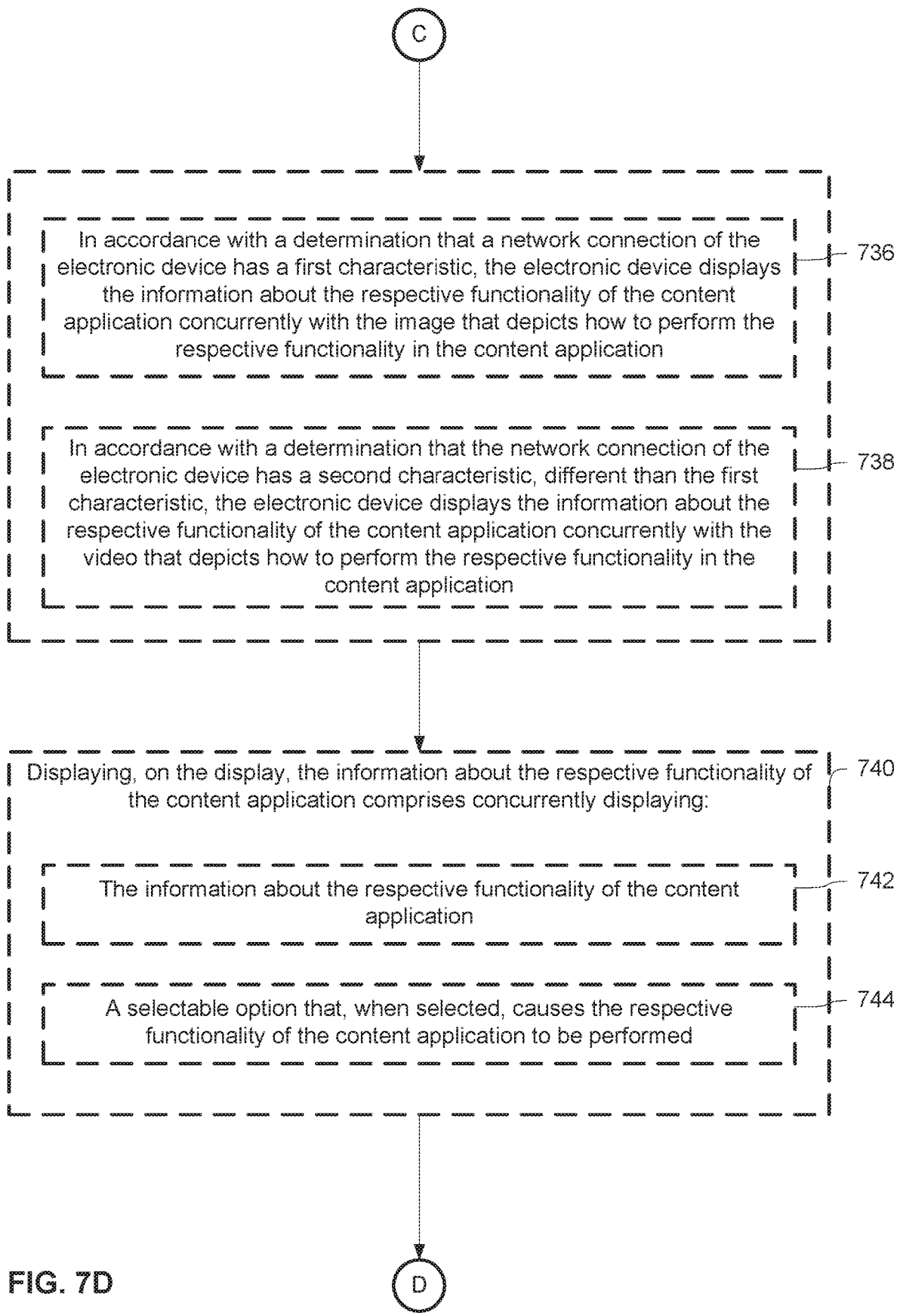
Figure 7E:
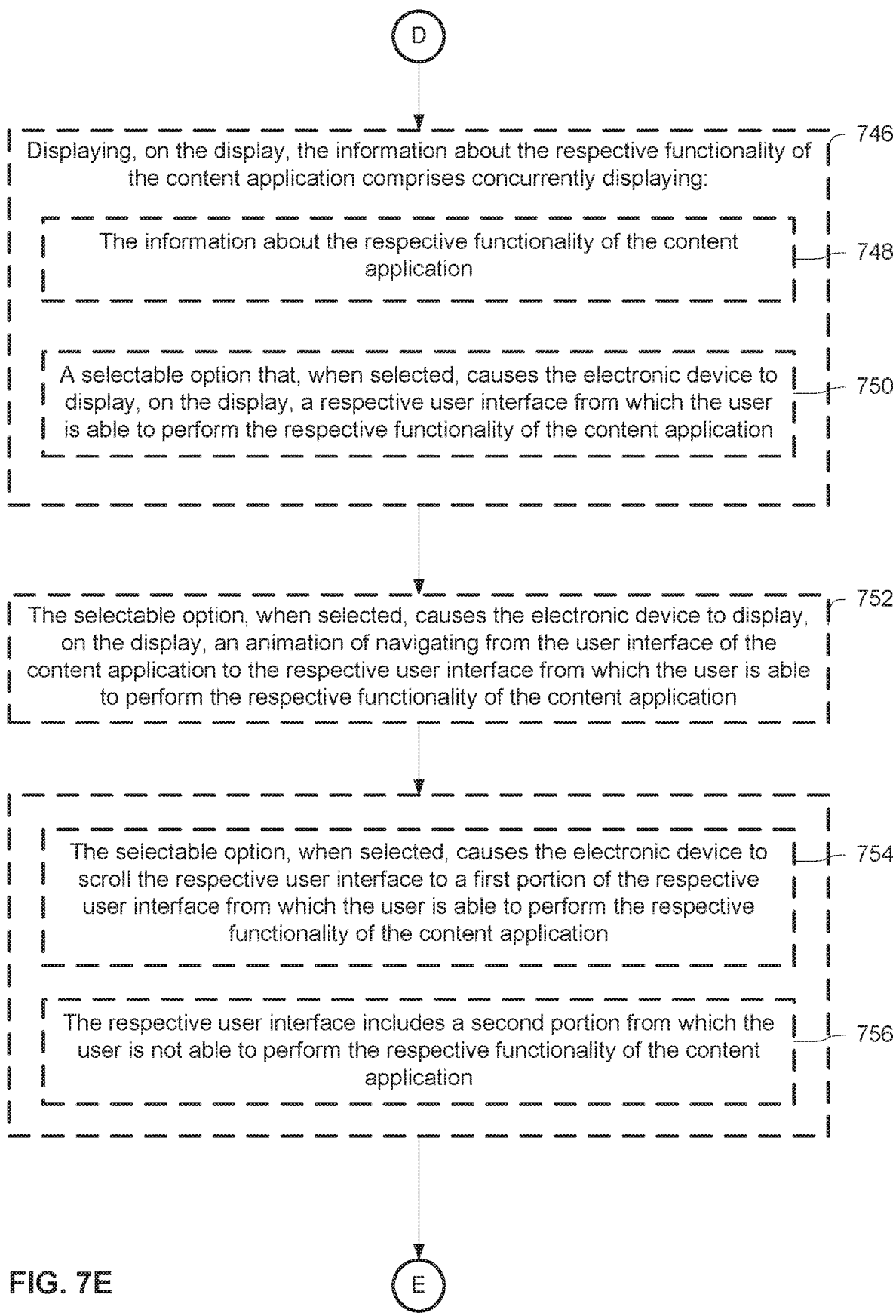
Figure 7F:
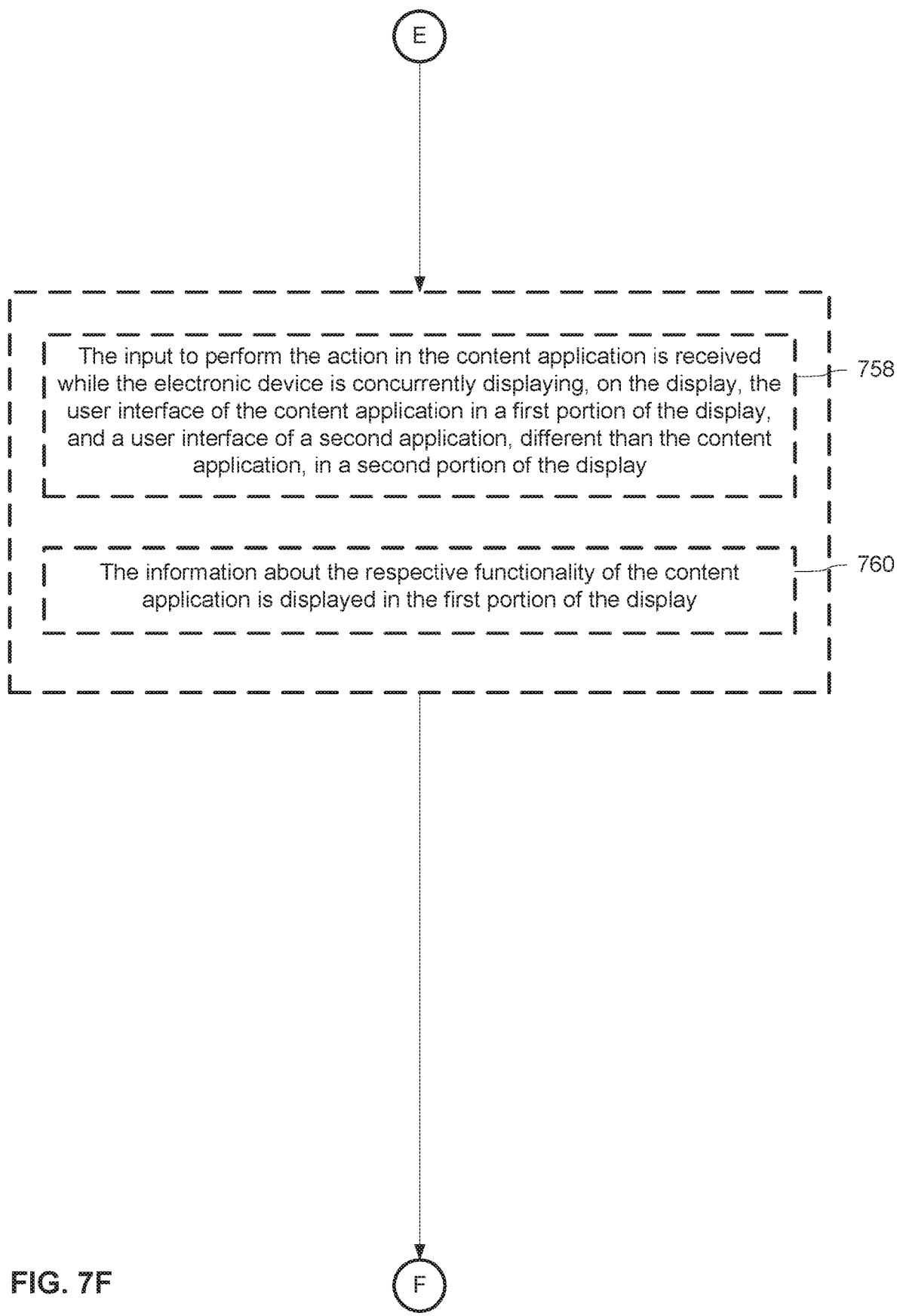
Figure 7G:
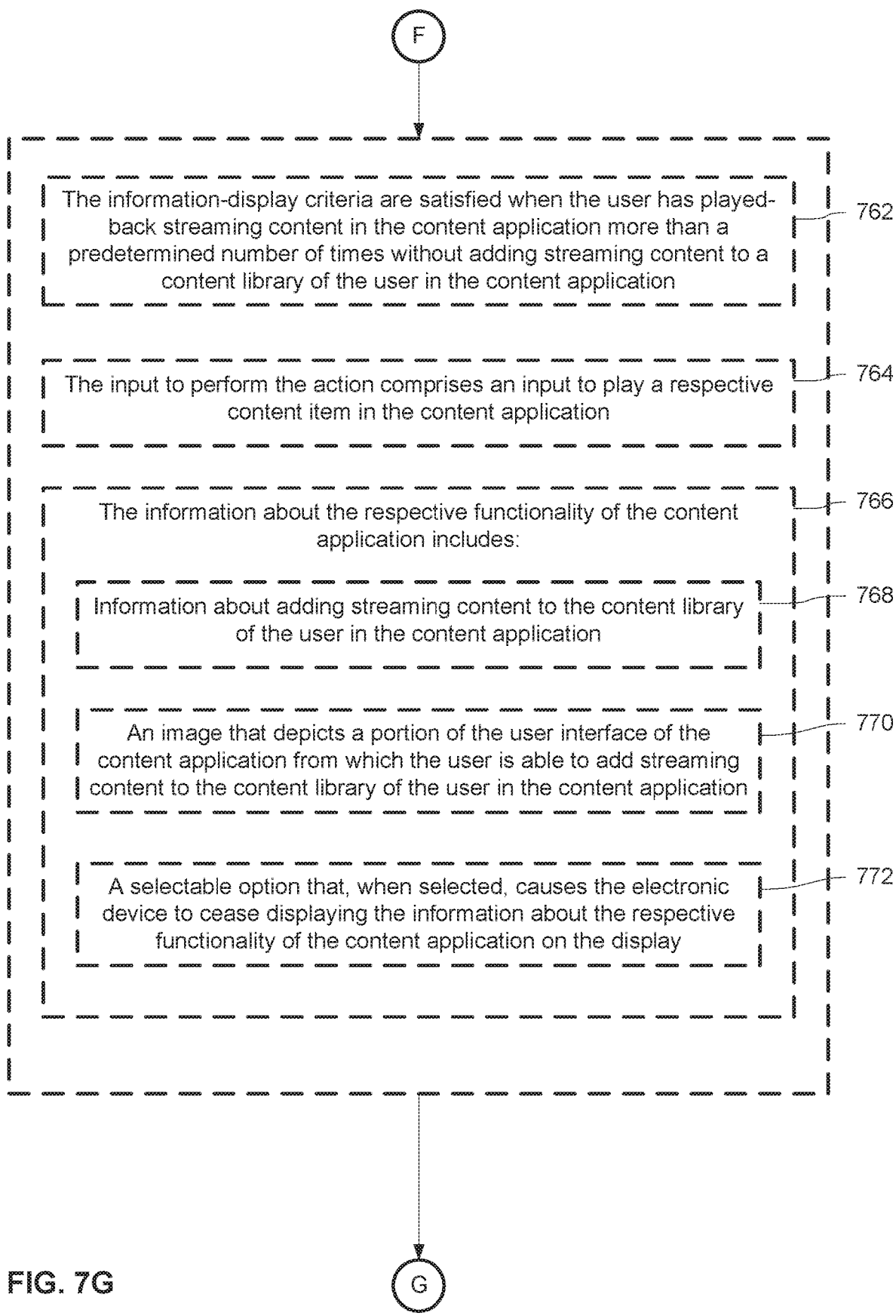
Figure 7H:
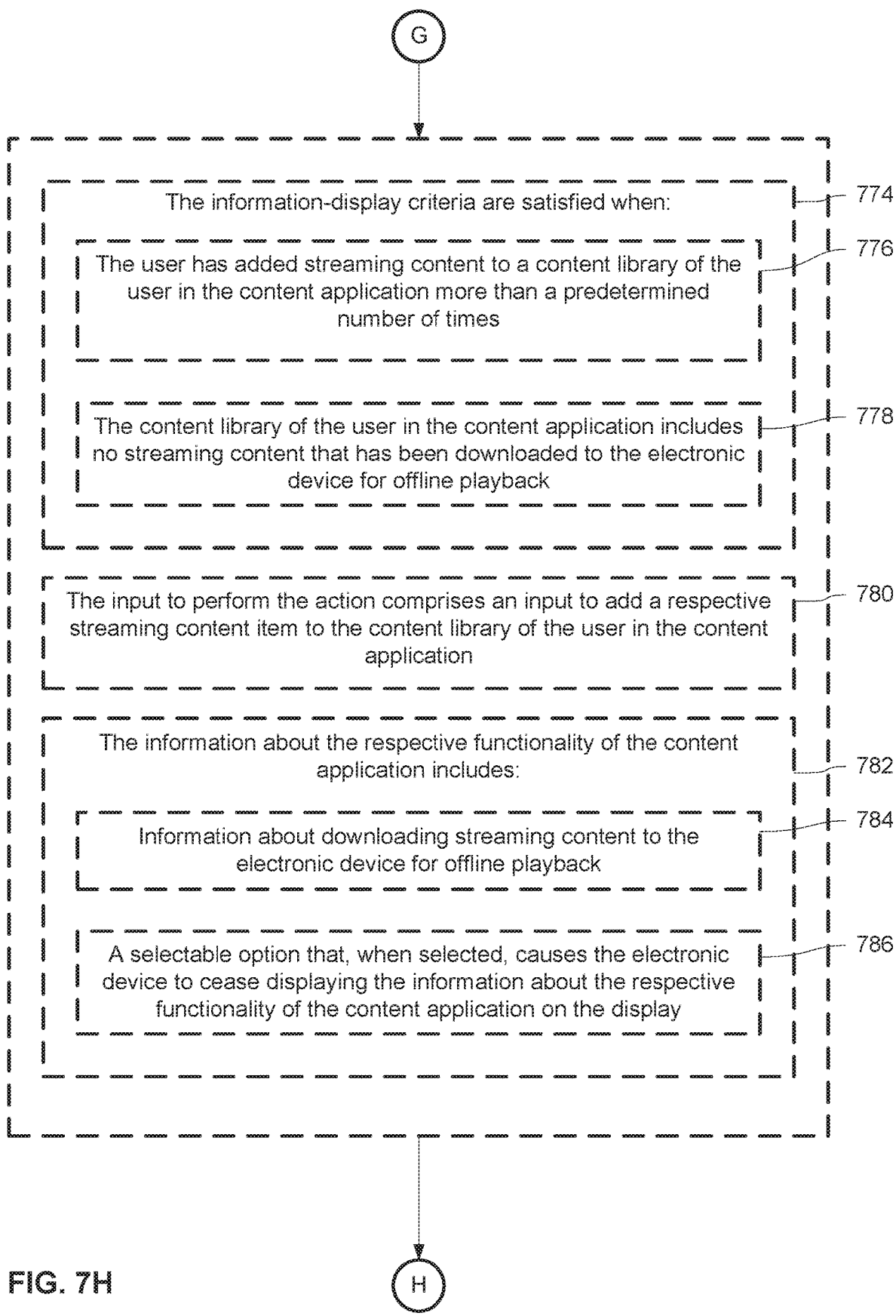
Figure 7I:
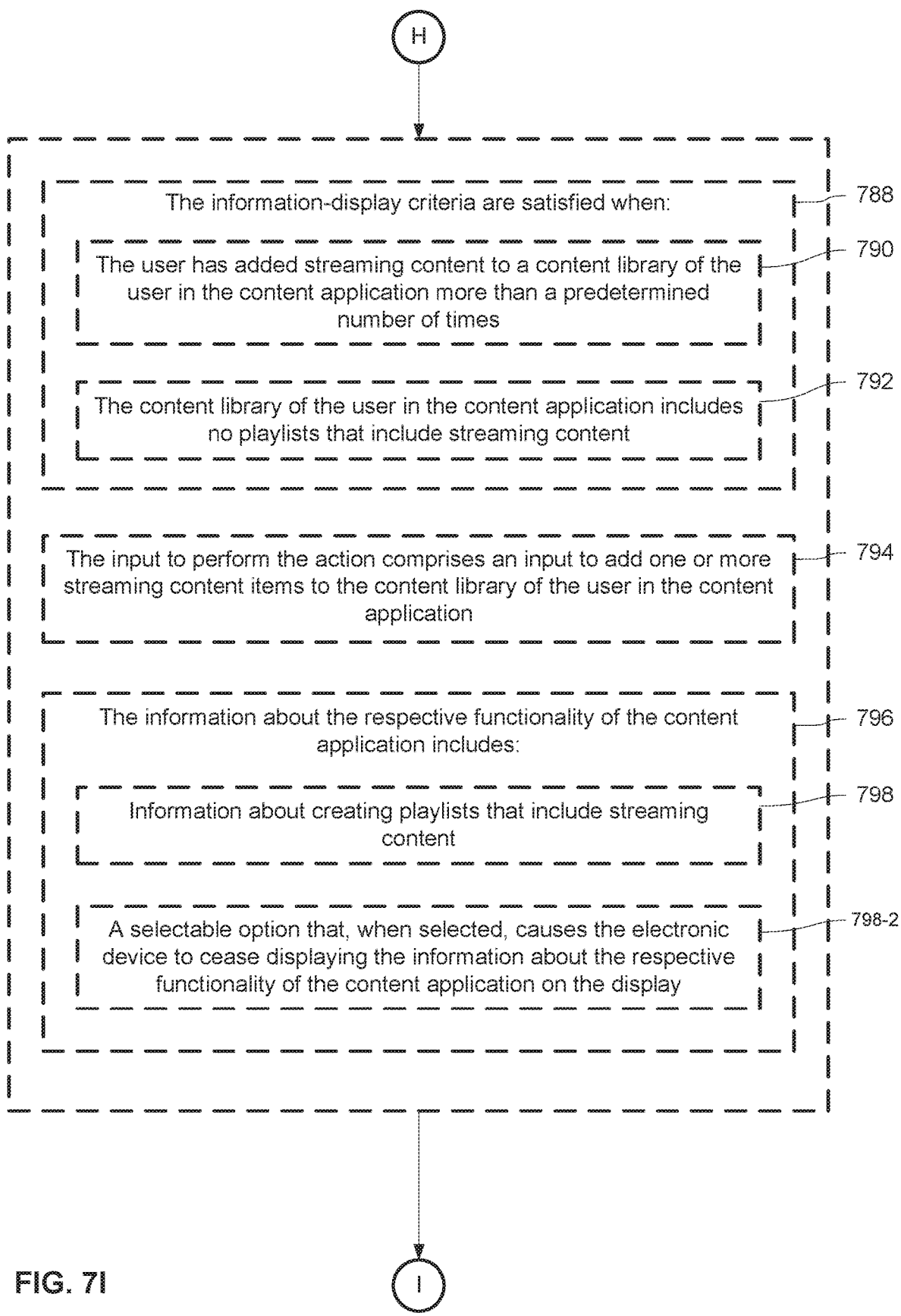
Figure 7J:
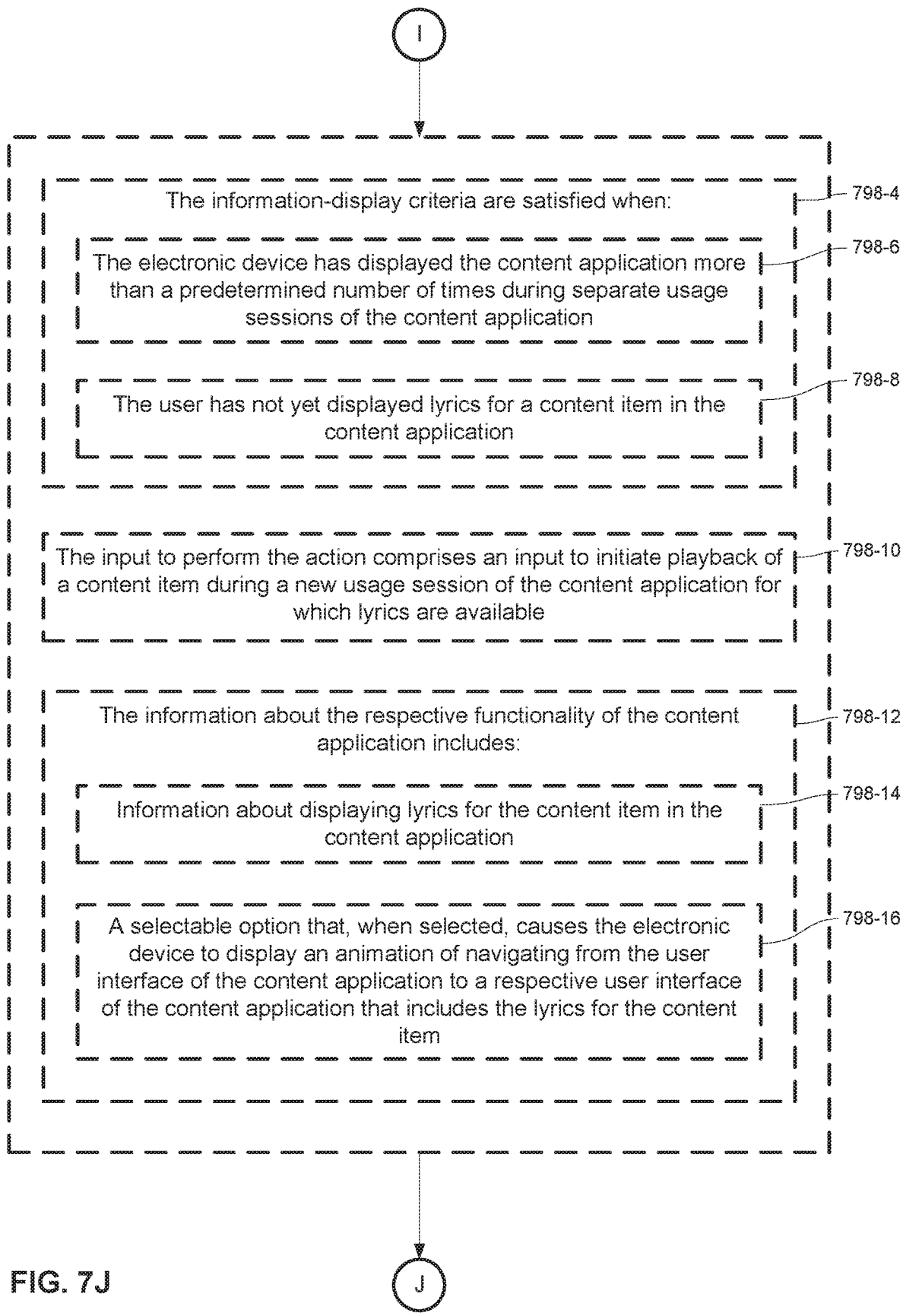
Figure 7K:
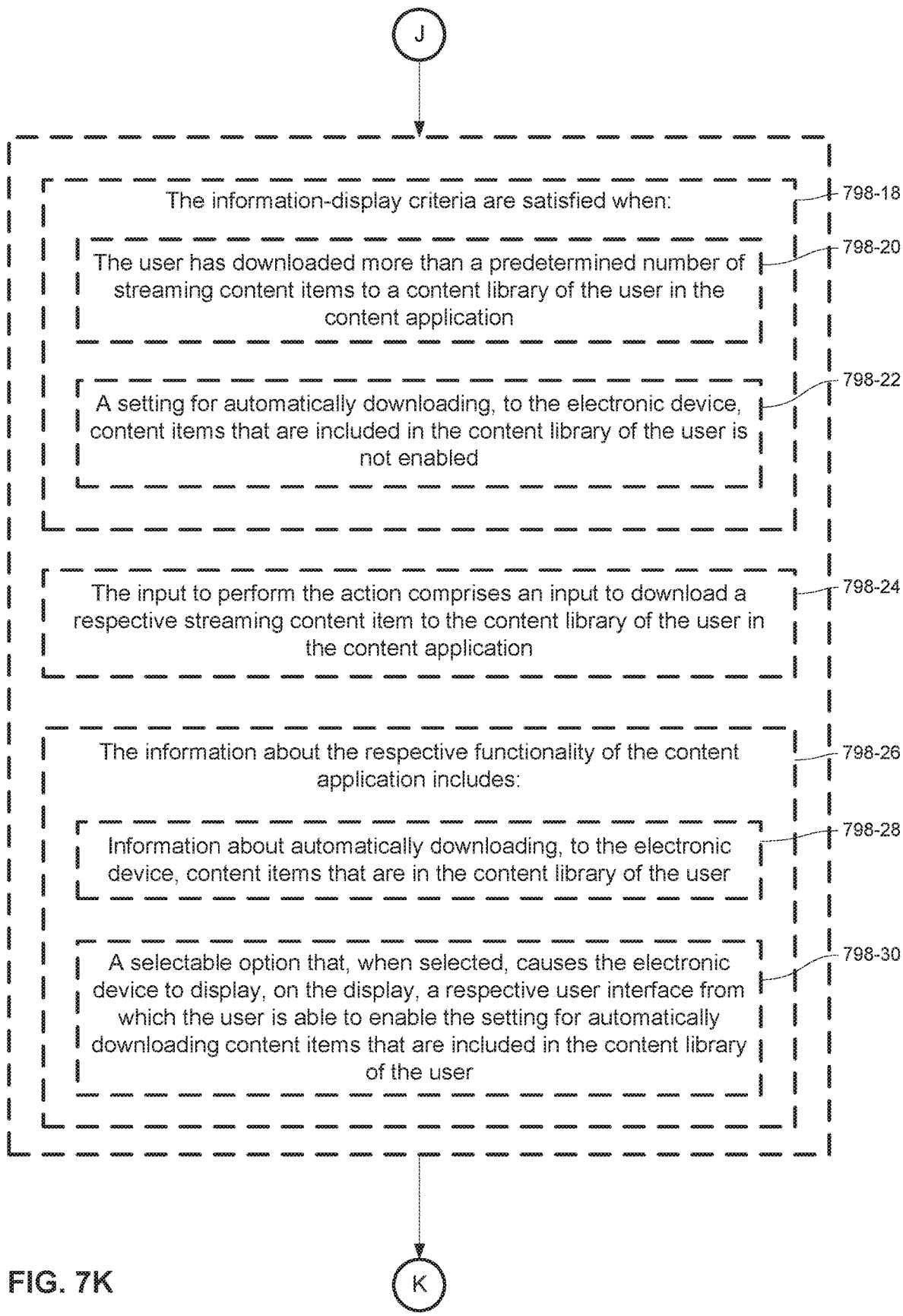
Figure 7L:
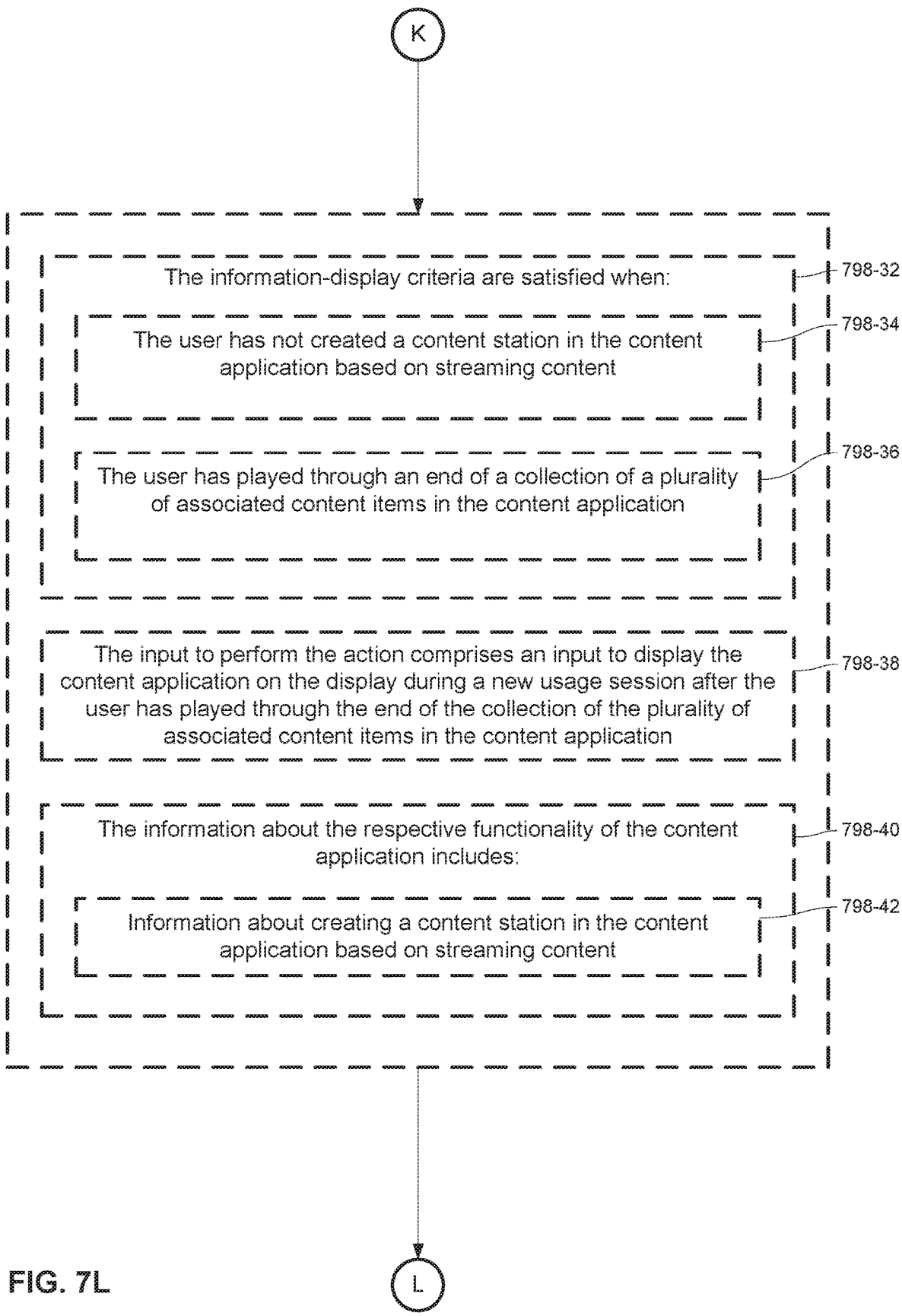
Figure 7M:
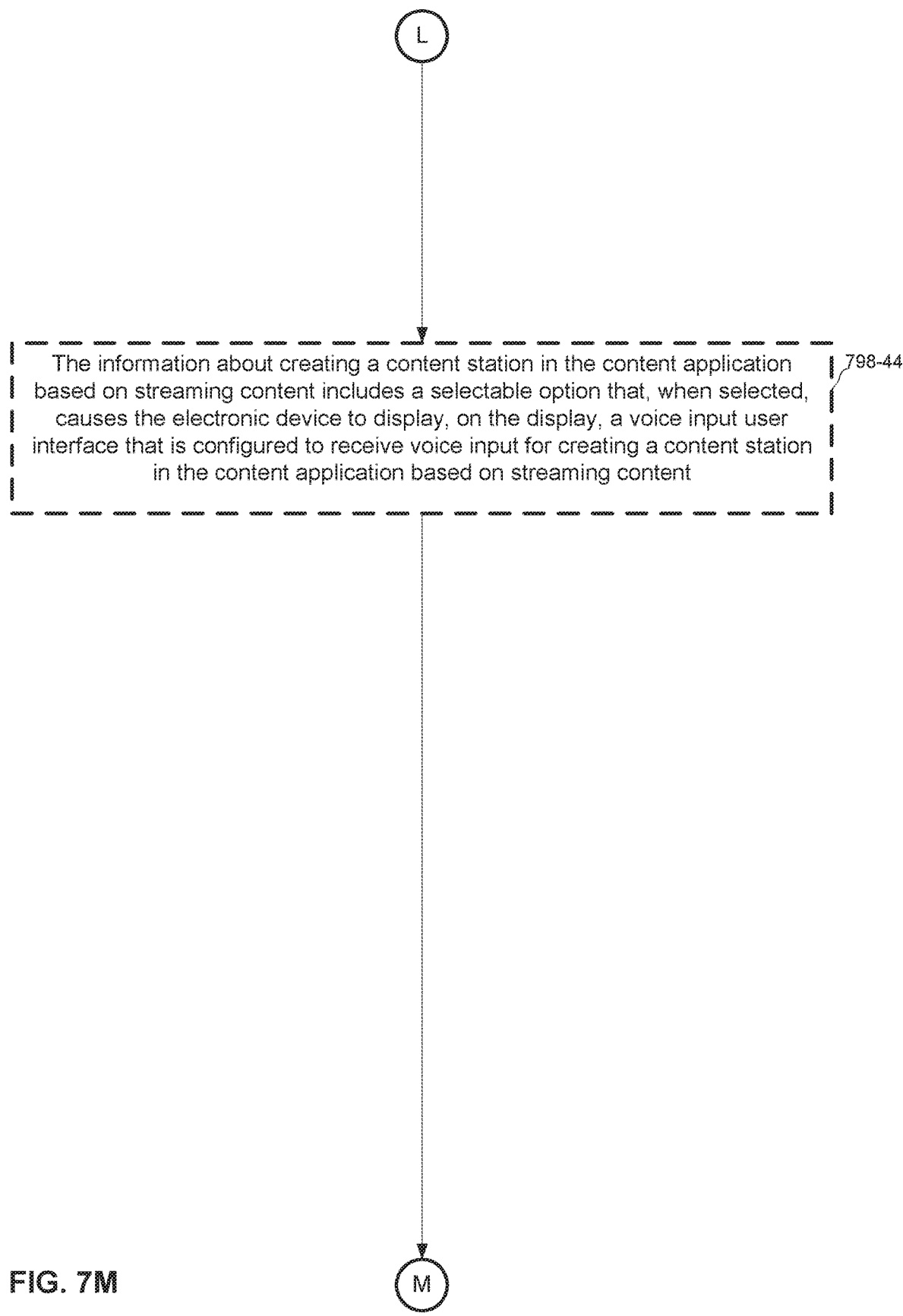
Figure 7N:
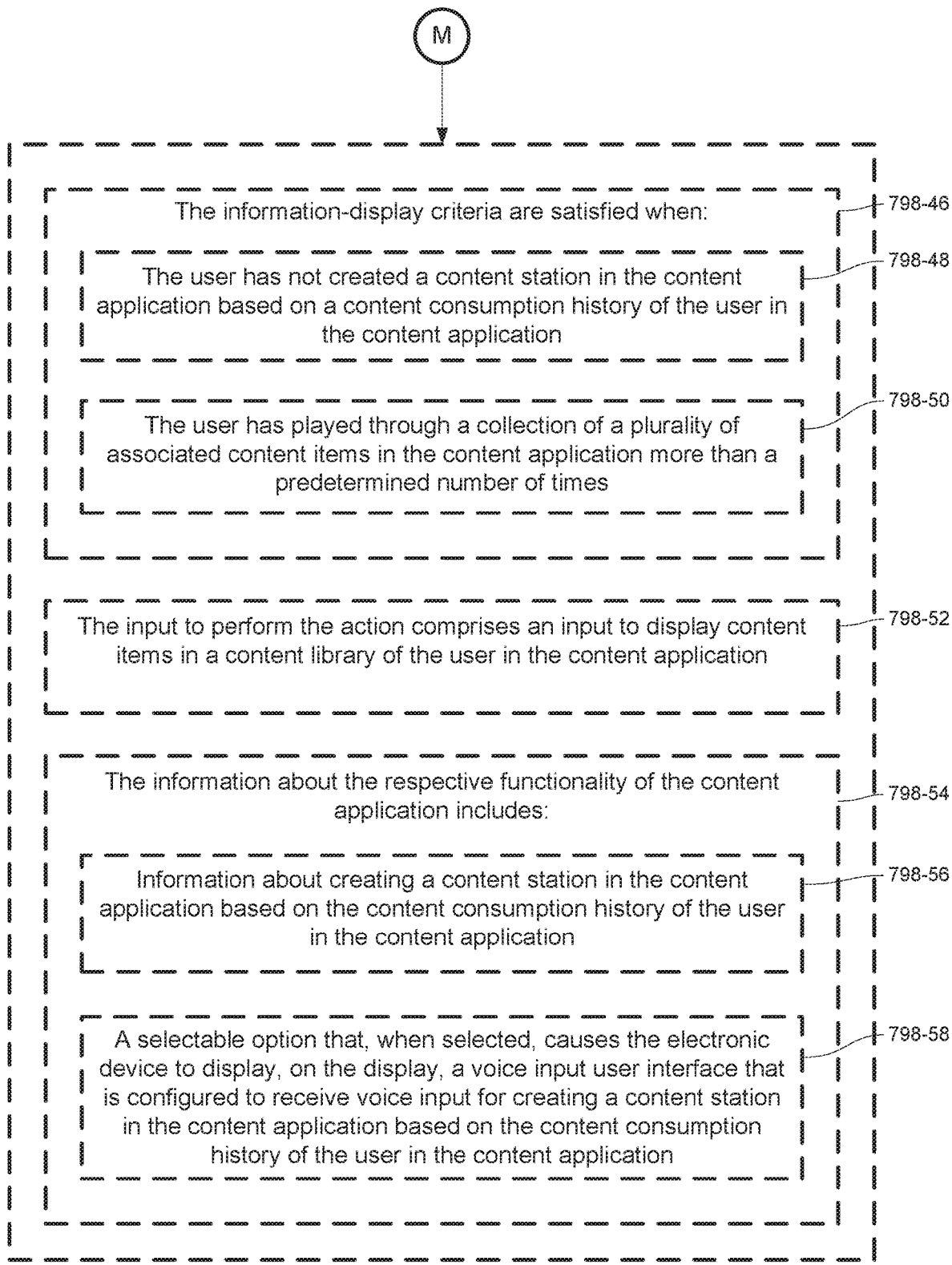

FIGS. 7A-7N are flow diagrams illustrating a method 700 of presenting information about application functions and facilitating performance of the functions in accordance with some embodiments. The method 700 is optionally performed at an electronic device such as device 100, device 300, or device 500, as described above with reference to FIGS. 1A-1B, 2-3, 4A-4B and 5A-5H. Some operations in method 700 are, optionally combined and/or order of some operations is, optionally, changed.

As described below, the method 700 provides ways to present information about application functions and to facilitate performance of the application functions. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device 500a (e.g., electronic device 500, a smartphone, media player or wearable device including a touch screen, a personal computer including or in communication with one or more input devices such as a keyboard, trackpad, or touch screen, or a set-top box in communication with a display, such as a television, a speaker, and a remote that includes a touch panel or touch screen) in communication with a display 504a and one or more input devices displays (702), on the display, a user interface of a content application, such as in FIG. 6A (e.g., a media player application). In some embodiments, the media player application allows the user to play content such as music, spoken word content (e.g., podcasts), or video content. The content is optionally stored on the electronic device or streamed from a streaming library using a wireless network connection.

In some embodiments, while displaying the user interface of the content application, the electronic device receives (704), via the one or more input devices, an input 603 to perform an action, wherein the action is associated with respective functionality of the content application that has not yet been initiated by a user of the content application, such as in FIG. 6A or 6C.

In some embodiments, the respective functionality is one or more of adding one or more items of streaming content to the user's library, downloading one or more items of streaming content to the electronic device, adding one or more items of streaming content to a playlist, viewing text associated with an item of streaming content (e.g., song lyrics), enabling automatic downloading of streaming content that is saved to the user's library, creating a radio station with the streaming catalog based on an item of streaming content, and creating a personal radio station with the streaming catalog. The input is optionally a user input to perform a function with the content application that is different from, but optionally related to, the respective functionality. For example, a user input to play an item of streaming content is optionally associated with saving content to the user's content library because the library functionality of the content application is valuable to many users who wish to play items of content from the content streaming catalog. As another example, the input is optionally an input to add a streaming content item to the user's library, which is optionally associated with the respective functionality of automatically downloading content items that are added to the user's library locally to the electronic device. More generally, the input here is optionally any input to the content application that suggests the user might be interested in a particular functionality of the content application that the user has not yet utilized. In some embodiments, the electronic device is associated with a user account that is also associated with one or more other electronic devices. If an action has been initiated by the user on an electronic device associated with the user account, it is optionally considered to be initiated by the user on any of the electronic devices associated with the user account. For example, if the user creates a playlist using a smartphone associated with their user account and then accesses the content application on a tablet that is also associated with the user account, initiating the playlist is considered to be an action that has been initiated by the user, even if the user has not created a playlist using the tablet (e.g., the uninitiated action criterion will not be met).

In some embodiments, such as in FIGS. 6C-6D in response to receiving the input 603 to perform the action (706), in accordance with a determination that information-display criteria are satisfied, including a criterion that is satisfied based on user interaction with the content application prior to the input to perform the action, the electronic device 500a displays (708), on the display 504a, information 616 about the respective functionality of the content application.

In some examples, if the user's past interaction with the content application has satisfied some criteria, as described below, the electronic device optionally displays information about the respective functionality as a way of automatically providing information about the respective functionality of the content application to the user. In some embodiments, satisfaction of different criteria causes the electronic device to display information about different functionality of the content application (e.g., the display of different functionality information is triggered by the satisfaction of different criteria by the user's actions in the content application). In some embodiments, the criterion that is based on user interaction with the content application is based on repeated performance of a function of the content application prior to receiving the input associated with the respective functionality, such as playing an item of content from the content streaming catalog, adding one or more items of content to the user's content library, conducting multiple sessions of use with the content application, viewing multiple pages during a single session of use with the content application, selecting one or more items of content to download from the streaming content library to the electronic device, playing a complete collection of content items (e.g., an album or playlist), and playing a collection of content items (e.g., the user's library, an album, or playlist) on shuffle. These and other functions are optionally associated with functionality of the content application that, in some cases, has not yet been initiated by the user. For example, the user may have played multiple items of content from the content streaming catalog but not yet saved an item of streaming content to their library. The displayed information optionally includes text that describes the respective functionality of the content application, an image, video or animation that illustrates or represents the respective functionality of the content application, and a selectable option that when activated causes the electronic device to stop displaying the information and optionally perform a function related to the respective functionality of the content application. For example, information related to saving items of content to the user's library optionally includes text stating that the user is able to save items of content to the library by selecting an option to save content, an image or illustration representing saving content to the library, and a selectable option to dismiss the information. Dismissing the information optionally causes the electronic device to display a user interface of the content application that was previously displayed (e.g., displayed prior to displaying the information about the respective functionality) and includes the selectable option to save the item of content. As another example, the information related to displaying lyrics of a song that is playing in the content application optionally includes a selectable option that when selected causes the electronic device to display a user interface of the content application that corresponds to a content item that is currently playing on the electronic device, and to display an animation of navigation through that user interface to a section of that user interface that includes the lyrics for that content item. In some embodiments in which multiple electronic devices are associated with a user account, the information-display criteria are cumulative across the multiple electronic devices. For example, if the information-display criteria include receiving a user input to play an item of content eight times, the criteria are met if a smartphone associated with the user account detects 3 user inputs to play an item of content and a tablet associated with the user account detects 5 user inputs to play an item of content because, in total, the electronic devices have detected eight user inputs for playing content with the content application. In some embodiments, the information-display criteria are not cumulative across devices (e.g., one device must meet the criteria itself), but once the information is displayed on one electronic device, it is not displayed again on another electronic device. For example, if the smartphone detects the threshold number of user inputs for playing an item of content with the content application and the user has not yet saved an item of streaming content to their library across all electronic devices associated with the user account, the smartphone optionally presents information about saving items of streaming content to the library. If, after the smartphone has presented the information about saving items of streaming content to the library, the tablet detects the threshold number of user inputs for playing content and the user has not yet added an item of streaming content to the library, the tablet optionally forgoes presenting information about adding items of streaming content to the library in response to the threshold number of user inputs for playing items of streaming content because the information has already been presented on the smartphone.

In some embodiments, such as in FIGS. 6A-6B in accordance with a determination that the information-display criteria are not satisfied (710): the electronic device 504*a* forgoes (712) displaying, on the display, the information about the respective functionality of the content application.

In some embodiments, the user interface of the content application that was displaying when the user input was received continues to be displayed without the addition of the information about the respective functionality of the content application. For example, if the content application is presenting a content browsing user interface including representations of items of content when the input is received (e.g., an input to play, save, or download an item of content) and the information-display criteria are not satisfied, then the electronic device optionally continues to display the content-browsing user interface. As another example, if the user input is an input to display a different user interface of the content application, such as navigation to a different collection of content items (e.g., an input to view items of content included in an album or in a playlist curated by the streaming service), then the electronic device optionally presents the requested user interface without displaying the information about the respective functionality of the content application.

In some embodiments, such as in FIG. 6B or 6D the electronic device 500*a* performs (714) the action in the user interface of the content application in accordance with the input 603. In some examples, the action is optionally different from the respective functionality of the content application that is associated with the input. For example, an input to play an item of content in the streaming catalog optionally causes the electronic device to play the item of content. However, if the user has played content items in the streaming catalog a number of times that exceeds a predetermined threshold associated with the information-display criteria with respect to the library functionality of the content application and the user has not yet saved an item of content from the streaming catalog to their library, then the input for playing an item of content in the streaming catalog optionally causes the electronic device to present information about the library functionality of the content application.

The above-described manner of presenting information about a respective functionality of the content application that has not yet been initiated by the user in response to an input associated with the respective functionality allows the electronic device to inform the user about functionality of the content application that they may not know exists, which simplifies interactions between the user and the electronic device and enhances the operability of the electronic device (e.g., by presenting the user with features and functionality that make using the content application on the electronic device easier and/or more efficient, and allows the user to use the content application with fewer inputs and errors), which, additionally, reduces power and improves battery life of the electronic device by enabling the user to use the electronic device more quickly and efficiently.

In some embodiments, such as in FIGS. 6C-6D, in response to receiving the input 603 to perform the action (716): in accordance with the determination that the information-display criteria are satisfied, the electronic device 500a performs (718) the action in the user interface of the content application in accordance with the input. In some embodiments, receiving the user input causes the information-display criteria to be satisfied. For example, the information-display criteria are optionally that the electronic device has detected a user input for playing an item of content a predetermined number of times (e.g., 6, 8, 10, or some other number of times). In this example, in response to a user input for playing an item of content that also satisfies the information-display criteria, the electronic device begins playing the item of content in accordance with the user input and displays the information about the respective functionality of the content application.

The above-described manner of performing the action associated with the user input that caused the electronic device to display information about the respective functionality of the content application allows the electronic device to present information about the content application and continue to perform user-requested functions in response to user inputs, which simplifies interactions between the user and the electronic device and enhances the operability of the electronic device (e.g., by performing the requested action without requiring the user to enter the input again after the information ceases to be displayed), which, additionally, reduces power and improves battery life of the electronic device by enabling the user to use the electronic device more quickly and efficiently.

In some embodiments, such as in FIG. 6C, the respective functionality of the content application has not yet been initiated by the user of the content application over a plurality of separate usage-sessions of the content application (720). In some embodiments, the respective functionality of the content application has never been initiated by the user. If the user initiates the functionality during a first usage-session of the content application, ends the usage-session (e.g., closes the content application) and then starts a new usage-session in which the functionality is not initiated, the electronic device optionally forgoes presenting information about the functionality because the functionality was previously initiated by the user during a different usage-session. In some embodiments, a usage-session is a period of time in which the content application is active on the electronic device. For example, the electronic device optionally presents a user interface of the content application on a display. As another example, the electronic device optionally plays content using the content application. The usage session optionally begins when the electronic device detects a user input for presenting a user interface of the content application or a user input for playing an item of content with the content application, optionally without presenting the user interface of the content application (e.g., a user input for playing content that is received while the electronic device presents a system user interface of the electronic device). The usage-session optionally ends when the user dismisses the user interface of the content application and/or stops playing content with the content application. In some embodiments, the usage-session ends when the content application is completely closed on the electronic device such that it is not running in the background of the electronic device.

The above-described manner of tracking whether the functionality has been initiated by the user over multiple usage-sessions of the content application allows the electronic device to forgo presenting information about functionality that has been initiated by the user previously, which simplifies interactions between the user and the electronic device and enhances the operability of the electronic device (e.g., by presenting information that is relevant to the user and forgoing presenting information that is not relevant to the user), which, additionally, reduces power and improves battery life of the electronic device by enabling the user to use the electronic device more quickly and efficiently.

In some embodiments, such as in FIG. 6L, whether the criterion is satisfied is based on user interaction with the content application prior to the input to perform the action over a plurality of separate usage-sessions of the content application (722). In some examples, if the criterion include repeated performance of a particular user interaction with the content application, the number of times a user performs the particular user interaction is optionally cumulative across multiple usage-sessions. For example, if the criteria include the user saving an item of streaming content to the library a threshold number of times, and the electronic device detects, across multiple usage-sessions, the threshold number of user inputs for saving items of streaming content to the library, the criteria are optionally met even if the electronic device does not detect the threshold number of user inputs for saving items of streaming content to the library in a single usage-session.

The above-described manner of tracking information-display criteria over multiple usage-sessions of the content application allows the electronic device to present information that becomes relevant to the user once they've used the content application multiple times, which simplifies interactions between the user and the electronic device and enhances the operability of the electronic device (e.g., by allowing criteria to be met over the course of multiple sessions without requiring the criteria to be met in a single session), which, additionally, reduces power and improves battery life of the electronic device by enabling the user to use the electronic device more quickly and efficiently.

In some embodiments, such as in FIG. 6D, displaying, on the display 504a, the information about the respective functionality of the content application comprises displaying the information 616 about the respective functionality of the content application overlaid on the user interface of the content application (724). In some embodiments, prior to presenting the information about the respective functionality of the content application, the electronic device presents a user interface of the content application, including presenting part of the user interface of the content application in a first area of the display. When the electronic device presents the information about the respective functionality, the electronic device optionally ceases to display the portion of the user interface of the content application that was displayed in the first region of the display and optionally displays, in the first region of the display, the information about the respective functionality of the content application. The electronic device optionally continues to display other portions of the content application user interface in other regions of the display. In some embodiments, the other portions of the content application user interface are greyed out or have a faded appearance while the information about the respective functionality of the content application is being displayed.

The above-described manner of presenting the information about the respective functionality of the content application as an overlay over the user interface of the content application allows the electronic device to present the information about the content application within the content application, which simplifies interactions between the user and the electronic device and enhances the operability of the electronic device (e.g., by avoiding possible confusion caused by ceasing the display of the content application user interface), which, additionally, reduces power and improves battery life of the electronic device by enabling the user to use the electronic device more quickly and efficiently.

In some embodiments, such as in FIG. 6C, the information display criteria are satisfied based on user interaction with respect to streaming content in the content application prior to the input 603 to perform the action (726). In some examples, streaming content optionally includes content that is licensed to the user for playback during a period of time in which the user subscribes to the streaming service. If the information display criteria include detecting a user input for initiating playback of an item of streaming content a threshold number of times, detecting a user input for initiating playback of streaming content is optionally counted towards satisfying the criteria, but detecting a user input for initiating playback of non-streaming content, described below, optionally does not count towards satisfying the information display criteria. Similarly, in some embodiments, the information display criteria include a criterion that is satisfied when the respective functionality of the content application has not yet been initiated by the user. The respective functionality of the content application is optionally considered not to have been initiated by the user yet if it has not been initiated with respect to the streaming content. For example, if the respective functionality is creating a playlist, then the criterion is optionally satisfied if the electronic device has not yet detected user action to create a playlist with streaming content. If the electronic device detects a user input to add streaming content to a playlist, then the criteria are optionally precluded from being satisfied. In some embodiments, such as in FIG. 6C, the information display criteria are not satisfied based on user interaction with respect to non-streaming content in the content application prior to the input 603 to perform the action (728). In some examples, non-streaming content optionally includes items of content owned by the user (e.g., content purchased for download and unlimited playback regardless of any streaming service subscriptions, content created by the user, etc.). User inputs detected by the electronic device with respect to non-streaming content optionally do not count towards satisfying information-display criteria. For example, if the information display criteria include detecting a threshold number of user inputs for saving items of streaming content to the library, the criteria are not satisfied when the electronic device detects that the user has added non-streaming content to the library the threshold number of times. Furthermore, if the criteria further include a criterion that is satisfied if the user has not yet added streaming content to a playlist, adding non-streaming content to a playlist does not preclude the criteria from being satisfied.

The above-described manner of basing the information display criteria on interactions with streaming content allows the electronic device to present information about the streaming catalog, which simplifies interactions between the user and the electronic device and enhances the operability of the electronic device (e.g., by presenting information that is new to the user, such as when the user is new to the streaming service), which, additionally, reduces power and improves battery life of the electronic device by enabling the user to use the electronic device more quickly and efficiently.

In some embodiments, such as in FIG. 6D, displaying, on the display 504a, the information 616 about the respective functionality of the content application comprises concurrently displaying (730): the information 616b about the respective functionality of the content application (732); and an image or a video 616c that depicts how to perform the respective functionality in the content application (734). In some embodiments, the information about the respective functionality of the content application is text describing how to enter a user input for causing the electronic device to perform the respective functionality of the content application. For example, text describing adding an item of content to the library optionally reads "Tap the '+' icon to save a song, album, or playlist to the library." In some embodiments, the image or video that depicts how to perform the respective functionality in the content application is an image or video that depicts part of the user interface of the content application associated with performing the respective functionality. For example, if the respective functionality is adding an item of content to the library, the image is optionally an image of the selectable option that causes the electronic device to add content to the library (e.g., a "+" icon) or the video is optionally a video that shows the selectable option being selected.

The above-described manner of presenting an image that depicts how to perform the respective functionality of the content application allows the electronic device to efficiently communicate information to the user, which simplifies interactions between the user and the electronic device and enhances the operability of the electronic device (e.g., by reducing the amount of text necessary to convey the information), which, additionally, reduces power and improves battery life of the electronic device by enabling the user to use the electronic device more quickly and efficiently.

In some embodiments, such as in FIG. 6D, in accordance with a determination that a network connection of the electronic device 500a has a first characteristic, the electronic device displays the information 616 about the respective functionality of the content application concurrently with the image 616c that depicts how to perform the respective functionality in the content application (736). In some embodiments, if the network connection speed, bandwidth, latency, or other characteristic is below a threshold value for the characteristic, the electronic device optionally presents an image along with the information describing the respective functionality. The network connection is optionally an internet connection such as a cellular data connection, a WiFi connection, or the like. In some embodiments, such as in FIG. 6D, in accordance with a determination that the network connection of the electronic device 500a has a second characteristic, different than the first characteristic, the electronic device displays the information 616 about the respective functionality of the content application concurrently with the video 616c that depicts how to perform the respective functionality in the content application (738). In some embodiments, if the network connection speed, bandwidth, latency, or other characteristic is above the threshold value for the characteristic, the electronic device optionally presents a video along with the information describing the respective functionality.

The above-described manner of selecting between presenting a video or an image based on a characteristic of a network connection of the electronic device allows the electronic device to reduce latency by presenting an image when presenting a video is not feasible due to the characteristic of the network connection, which simplifies interactions between the user and the electronic device and enhances the operability of the electronic device, which, additionally, reduces power and improves battery life of the electronic device by enabling the user to use the electronic device more quickly and efficiently.

In some embodiments, such as in FIG. 6M, displaying, on the display 504a, the information 622 about the respective functionality of the content application comprises concurrently displaying (740): the information 622b about the respective functionality of the content application (742); and a selectable option 622d that, when selected, causes the respective functionality of the content application to be performed (744), such as in FIGS. 6N-6O. For example, if the respective functionality is displaying text associated with an item of content, the displayed information optionally includes text that reads "View the lyrics of a song from the 'Now Playing' screen." For example, the electronic device is able to present information about viewing text associated with an item of content (e.g., song lyrics) and the information about viewing the text associated with an item of content includes a selectable option that, when selected, causes the electronic device to present the text associated with an item of content that is currently playing in the content application. To show the text associated with the item of content, the electronic device optionally ceases displaying the information about viewing the text associated with an item of content and instead displays, in a user interface of the content application, the text associated with the item of content that is currently playing.

The above-described manner of presenting a selectable option that, when selected, causes the electronic device to perform the respective functionality of the content application allows the electronic device to quickly demonstrate a previously-uninitiated functionality of the content application, which simplifies interactions between the user and the electronic device and enhances the operability of the electronic device (e.g., by performing the function and dismissing the information without requiring separate user inputs), which, additionally, reduces power and improves battery life of the electronic device by enabling the user to use the electronic device more quickly and efficiently.

In some embodiments, such as in FIGS. 6S-6V, displaying, on the display 504a, the information 624 about the respective functionality of the content application comprises concurrently displaying (746): the information 624b about the respective functionality of the content application (748); and a selectable option 624d that, when selected, causes the electronic device to display, on the display 504a, a respective user interface from which the user is able to perform the respective functionality of the content application (750). For example, if the respective functionality is activating a setting to automatically download content as it is saved to the library, the information optionally includes text that reads "If you want to download songs as they are added to the library, turn on the Automatic Downloads setting." For example, the information about activating the automatic downloads setting optionally includes a selectable option labeled "Go to Settings" that, when activated, presents a settings user interface with a selectable option to turn on automatic downloads. In some embodiments, other functionality of the content application is performed from other user interfaces, such as user interfaces of the content application or a voice assistant user interface. For these functions of the content application, the selectable option optionally navigates to the respective user interface in which the user is able to perform the action.

The above-described manner of providing an option for navigating to a user interface for performing the respective functionality of the content application allows the electronic device to concisely demonstrate to the user where to perform the respective functionality of the content application, which simplifies interactions between the user and the electronic device and enhances the operability of the electronic device (e.g., by dismissing the information and navigating the user interface in response to single input, rather than requiring multiple inputs), which, additionally, reduces power and improves battery life of the electronic device by enabling the user to use the electronic device more quickly and efficiently.

In some embodiments, such as in FIGS. 6M-6O, the selectable option 622d, when selected, causes the electronic device 500a to display, on the display, an animation of navigating from the user interface of the content application to the respective user interface from which the user is able to perform the respective functionality of the content application (752). For example, when the electronic device detects selection of the selectable option to see how to view text associated with an item of content (e.g., song lyrics), the electronic device optionally presents a user interface of the content application in which the text can be viewed and scrolls the user interface to reveal the text associated with the content.

The above-described manner of animating navigating a user interface to the part of the user interface from which the user is able to perform the respective functionality of the content application allows the electronic device to visually demonstrate to the user how the functionality is performed, which simplifies interactions between the user and the electronic device and enhances the operability of the electronic device (e.g., by reducing the amount of text that is required to provide information about the respective functionality), which, additionally, reduces power and improves battery life of the electronic device by enabling the user to use the electronic device more quickly and efficiently.

In some embodiments, such as in FIGS. 6M-6O, the selectable option 622d, when selected, causes the electronic device 500a to scroll the respective user interface to a first portion of the respective user interface from which the user is able to perform the respective functionality of the content application (754). In some examples, the respective user interface is optionally a user interface of the content application, a user interface of a different application, or a system user interface. For example, in response to detecting selection of the "Go to Settings" affordance included in the information about the automatic downloads setting, the electronic device presents a settings user interface and scrolls the settings user interface to a location in the settings user interface where the "Automatic downloads" setting is presented. In some embodiments, the first portion of the respective user interface from which the user is able to perform the respective functionality of the content application is initially not displayed on the display until the user interface is scrolled. In some embodiments, the respective user interface includes a second portion, such as in FIG. 6N, from which the user is not able to perform the respective functionality of the content application (756). In some embodiments, the user interface includes content, such as selectable options, that are related to functionality other than the respective functionality of the content application. For example, the electronic device also presents other selectable options in the settings user interface that are associated with settings other than the "Automatic downloads" setting.

The above-described manner of scrolling the user interface to the portion of the user interface where the user is able to perform the respective functionality of the content application allows the electronic device to visually demonstrate how the functionality is performed, which simplifies interactions between the user and the electronic device and enhances the operability of the electronic device (e.g., by reducing the amount of text necessary to convey the information about the respective functionality), which, additionally, reduces power and improves battery life of the electronic device by enabling the user to use the electronic device more quickly and efficiently.

In some embodiments, such as in FIGS. 6W-6Z, the input 603 to perform the action in the content application is received while the electronic device 500b is concurrently displaying, on the display 504b, the user interface of the content application in a first portion of the display, and a user interface 658 of a second application, different than the content application, in a second portion of the display (758). In some examples, the electronic device optionally presents the user interface of the content application and the user interface of a second application in different segments of the display, such as in a split view. In some embodiments, the split view is one of a half and half view where each user interface optionally occupies half of the display or a one-third and two-thirds view in which one of the applications occupies one third of the display and the other application occupies two thirds of the display. In some embodiments, the user interfaces are displayed in two windows that, together, do not occupy the entire display and, in some situations, are able to overlap. In some embodiments, the information 626 about the respective functionality of the content application is displayed in the first portion of the display 504b (760), as shown in FIG. 6Z. In some embodiments, the information about the respective functionality of the content application is presented in the portion of the display in which the user interface of the content application is displayed. For example, if the content application user interface occupies two-thirds of the display and the display is oriented in a landscape orientation, the information about the respective functionality is optionally displayed in the center of the user interface of the content application without spanning the width of the two-thirds of the display in which the user interface of the content application is being displayed. As another example, if the content application user interface is presented using half the display or one-third of the display in either the portrait or landscape orientation, or using two-thirds of the display in portrait orientation, the information about the respective functionality of the content application is optionally presented in the portion of the display in which the user interface of the content application is displayed and spans the width of the user interface of the content application.

The above-described manner of presenting the information about the respective functionality in a region of the display where the content application user interface is presented allows the electronic device to present the information in a way that is visually associated with the content application, which simplifies interactions between the user and the electronic device and enhances the operability of the electronic device (e.g., by conveying the association of the information to the content application), which, additionally, reduces power and improves battery life of the electronic device by enabling the user to use the electronic device more quickly and efficiently.

In some embodiments, such as in FIGS. 6A-6D, the information-display criteria are satisfied when the user has played-back streaming content in the content application more than a predetermined number of times without adding streaming content to a content library of the user in the content application (762). In some embodiments, the electronic device has played back streaming content a threshold number of times (e.g., 6, 8, 10, or some other number of times) but the user has not yet added streaming content to the library. This criterion optionally includes playing a second item of content after a first item of content is done playing without a user input to play the second item of content (e.g., playing the next song in an album or playlist). In some embodiments, however, this criterion optionally does not include playing an item of content without a user input to play that specific item of content and is a threshold number of times the electronic device detects a user input to play an item of content. In some embodiments, the library is a list of content items that have been added to the library by the user, thus enabling the user to quickly find content they wish to access easily. In some embodiments, such as in FIG. 6C, the input 603 to perform the action comprises an input to play a respective content item in the content application (764). In some examples, in response to detecting a user input to play streaming content that is received when the information-display criteria are satisfied, the electronic device optionally plays the respective content item and displays information about the respective functionality of the content application (e.g., saving items of streaming content to the library). In some embodiments, such as in FIG. 6D, the information 616 about the respective functionality of the content application includes (766): information 616b about adding streaming content to the content library of the user in the content application (768), an image 616c that depicts a portion of the user interface of the content application from which the user is able to add streaming content to the content library of the user in the content application (770), and a selectable option 616d that, when selected, causes the electronic device 500a to cease displaying the information about the respective functionality of the content application on the display (772). In some embodiments, the information about adding streaming content to the content library of the user in the content application is text that describes the respective functionality of the content application and text that describes the user input for performing the respective functionality of the content application. For example, the text optionally reads "Tap the "+" icon to save a song, playlist, or album to your library." In some embodiments, the image is an image illustrating the "+" icon that, if selected, causes the respective item of content to be added to the library or some other image. In some embodiments, when the electronic device ceases displaying the information about the respective functionality of the content application, the electronic device presents a user interface of the content application, such as the user interface of the content application that was displayed when the input to perform the action was received. The user interface of the content application optionally includes the selectable option for performing the respective functionality, such as a representation of an item of content and the "+" icon that, when selected, causes the item of content to be added to the library.

The above-described manner of presenting information about adding streaming content to the content library allows the electronic device to teach the user how to use the content library, which simplifies interactions between the user and the electronic device and enhances the operability of the electronic device (e.g., by allowing the user to create a curated collection of content items), which, additionally, reduces power and improves battery life of the electronic device by enabling the user to use the electronic device more quickly and efficiently.

In some embodiments, such as in FIGS. 6E-6H, the information-display criteria are satisfied when (774): the user has added streaming content to a content library of the user in the content application more than a predetermined number of times (776), and the content library of the user in the content application includes no streaming content that has been downloaded to the electronic device for offline playback (778). In some embodiments, the criteria are satisfied when a predetermined number (e.g., 6, 8, 10 or some other number) of "add events" have been detected. An add event optionally includes adding a single item of content (e.g., a song) or adding a collection of items of content (e.g., a playlist or album). In some embodiments, adding content to the library causes the item of content (or the items of content in the collection of content) that was added to be viewed in the library, allowing the user to easily access those items of content. In some examples, the items of streaming content in the library are optionally not stored on the electronic device. Rather, in some embodiments, the electronic device is configured to stream the items of content from a different electronic device (e.g., a server) via a network connection (e.g., a wireless connection such as the internet). The criteria are optionally not precluded from being met when the library includes non-streaming content, such as content that is owned by the user, that is stored on the electronic device. In some embodiments, such as in FIG. 6G, the input 603 to perform the action comprises an input to add a respective streaming content item to the content library of the user in the content application (780). In some embodiments, in response to detecting a user input for adding the respective streaming content item to the content library while the criteria have been met, the electronic device presents information about the respective functionality of the content application. For example, the respective functionality of the electronic device is optionally downloading items of streaming content for offline playback. In some embodiments, such as in FIG. 6H, the information 618 about the respective functionality of the content application includes (782): information 618b about downloading streaming content to the electronic device for offline playback (784), and a selectable option 618d that, when selected, causes the electronic device to cease displaying the information about the respective functionality of the content application on the display (786). In some examples, the information optionally includes text that describes the respective functionality of the content application, such as downloading streaming content to the electronic device for offline playback, and a description of the user input for performing the respective functionality. For example, the information optionally includes text that reads "Select the cloud icon to download songs, albums, or playlists for offline listening." In some embodiments, when the electronic device ceases displaying the information about the respective functionality of the content application, the electronic device instead displays a user interface of the content application, such as the user interface that was being displayed when the input to perform the action was received. In some embodiments, the user is able to perform the respective functionality from the user interface of the content application that is displayed after the information about the respective functionality ceases to be displayed. For example, the user interface that includes the option to save an item of content to the library is optionally the same as the user interface that includes the option to download an item of streaming content for offline listening. Thus, the user interface that was presented when the user input for performing the action of saving an item of content to the library is optionally the same as the user interface that is presented when the electronic device ceases to display the information about the respective functionality of the content application and the user is able to perform the respective functionality when that user interface is displayed.

The above-described manner of presenting information about saving items of content to the electronic device for offline playback allows the electronic device to teach the user how to play content without a network connection, which simplifies interactions between the user and the electronic device and enhances the operability of the electronic device (e.g., by playing the content regardless of the status of the network connection of the electronic device), which, additionally, reduces power and improves battery life of the electronic device by enabling the user to use the electronic device more quickly and efficiently.

In some embodiments, such as in FIGS. 6I-6J, the information-display criteria are satisfied when (788): the user has added streaming content to a content library of the user in the content application more than a predetermined number of times (790), and the content library of the user in the content application includes no playlists that include streaming content (792). In some embodiments, the criteria are satisfied when a predetermined number (e.g., 16, 18, 20 or some other number) of "add events" have been detected. An add event optionally includes adding a single item of content (e.g., a song) or adding a collection of items of content (e.g., a playlist or album). In some embodiments, adding content to the library causes the item of content (or the items of content in the collection of content) that was added to be viewed in the library, allowing the user to easily access those items of content. In some embodiments, the criteria are not precluded from being satisfied if the library includes one or more playlists including non-streaming content items, such as playlists including items of content that are owned by the user. In some embodiments, such as in FIG. 6I, the input 603 to perform the action comprises an input to add one or more streaming content items to the content library of the user in the content application (794). In some embodiments, in response to detecting a user input for adding the respective streaming content item to the content library while the criteria have been met, the electronic device presents information about the respective functionality of the content application. For example, the respective functionality of the electronic device is optionally creating playlists from streaming content items. In some embodiments, such as in FIG. 6J, the information 620 about the respective functionality of the content application includes (796): information 620b about creating playlists that include streaming content (798), and a selectable option 620d that, when selected, causes the electronic device 500a to cease displaying the information about the respective functionality of the content application on the display (798-2). In some examples, the information optionally includes a description of the respective functionality of the content application, such as creating playlists that include streaming content, and a description of the input that causes the electronic device to perform the function of the streaming application. For example, the information optionally includes text that reads "Press into a song to add it to a playlist." In some examples, when the electronic device ceases displaying the information about the respective functionality of the content application, the electronic device optionally presents a user interface of the content application. The user interface of the content application is optionally the user interface that was presented when the user input to perform the action (e.g., adding an item of content to the library) was received. In some embodiments, the user is able to perform the respective functionality at the displayed user interface. For example, the user is able to save items of content to the library and add items of content to playlists from the same user interface of the content application.

The above-described manner of providing information about creating playlists allows the electronic device to teach the user how to curate collections of content, which simplifies interactions between the user and the electronic device and enhances the operability of the electronic device (e.g., by allowing the user to group items of content they wish to play one after another), which, additionally, reduces power and improves battery life of the electronic device by enabling the user to use the electronic device more quickly and efficiently.

In some embodiments, such as in FIGS. 6K-6O, the information-display criteria are satisfied when (798-4): the electronic device 500a has displayed the content application more than a predetermined number of times during separate usage sessions of the content application (798-6), and the user has not yet displayed lyrics for a content item in the content application (798-8). In some examples, the electronic device has optionally detected a user input to launch the content application and to display a user interface of the content application a predetermined number (e.g., 5, 7, 9, or some other number) of times. In some embodiments, usage sessions in which the user does not view the user interface of the content application (e.g., playing content from the content application from a system user interface of the electronic device) do not count towards meeting the criteria. In some embodiments, in this example, content items include streaming content items and non-streaming content items. In some embodiments, such as in FIG. 6L, the input 603 to perform the action comprises an input to initiate playback of a content item during a new usage session of the content application for which lyrics are available (798-10). In some examples, lyrics are optionally not available for all content items available to the content application. In some embodiments, the electronic device presents information about the respective functionality of the content application in response to a user input to play an item of content for which lyrics are available that is received while the information display criteria are satisfied. The respective functionality of the content application is optionally viewing the lyrics of an item of content in the content application. In some embodiments, such as in FIG. 6M, the information 622 about the respective functionality of the content application includes (798-12): information 622b about displaying lyrics for the content item in the content application (798-14), and a selectable option 622d that, when selected, causes the electronic device to display an animation, such as in FIGS. 6N-6O, of navigating from the user interface of the content application to a respective user interface of the content application that includes the lyrics 652 for the content item (798-16). In some examples, the information optionally includes a description of the respective functionality of the electronic device, such as viewing lyrics of an item of content. For example, the information optionally includes text that reads "View the lyrics of a song that is currently playing." In some embodiments, the information includes a description of how the user causes the electronic device to perform the functionality. For example, the text optionally reads "Scroll to view the lyrics of a song that is currently playing." In some examples, in response to detecting selection of the selectable option, the electronic device optionally ceases displaying the information about the respective functionality of the content application and presents a user interface of the content application and scrolls the user interface to a section in which the lyrics are visible.

The above-described manner of presenting information about displaying lyrics of items of content allows the electronic device to teach the user how to view the lyrics within the content application, which simplifies interactions between the user and the electronic device and enhances the operability of the electronic device (e.g., by saving the user the steps of opening a different application to view the lyrics of an item of content), which, additionally, reduces power and improves battery life of the electronic device by enabling the user to use the electronic device more quickly and efficiently.

In some embodiments, such as in FIGS. 6P-6V, the information-display criteria are satisfied when (798-18): the user has downloaded more than a predetermined number of streaming content items to a content library of the user in the content application (798-20), and a setting for automatically downloading, to the electronic device 500a, content items that are included in the content library of the user is not enabled (798-22). In some examples, the electronic device has optionally detected a user input for downloading an item of content a predetermined number (e.g., 13, 15, 17, or some other number of times. In some embodiments, one user input for downloading content causes the electronic device to download multiple items of content (e.g., songs) in a group of content items (e.g., an album or playlist). In some examples, when the electronic device saves an item of content to the content library, the items of content in the content library are optionally visible in the content library but optionally not saved on the electronic device. In some embodiments, in response to a user input to play an item of content that is not saved on the electronic device, the electronic device streams the content from a second electronic device (e.g., a server) via a network connection (e.g., an internet connection) in order to play it. When the setting for automatically downloading content items is enabled, in response to a user input for adding an item of content to the content library, the electronic device optionally adds the item of content to the content library and stores the item of content on the electronic device, allowing the content to be played back without the electronic device using a network connection (e.g., an internet connection). In some embodiments, such as in FIG. 6R, the input 603 to perform the action comprises an input to download a respective streaming content item to the content library of the user in the content application (798-24). In some examples, in response to detecting a user input to download a respective streaming content item, while the information-display criteria are met, the electronic device optionally presents information about the respective functionality of the content application. For example, the respective functionality is optionally enabling a setting for automatically downloading content items that are included in the content library. In some embodiments, such as in FIG. 6S, the information 624 about the respective functionality of the content application includes (798-26): information 624b about automatically downloading, to the electronic device, content items that are in the content library of the user (798-28), and a selectable option 624d that, when selected, causes the electronic device 500a to display, on the display 504a, a respective user interface from which the user is able to enable the setting for automatically downloading content items that are included in the content library of the user (798-30), such as in FIGS. 6T-6V. In some examples, the information optionally includes a description of the functionality of the content application, such as enabling an automatic downloads setting. For example, the information optionally includes text that reads "Enable the automatic downloads setting to automatically download music that you add to your library." In some embodiments, the information further includes a description of how the user causes the electronic device to perform the function. For example, the text optionally reads "Go to the Settings to enable the automatic downloads setting to automatically download music that you add to your library." In some embodiments, when the electronic device ceases displaying the information about the respective functionality of the content application, the electronic device instead displays a settings user interface. In some embodiments, the electronic device first presents a section of the setting user interface that does not include the automatic downloads setting and then scrolls to a section of the settings user interface that includes the automatic downloads setting. Once the electronic device is done scrolling, the user is optionally able to select the automatic downloads setting to enable automatic downloads.

The above-described manner of presenting information about automatically downloading items of content that are included in the content library allows the electronic device to teach the user how to make their content library available offline, which simplifies interactions between the user and the electronic device and enhances the operability of the electronic device (e.g., by enabling the electronic device to play content regardless of the status of a network connection of the electronic device), which, additionally, reduces power and improves battery life of the electronic device by enabling the user to use the electronic device more quickly and efficiently.

In some embodiments, such as in FIGS. 6W-6CC, the information-display criteria are satisfied when (798-32): the user has not created a content station in the content application based on streaming (798-34) content, and the user has played through an end of a collection of a plurality of associated content items in the content application (798-36). In some embodiments, the electronic device is able to create a content station that is based on an item of streaming content. The content station optionally includes items of content that are similar to the item of streaming content that the content station is based on. For example, the items of content in the content station optionally have a similar genre, artist, or style to the item of content that the content station is based on. In some examples, a collection is optionally an album or a playlist of songs. Playing through a collection of content optionally means playing all of the items of content in the collection. In some embodiments, such as in FIG. 6W, the input 603 to perform the action comprises an input to display the content application on the display during a new usage session after the user has played through the end of the collection of the plurality of associated content items in the content application (798-38). In some embodiments, in response to detecting that the items of content in a collection have been played through and, after the collection has been played through, detecting an input to cause the electronic device to display the content application, and while the information display criteria are met, the electronic device optionally presents the information about the respective functionality of the content application. For example, the respective functionality of the content application is optionally creating a content station. In some embodiments, such as in FIG. 6Z, the information 626 about the respective functionality of the content application includes (798-40): information 626b about creating a content station in the content application based on streaming content (798-42). In some examples, the information about creating a content station optionally includes a description of creating a content station and a description of how the user is able to cause the electronic device to create a content station. For example, the information optionally includes text that reads "Press into a song to create a station based on the song." In some embodiments, the information further includes a selectable option that, when selected, causes the electronic device to cease displaying the information about the respective functionality of the content application.

The above-described manner of presenting information about creating a content station based on an item of content allows the electronic device to teach the user how to play content that is similar to an item of content they enjoy, which simplifies interactions between the user and the electronic device and enhances the operability of the electronic device (e.g., by enabling the user to, without additional user input, discover content they enjoy), which, additionally, reduces power and improves battery life of the electronic device by enabling the user to use the electronic device more quickly and efficiently.

In some embodiments, such as in FIGS. 6CC-6DD, the information 628 about creating a content station in the content application based on streaming content includes a selectable option 628d that, when selected, causes the electronic device 500a to display, on the display 504a, a voice input user interface 660 that is configured to receive voice input for creating a content station in the content application based on streaming content (798-44). In some embodiments, the information about the respective functionality of the content application includes text that reads "Ask the voice assistant to create a station based on a song." The information optionally further includes a selectable option that, when selected, causes the electronic device to cease the display of the content application and to display a voice assistant user interface.

The above-described manner of informing the user that they can use the voice assistant to create a content station based on an item of content allows the electronic device to teach the user how to perform content application functions with the voice assistant, which simplifies interactions between the user and the electronic device and enhances the operability of the electronic device (e.g., by using the voice assistant rather than navigating a displayed menu), which, additionally, reduces power and improves battery life of the electronic device by enabling the user to use the electronic device more quickly and efficiently.

In some embodiments, such as in FIGS. 6EE-6II, the information-display criteria are satisfied when (798-46): the user has not created a content station in the content application based on a content consumption history of the user in the content application (798-48), and the user has played through a collection of a plurality of associated content items in the content application more than a predetermined number of times (798-50). In some embodiments, the electronic device is able to create a content station that is based on one or more of the items of content the user has saved to the content library, the items of content the user has played with the content application the most, or similar content consumption history of the content application. The content station optionally includes items of content that are similar to the content consumption history. For example, the items of content in the content station optionally have a similar genre, artist, or style to the content consumption history. In some embodiments, the user has played all of the songs in an album, playlist, or some of the songs in the content library by shuffling the library 5, 7, 9, or some other number of times. In some embodiments, such as in FIG. 6GG, the input 603 to perform the action comprises an input to display content items in a content library of the user in the content application (798-52). In some embodiments, the electronic device detects selection of an option that, when selected, causes the electronic device to present the content library in the content application user interface. In response to detecting the user input while the information-display criteria are met, the electronic device optionally presents information about a respective functionality of the content application. For example, the respective functionality of the content application is optionally the ability to play a content station that is based on a content consumption history of the content application. In some embodiments, such as in FIG. 6HH, the information 630 about the respective functionality of the content application includes (798-54): information 630b about creating a content station in the content application based on the content consumption history of the user in the content application (798-56), and a selectable option 630d that, when selected, causes the electronic device to display, on the display 504b, a voice input user interface 660, such as in FIG. 6II, that is configured to receive voice input for creating a content station in the content application based on the content consumption history of the user in the content application (798-58). In some embodiments, the information includes a description of the respective functionality of the content application, such as creating a content station based on the content consumption history of the content application, and information about how the user is able to cause the electronic device to perform the respective functionality. For example, the information optionally includes text that reads "Create a personal station by asking the voice assistant to play music that you like." In some embodiments, in response to detection selection of the selectable option, the electronic device ceases the display of the content application user interface including the information about the respective functionality of the content application and displays a voice assistant user interface.

The above-described manner of presenting information about creating a content station based on content consumption history allows the electronic device to teach the user how to discover content that is similar to content they have already consumed, which simplifies interactions between the user and the electronic device and enhances the operability of the electronic device (e.g., by providing the user with new content), which, additionally, reduces power and improves battery life of the electronic device by enabling the user to use the electronic device more quickly and efficiently.

It should be understood that the particular order in which the operations in FIGS. 7A-7N have been described is merely exemplary and is not intended to indicate that the described order is the only order in which the operations could be performed. One of ordinary skill in the art would recognize various ways to reorder the operations described herein.

The operations in the information processing methods described above are, optionally, implemented by running one or more functional modules in an information processing apparatus such as general purpose processors (e.g., a as described with respect to FIGS. 1A-1B, 3, 5A-5H) or application specific chips. Further, the operations described above with reference to FIGS. 7A-7N are, optionally, implemented by components depicted in FIGS. 1A-1B. For example, displaying operations 702, 708, 712, 724, 730, 736, 738, 740, 746, and 798-6 and receiving operation 704 are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology is the gathering and use of data available from specific and legitimate sources to facilitate the streaming of content from one electronic device to another. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to create content recommendations based on content consumption history and present information about functionalities of the content application based on previous user interactions with the content application. Accordingly, use of such personal information data enables users to enter fewer inputs to perform an action with respect to the streaming mode. Further, other uses for personal information data that benefit the user are also contemplated by the present disclosure. For instance, content consumption history may be used to generate suggested content for the user.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the user is able to configure one or more electronic devices to change the discovery or privacy settings of the electronic device. For example, the user can select a setting that manages the privacy of their content consumption history.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:
at an electronic device in communication with a display and one or more input devices:
displaying, on the display, a user interface of a content application that includes one or more representations of one or more content items selectable to initiate playback of the one or more content items, respectively;
while displaying the user interface of the content application, receiving, via the one or more input devices, an input directed to a content item of the one or more content items to perform an action with respect to the content item, wherein the action is associated with the content item and respective functionality of the content application that has not yet been initiated by a user of the content application; and
in response to receiving the input to perform the action:
in accordance with a determination that information-display criteria are satisfied, including a criterion that is satisfied based on user interaction with the content application prior to the input to perform the action, displaying, on the display, information about the respective functionality of the content application, wherein displaying the information about the respective functionality includes displaying information about performing a second action, different from the action, with respect to the content item; and
in accordance with a determination that the information-display criteria are not satisfied:
forgoing displaying, on the display, the information about performing the second action; and
performing the action in the user interface of the content application in accordance with the input.

2. The method of claim 1, further comprising:
in response to receiving the input to perform the action:
in accordance with the determination that the information-display criteria are satisfied, performing the action in the user interface of the content application in accordance with the input.

3. The method of claim 1, wherein the respective functionality of the content application has not yet been initiated by the user of the content application over a plurality of separate usage-sessions of the content application.

4. The method of claim 1, wherein whether the criterion is satisfied is based on user interaction with the content application prior to the input to perform the action over a plurality of separate usage-sessions of the content application.

5. The method of claim 1, wherein displaying, on the display, the information about the respective functionality of the content application comprising displaying the information about the respective functionality of the content application overlaid on the user interface of the content application.

6. The method of claim 1, wherein:
the information-display criteria are satisfied based on user interaction with respect to streaming content in the content application prior to the input to perform the action, and
the information-display criteria are not satisfied based on user interaction with respect to non-streaming content in the content application prior to the input to perform the action.

7. The method of claim 1, wherein displaying, on the display, the information about the respective functionality of the content application comprises concurrently displaying:
the information about the respective functionality of the content application; and
an image or a video that depicts how to perform the respective functionality in the content application.

8. The method of claim 7, wherein:
in accordance with a determination that a network connection of the electronic device has a first characteristic, the electronic device displays the information about the respective functionality of the content application concurrently with the image that depicts how to perform the respective functionality in the content application, and in accordance with a determination that the network connection of the electronic device has a second characteristic, different than the first characteristic, the electronic device displays the information about the respective functionality of the content application concurrently with the video that depicts how to perform the respective functionality in the content application.

9. The method of claim 1, wherein displaying, on the display, the information about the respective functionality of the content application comprises concurrently displaying:
the information about the respective functionality of the content application; and
a selectable option that, when selected, causes the respective functionality of the content application to be performed.

10. The method of claim 1, wherein displaying, on the display, the information about the respective functionality of the content application comprises concurrently displaying:
the information about the respective functionality of the content application; and
a selectable option that, when selected, causes the electronic device to display, on the display, a respective user interface from which the user is able to perform the respective functionality of the content application.

11. The method of claim 10, wherein the selectable option, when selected, causes the electronic device to display, on the display, an animation of navigating from the user interface of the content application to the respective user interface from which the user is able to perform the respective functionality of the content application.

12. The method of claim 10, wherein:
the selectable option, when selected, causes the electronic device to scroll the respective user interface to a first portion of the respective user interface from which the user is able to perform the respective functionality of the content application, and
the respective user interface includes a second portion from which the user is not able to perform the respective functionality of the content application.

13. The method of claim 1, wherein:
the input to perform the action in the content application is received while the electronic device is concurrently displaying, on the display, the user interface of the content application in a first portion of the display, and a user interface of a second application, different than the content application, in a second portion of the display, and
the information about the respective functionality of the content application is displayed in the first portion of the display.

14. The method of claim 1, wherein:
the information-display criteria are satisfied when the user has played-back streaming content in the content application more than a predetermined number of times without adding streaming content to a content library of the user in the content application,
the input to perform the action comprises an input to play a respective content item in the content application, and
the information about the respective functionality of the content application includes:
information about adding streaming content to the content library of the user in the content application, and
an image that depicts a portion of the user interface of the content application from which the user is able to add streaming content to the content library of the user in the content application, and a selectable option that, when selected, causes the electronic device to cease displaying the information about the respective functionality of the content application on the display.

15. The method of claim 1, wherein:
the information-display criteria are satisfied when:
the user has added streaming content to a content library of the user in the content application more than a predetermined number of times, and
the content library of the user in the content application includes no streaming content that has been downloaded to the electronic device for offline playback,
the input to perform the action comprises an input to add a respective streaming content item to the content library of the user in the content application, and
the information about the respective functionality of the content application includes:
information about downloading streaming content to the electronic device for offline playback, and
a selectable option that, when selected, causes the electronic device to cease displaying the information about the respective functionality of the content application on the display.

16. The method of claim 1, wherein:
the information-display criteria are satisfied when:
the user has added streaming content to a content library of the user in the content application more than a predetermined number of times, and
the content library of the user in the content application includes no playlists that include streaming content,
the input to perform the action comprises an input to add one or more streaming content items to the content library of the user in the content application, and
the information about the respective functionality of the content application includes:
information about creating playlists that include streaming content, and
a selectable option that, when selected, causes the electronic device to cease displaying the information about the respective functionality of the content application on the display.

17. The method of claim 1, wherein:
the information-display criteria are satisfied when:
the electronic device has displayed the content application more than a predetermined number of times during separate usage sessions of the content application, and
the user has not yet displayed lyrics for a content item in the content application,
the input to perform the action comprises an input to initiate playback of a content item during a new usage session of the content application for which lyrics are available, and
the information about the respective functionality of the content application includes:
information about displaying lyrics for the content item in the content application, and
a selectable option that, when selected, causes the electronic device to display an animation of navigating from the user interface of the content application to a respective user interface of the content application that includes the lyrics for the content item.

18. The method of claim 1, wherein:
the information-display criteria are satisfied when:
the user has downloaded more than a predetermined number of streaming content items to a content library of the user in the content application, and a setting for automatically downloading, to the electronic device, content items that are included in the content library of the user is not enabled,
the input to perform the action comprises an input to download a respective streaming content item to the content library of the user in the content application, and
the information about the respective functionality of the content application includes:
information about automatically downloading, to the electronic device, content items that are in the content library of the user, and
a selectable option that, when selected, causes the electronic device to display, on the display, a respective user interface from which the user is able to enable the setting for automatically downloading content items that are included in the content library of the user.

19. The method of claim 1, wherein:
the information-display criteria are satisfied when:
the user has not created a content station in the content application based on streaming content, and
the user has played through an end of a collection of a plurality of associated content items in the content application,
the input to perform the action comprises an input to display the content application on the display during a new usage session after the user has played through the end of the collection of the plurality of associated content items in the content application, and
the information about the respective functionality of the content application includes:
information about creating a content station in the content application based on streaming content.

20. The method of claim 19, wherein the information about creating the content station in the content application based on streaming content includes a selectable option that, when selected, causes the electronic device to display, on the display, a voice input user interface that is configured to receive voice input for creating a content station in the content application based on streaming content.

21. The method of claim 1, wherein:
the information-display criteria are satisfied when:
the user has not created a content station in the content application based on a content consumption history of the user in the content application, and
the user has played through a collection of a plurality of associated content items in the content application more than a predetermined number of times,
the input to perform the action comprises an input to display content items in a content library of the user in the content application, and
the information about the respective functionality of the content application includes:
information about creating a content station in the content application based on the content consumption history of the user in the content application, and
a selectable option that, when selected, causes the electronic device to display, on the display, a voice input user interface that is configured to receive voice input for creating a content station in the content application based on the content consumption history of the user in the content application.

22. The method of claim 1, wherein whether the criterion is satisfied is based on user account interaction with respective content applications across a plurality of electronic devices including the electronic device.

23. The method of claim 1, wherein the information-display criteria is cumulative across a plurality of electronic devices including the electronic device.

24. An electronic device, comprising:
one or more processors;
memory; and
one or more programs, wherein the one or more programs are stored in the memory and configured to be executed by the one or more processors, the one or more programs including instructions for:
displaying, on a display, a user interface of a content application that includes one or more representations of one or more content items selectable to initiate playback of the one or more content items, respectively;
while displaying the user interface of the content application, receiving, via one or more input devices, an input directed to a content item of the one or more content items to perform an action with respect to the content item, wherein the action is associated with the content item and respective functionality of the content application that has not yet been initiated by a user of the content application; and
in response to receiving the input to perform the action:
in accordance with a determination that information-display criteria are satisfied, including a criterion that is satisfied based on user interaction with the content application prior to the input to perform the action, displaying, on the display, information about the respective functionality of the content application, wherein displaying the information about the respective functionality includes displaying information about performing a second action, different from the action, with respect to the content item; and
in accordance with a determination that the information-display criteria are not satisfied:
forgoing displaying, on the display, the information about performing the second action; and
performing the action in the user interface of the content application in accordance with the input.

25. The electronic device of claim 24, wherein the one or more programs further include instructions for:
in response to receiving the input to perform the action:
in accordance with the determination that the information-display criteria are satisfied, performing the action in the user interface of the content application in accordance with the input.

26. The electronic device of claim 24, wherein the respective functionality of the content application has not yet been initiated by the user of the content application over a plurality of separate usage-sessions of the content application.

27. The electronic device of claim 24, wherein whether the criterion is satisfied is based on user interaction with the content application prior to the input to perform the action over a plurality of separate usage-sessions of the content application.

28. The electronic device of claim 24, wherein displaying, on the display, the information about the respective functionality of the content application comprising displaying the information about the respective functionality of the content application overlaid on the user interface of the content application.

29. The electronic device of claim 24, wherein:
the information-display criteria are satisfied based on user interaction with respect to streaming content in the content application prior to the input to perform the action, and the information-display criteria are not satisfied based on user interaction with respect to non-streaming content in the content application prior to the input to perform the action.

30. The electronic device of claim 24, wherein displaying, on the display, the information about the respective functionality of the content application comprises concurrently displaying:
the information about the respective functionality of the content application; and
an image or a video that depicts how to perform the respective functionality in the content application.

31. The electronic device of claim 30, wherein:
in accordance with a determination that a network connection of the electronic device has a first characteristic, the electronic device displays the information about the respective functionality of the content application concurrently with the image that depicts how to perform the respective functionality in the content application, and
in accordance with a determination that the network connection of the electronic device has a second characteristic, different than the first characteristic, the electronic device displays the information about the respective functionality of the content application concurrently with the video that depicts how to perform the respective functionality in the content application.

32. The electronic device of claim 24, wherein displaying, on the display, the information about the respective functionality of the content application comprises concurrently displaying:
the information about the respective functionality of the content application; and
a selectable option that, when selected, causes the respective functionality of the content application to be performed.

33. The electronic device of claim 24, wherein displaying, on the display, the information about the respective functionality of the content application comprises concurrently displaying:
the information about the respective functionality of the content application; and
a selectable option that, when selected, causes the electronic device to display, on the display, a respective user interface from which the user is able to perform the respective functionality of the content application.

34. The electronic device of claim 33, wherein the selectable option, when selected, causes the electronic device to display, on the display, an animation of navigating from the user interface of the content application to the respective user interface from which the user is able to perform the respective functionality of the content application.

35. The electronic device of claim 33, wherein:
the selectable option, when selected, causes the electronic device to scroll the respective user interface to a first portion of the respective user interface from which the user is able to perform the respective functionality of the content application, and
the respective user interface includes a second portion from which the user is not able to perform the respective functionality of the content application.

36. The electronic device of claim 24, wherein:
the input to perform the action in the content application is received while the electronic device is concurrently displaying, on the display, the user interface of the content application in a first portion of the display, and
a user interface of a second application, different than the content application, in a second portion of the display, and
the information about the respective functionality of the content application is displayed in the first portion of the display.

37. The electronic device of claim 24, wherein:
the information-display criteria are satisfied when the user has played-back streaming content in the content application more than a predetermined number of times without adding streaming content to a content library of the user in the content application,
the input to perform the action comprises an input to play a respective content item in the content application, and
the information about the respective functionality of the content application includes:
information about adding streaming content to the content library of the user in the content application, and
an image that depicts a portion of the user interface of the content application from which the user is able to add streaming content to the content library of the user in the content application, and
a selectable option that, when selected, causes the electronic device to cease displaying the information about the respective functionality of the content application on the display.

38. The electronic device of claim 24, wherein:
the information-display criteria are satisfied when:
the user has added streaming content to a content library of the user in the content application more than a predetermined number of times, and
the content library of the user in the content application includes no streaming content that has been downloaded to the electronic device for offline playback,
the input to perform the action comprises an input to add a respective streaming content item to the content library of the user in the content application, and
the information about the respective functionality of the content application includes:
information about downloading streaming content to the electronic device for offline playback, and
a selectable option that, when selected, causes the electronic device to cease displaying the information about the respective functionality of the content application on the display.

39. The electronic device of claim 24, wherein:
the information-display criteria are satisfied when:
the user has added streaming content to a content library of the user in the content application more than a predetermined number of times, and
the content library of the user in the content application includes no playlists that include streaming content,
the input to perform the action comprises an input to add one or more streaming content items to the content library of the user in the content application, and
the information about the respective functionality of the content application includes:
information about creating playlists that include streaming content, and
a selectable option that, when selected, causes the electronic device to cease displaying the information about the respective functionality of the content application on the display.

40. The electronic device of claim 24, wherein:
the information-display criteria are satisfied when:
the electronic device has displayed the content application more than a predetermined number of times during separate usage sessions of the content application, and
the user has not yet displayed lyrics for a content item in the content application,
the input to perform the action comprises an input to initiate playback of a content item during a new usage session of the content application for which lyrics are available, and
the information about the respective functionality of the content application includes:
information about displaying lyrics for the content item in the content application, and
a selectable option that, when selected, causes the electronic device to display an animation of navigating from the user interface of the content application to a respective user interface of the content application that includes the lyrics for the content item.

41. The electronic device of claim 24, wherein:
the information-display criteria are satisfied when:
the user has downloaded more than a predetermined number of streaming content items to a content library of the user in the content application, and
a setting for automatically downloading, to the electronic device, content items that are included in the content library of the user is not enabled,
the input to perform the action comprises an input to download a respective streaming content item to the content library of the user in the content application, and
the information about the respective functionality of the content application includes:
information about automatically downloading, to the electronic device, content items that are in the content library of the user, and
a selectable option that, when selected, causes the electronic device to display, on the display, a respective user interface from which the user is able to enable the setting for automatically downloading content items that are included in the content library of the user.

42. The electronic device of claim 24, wherein:
the information-display criteria are satisfied when:
the user has not created a content station in the content application based on streaming content, and
the user has played through an end of a collection of a plurality of associated content items in the content application,
the input to perform the action comprises an input to display the content application on the display during a new usage session after the user has played through the end of the collection of the plurality of associated content items in the content application, and
the information about the respective functionality of the content application includes:
information about creating a content station in the content application based on streaming content.

43. The electronic device of claim 42, wherein the information about creating the content station in the content application based on streaming content includes a selectable option that, when selected, causes the electronic device to display, on the display, a voice input user interface that is configured to receive voice input for creating a content station in the content application based on streaming content.

44. The electronic device of claim 24, wherein:
the information-display criteria are satisfied when:
the user has not created a content station in the content application based on a content consumption history of the user in the content application, and
the user has played through a collection of a plurality of associated content items in the content application more than a predetermined number of times,
the input to perform the action comprises an input to display content items in a content library of the user in the content application, and
the information about the respective functionality of the content application includes:
information about creating a content station in the content application based on the content consumption history of the user in the content application, and
a selectable option that, when selected, causes the electronic device to display, on the display, a voice input user interface that is configured to receive voice input for creating a content station in the content application based on the content consumption history of the user in the content application.

45. The electronic device of claim 24, wherein whether the criterion is satisfied is based on user account interaction with respective content applications across a plurality of electronic devices including the electronic device.

46. The electronic device of claim 24, wherein the information-display criteria is cumulative across a plurality of electronic devices including the electronic device.

47. A non-transitory computer readable storage medium storing one or more programs, the one or more programs comprising instructions, which when executed by one or more processors of an electronic device, cause the electronic device to:
display, on a display, a user interface of a content application that includes one or more representations of one or more content items selectable to initiate playback of the one or more content items, respectively;
while displaying the user interface of the content application, receive, via one or more input devices, an input directed to a content item of the one or more content items to perform an action with respect to the content item, wherein the action is associated with the content item and respective functionality of the content application that has not yet been initiated by a user of the content application; and
in response to receiving the input to perform the action:
in accordance with a determination that information-display criteria are satisfied, including a criterion that is satisfied based on user interaction with the content application prior to the input to perform the action, display, on the display, information about the respective functionality of the content application, wherein displaying the information about the respective functionality includes displaying information about performing a second action, different from the action, with respect to the content item; and
in accordance with a determination that the information-display criteria are not satisfied:
forgo displaying, on the display, the information about performing the second action; and
perform the action in the user interface of the content application in accordance with the input.

48. The non-transitory computer readable storage medium of claim 47, wherein the one or more programs further cause the electronic device to:
in response to receiving the input to perform the action:
in accordance with the determination that the information-display criteria are satisfied, performing the action in the user interface of the content application in accordance with the input.

49. The non-transitory computer readable storage medium of claim 47, wherein the respective functionality of the content application has not yet been initiated by the user of the content application over a plurality of separate usage-sessions of the content application.

50. The non-transitory computer readable storage medium of claim 47, wherein whether the criterion is satisfied is based on user interaction with the content application prior to the input to perform the action over a plurality of separate usage-sessions of the content application.

51. The non-transitory computer readable storage medium of claim 47, wherein displaying, on the display, the information about the respective functionality of the content application comprising displaying the information about the respective functionality of the content application overlaid on the user interface of the content application.

52. The non-transitory computer readable storage medium of claim 47, wherein:
the information-display criteria are satisfied based on user interaction with respect to streaming content in the content application prior to the input to perform the action, and
the information-display criteria are not satisfied based on user interaction with respect to non-streaming content in the content application prior to the input to perform the action.

53. The non-transitory computer readable storage medium of claim 47, wherein displaying, on the display, the information about the respective functionality of the content application comprises concurrently displaying:
the information about the respective functionality of the content application; and
an image or a video that depicts how to perform the respective functionality in the content application.

54. The non-transitory computer readable storage medium of claim 53, wherein:
in accordance with a determination that a network connection of the electronic device has a first characteristic, the electronic device displays the information about the respective functionality of the content application concurrently with the image that depicts how to perform the respective functionality in the content application, and
in accordance with a determination that the network connection of the electronic device has a second characteristic, different than the first characteristic, the electronic device displays the information about the respective functionality of the content application concurrently with the video that depicts how to perform the respective functionality in the content application.

55. The non-transitory computer readable storage medium of claim 47, wherein displaying, on the display, the information about the respective functionality of the content application comprises concurrently displaying:
the information about the respective functionality of the content application; and
a selectable option that, when selected, causes the respective functionality of the content application to be performed.

56. The non-transitory computer readable storage medium of claim 47, wherein displaying, on the display, the information about the respective functionality of the content application comprises concurrently displaying:
the information about the respective functionality of the content application; and
a selectable option that, when selected, causes the electronic device to display, on the display, a respective user interface from which the user is able to perform the respective functionality of the content application.

57. The non-transitory computer readable storage medium of claim 56, wherein the selectable option, when selected, causes the electronic device to display, on the display, an animation of navigating from the user interface of the content application to the respective user interface from which the user is able to perform the respective functionality of the content application.

58. The non-transitory computer readable storage medium of claim 56, wherein:
the selectable option, when selected, causes the electronic device to scroll the respective user interface to a first portion of the respective user interface from which the user is able to perform the respective functionality of the content application, and
the respective user interface includes a second portion from which the user is not able to perform the respective functionality of the content application.

59. The non-transitory computer readable storage medium of claim 47, wherein:
the input to perform the action in the content application is received while the electronic device is concurrently displaying, on the display, the user interface of the content application in a first portion of the display, and a user interface of a second application, different than the content application, in a second portion of the display, and
the information about the respective functionality of the content application is displayed in the first portion of the display.

60. The non-transitory computer readable storage medium of claim 47, wherein:
the information-display criteria are satisfied when the user has played-back streaming content in the content application more than a predetermined number of times without adding streaming content to a content library of the user in the content application,
the input to perform the action comprises an input to play a respective content item in the content application, and
the information about the respective functionality of the content application includes:
information about adding streaming content to the content library of the user in the content application, and
an image that depicts a portion of the user interface of the content application from which the user is able to add streaming content to the content library of the user in the content application, and
a selectable option that, when selected, causes the electronic device to cease displaying the information about the respective functionality of the content application on the display.

61. The non-transitory computer readable storage medium of claim 47, wherein:
the information-display criteria are satisfied when:
the user has added streaming content to a content library of the user in the content application more than a predetermined number of times, and the content library of the user in the content application includes no streaming content that has been downloaded to the electronic device for offline playback,
the input to perform the action comprises an input to add a respective streaming content item to the content library of the user in the content application, and
the information about the respective functionality of the content application includes:
  information about downloading streaming content to the electronic device for offline playback, and
  a selectable option that, when selected, causes the electronic device to cease displaying the information about the respective functionality of the content application on the display.

62. The non-transitory computer readable storage medium of claim 47, wherein:
the information-display criteria are satisfied when:
  the user has added streaming content to a content library of the user in the content application more than a predetermined number of times, and
  the content library of the user in the content application includes no playlists that include streaming content,
the input to perform the action comprises an input to add one or more streaming content items to the content library of the user in the content application, and
the information about the respective functionality of the content application includes:
  information about creating playlists that include streaming content, and
  a selectable option that, when selected, causes the electronic device to cease displaying the information about the respective functionality of the content application on the display.

63. The non-transitory computer readable storage medium of claim 47, wherein:
the information-display criteria are satisfied when:
  the electronic device has displayed the content application more than a predetermined number of times during separate usage sessions of the content application, and
  the user has not yet displayed lyrics for a content item in the content application,
the input to perform the action comprises an input to initiate playback of a content item during a new usage session of the content application for which lyrics are available, and
the information about the respective functionality of the content application includes:
  information about displaying lyrics for the content item in the content application, and
  a selectable option that, when selected, causes the electronic device to display an animation of navigating from the user interface of the content application to a respective user interface of the content application that includes the lyrics for the content item.

64. The non-transitory computer readable storage medium of claim 47, wherein:
the information-display criteria are satisfied when:
  the user has downloaded more than a predetermined number of streaming content items to a content library of the user in the content application, and
  a setting for automatically downloading, to the electronic device, content items that are included in the content library of the user is not enabled,
the input to perform the action comprises an input to download a respective streaming content item to the content library of the user in the content application, and
the information about the respective functionality of the content application includes:
  information about automatically downloading, to the electronic device, content items that are in the content library of the user, and
  a selectable option that, when selected, causes the electronic device to display, on the display, a respective user interface from which the user is able to enable the setting for automatically downloading content items that are included in the content library of the user.

65. The non-transitory computer readable storage medium of claim 47, wherein:
the information-display criteria are satisfied when:
  the user has not created a content station in the content application based on streaming content, and
  the user has played through an end of a collection of a plurality of associated content items in the content application,
the input to perform the action comprises an input to display the content application on the display during a new usage session after the user has played through the end of the collection of the plurality of associated content items in the content application, and
the information about the respective functionality of the content application includes:
  information about creating a content station in the content application based on streaming content.

66. The non-transitory computer readable storage medium of claim 65, wherein the information about creating the content station in the content application based on streaming content includes a selectable option that, when selected, causes the electronic device to display, on the display, a voice input user interface that is configured to receive voice input for creating a content station in the content application based on streaming content.

67. The non-transitory computer readable storage medium of claim 47, wherein:
the information-display criteria are satisfied when:
  the user has not created a content station in the content application based on a content consumption history of the user in the content application, and
  the user has played through a collection of a plurality of associated content items in the content application more than a predetermined number of times,
the input to perform the action comprises an input to display content items in a content library of the user in the content application, and
the information about the respective functionality of the content application includes:
  information about creating a content station in the content application based on the content consumption history of the user in the content application, and
  a selectable option that, when selected, causes the electronic device to display, on the display, a voice input user interface that is configured to receive voice input for creating a content station in the content application based on the content consumption history of the user in the content application.

68. The non-transitory computer readable storage medium of claim 47, wherein whether the criterion is satisfied is based on user account interaction with respective content applications across a plurality of electronic devices including the electronic device.

69. The non-transitory computer readable storage medium of claim 47, wherein the information-display criteria is cumulative across a plurality of electronic devices including the electronic device.

* * * * *